US009092817B2

(12) United States Patent
Allocca et al.

(10) Patent No.: US 9,092,817 B2
(45) Date of Patent: Jul. 28, 2015

(54) PLACING A PURCHASE ORDER USING ONE OF MULTIPLE PROCUREMENT OPTIONS

(71) Applicant: Amazon.com, Inc., Seattle, WA (US)

(72) Inventors: William Allocca, Bellevue, WA (US); Jordan Hay, Seattle, WA (US); Jonathan A. LeBlang, Seattle, WA (US); Colleen McQueen, Seattle, WA (US); James Prudente, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/034,260

(22) Filed: Sep. 23, 2013

(65) Prior Publication Data
US 2014/0025541 A1 Jan. 23, 2014

Related U.S. Application Data

(60) Continuation of application No. 11/555,958, filed on Nov. 2, 2006, now Pat. No. 8,543,462, which is a division of application No. 10/418,807, filed on Apr. 17, 2003, now abandoned, which is a continuation of (Continued)

(51) Int. Cl.
G06Q 30/00 (2012.01)
G06Q 30/06 (2012.01)
(Continued)

(52) U.S. Cl.
CPC .......... G06Q 30/0635 (2013.01); G06Q 20/203 (2013.01); G06Q 30/0283 (2013.01);
(Continued)

(58) Field of Classification Search
USPC ........................................................ 705/26.1
See application file for complete search history.

(56) References Cited

U.S. PATENT DOCUMENTS 4,734,858 A 3/1988 Schlafly
4,937,863 A 6/1990 Robert et al.
(Continued)

FOREIGN PATENT DOCUMENTS

CA 2222229 7/1998
EP 0855659 7/1998
(Continued)

OTHER PUBLICATIONS

Trommer, Diane, "A New Wave in online credit", Electronic Buyers' News, 01646362, Mar. 4, 1996, issue 996, 2 pages, extracted from "Business source corporate" Database on Internet on Jan. 7, 2003.

(Continued)

Primary Examiner — Mila Airapetian
(74) Attorney, Agent, or Firm — Fenwick & West LLP

(57) ABSTRACT

A method and system for placing an order to purchase an item via the Internet. The order is placed by a user at a client system and received by a server system. The client system can display information identifying the item and, for each of multiple procurement options having information related to ordering the identified item, can display an indication of the procurement option such that selection of the displayed indication represents an ordering of the identified item using the information of the procurement option. In response to selection of a displayed indication, the client system can send to a server computer a request to order the identified item using the information of the procurement option for the selected indication.

20 Claims, 53 Drawing Sheets

Related U.S. Application Data application No. 09/547,540, filed on Apr. 12, 2000, now Pat. No. 7,720,712.

(60) Provisional application No. 60/190,264, filed on Mar. 17, 2000, provisional application No. 60/171,947, filed on Dec. 23, 1999.

(51) Int. Cl.
*G06Q 20/20* (2012.01)
*G06Q 30/02* (2012.01)

(52) U.S. Cl.
CPC ............ *G06Q30/06* (2013.01); *G06Q 30/0601* (2013.01); *G06Q 30/0633* (2013.01); *G06Q 30/0641* (2013.01); *Y10S 707/944* (2013.01)

(56) References Cited

U.S. PATENT DOCUMENTS

| | | |
|---|---|---|
| 5,204,897 A | 4/1993 | Wyman |
| 5,260,999 A | 11/1993 | Wyman |
| 5,303,393 A | 4/1994 | Noreen |
| 5,451,998 A | 9/1995 | Hamrick |
| 5,515,268 A | 5/1996 | Yoda |
| 5,611,040 A | 3/1997 | Brewer |
| 5,621,456 A | 4/1997 | Florin |
| 5,627,940 A | 5/1997 | Rohra et al. |
| 5,640,501 A | 6/1997 | Turpin |
| 5,640,577 A | 6/1997 | Scharmer |
| 5,664,111 A | 9/1997 | Nahan et al. |
| 5,708,780 A | 1/1998 | Levergood |
| 5,710,887 A | 1/1998 | Chelliah |
| 5,715,314 A | 2/1998 | Payne et al. |
| 5,715,399 A | 2/1998 | Bezos |
| 5,727,163 A | 3/1998 | Bezos |
| 5,745,681 A | 4/1998 | Levine et al. |
| 5,758,126 A | 5/1998 | Daniels et al. |
| 5,813,006 A | 9/1998 | Polnerow et al. |
| 5,819,034 A | 10/1998 | Joseph et al. |
| 5,826,242 A | 10/1998 | Montulli |
| 5,870,715 A | 2/1999 | Belitz et al. |
| 5,870,717 A | 2/1999 | Wiecha |
| 5,890,137 A | 3/1999 | Koreeda |
| 5,897,622 A | 4/1999 | Blinn |
| 5,899,980 A | 5/1999 | Wilf |
| 5,960,411 A | 9/1999 | Hartman et al. |
| 5,960,412 A | 9/1999 | Tackbary et al. |
| 5,963,915 A | 10/1999 | Kirsch |
| 5,963,924 A | 10/1999 | Williams |
| 5,970,472 A | 10/1999 | Allsop |
| 5,974,418 A | 10/1999 | Blinn |
| 5,983,199 A | 11/1999 | Kaneko |
| 5,983,200 A * | 11/1999 | Slotznick .................. 705/26.43 |
| 5,991,739 A | 11/1999 | Cupps et al. |
| 5,995,626 A | 11/1999 | Nishioka |
| 5,999,914 A | 12/1999 | Blinn |
| 6,009,413 A | 12/1999 | Webber |
| 6,026,376 A | 2/2000 | Kenney |
| 6,035,283 A | 3/2000 | Rofrano |
| 6,058,373 A | 5/2000 | Blinn |
| 6,101,482 A | 8/2000 | Diangelo |
| 6,101,483 A | 8/2000 | Petrovich |
| 6,125,352 A | 9/2000 | Franklin et al. |
| 6,149,055 A | 11/2000 | Gatto |
| 6,233,568 B1 | 5/2001 | Kara |
| 6,336,100 B1 | 1/2002 | Yamada |
| 6,493,742 B1 | 12/2002 | Holland et al. |
| 6,609,106 B1 | 8/2003 | Robertson |
| 6,629,079 B1 | 9/2003 | Spiegel et al. |
| 6,813,066 B2 | 11/2004 | Islam |
| 7,006,989 B2 | 2/2006 | Bezos et al. |
| 7,222,087 B1 | 5/2007 | Bezos et al. |
| 2002/0019776 A1 | 2/2002 | Simpson |
| 2002/0178089 A1 | 11/2002 | Bezos et al. |
| 2002/0194087 A1 | 12/2002 | Spiegel et al. |
| 2003/0046700 A1 | 3/2003 | Wilcox et al. |

FOREIGN PATENT DOCUMENTS

| | | |
|---|---|---|
| EP | 0855687 | 7/1998 |
| EP | 0883076 | 12/1998 |
| JP | 2-207645 | 8/1990 |
| JP | 06-068106 | 3/1994 |
| JP | 09-006849 | 1/1997 |
| JP | 09-114783 | 5/1997 |
| JP | 09-138725 | 5/1997 |
| JP | 09-179912 | 7/1997 |
| JP | 09-220882 | 8/1997 |
| WO | WO 95/16971 | 6/1995 |
| WO | WO 95/30961 | 11/1995 |
| WO | WO 96/13013 | 5/1996 |
| WO | WO 96/36928 | 11/1996 |
| WO | WO 96/38799 | 12/1998 |

OTHER PUBLICATIONS

Federal Circuit Court of appeal's decision, "*Amazon.com* v. *barnesandnoble.com, et al.*, Civ.Act.No. 00-1109, 239 F.3d 1343 (Fed.Cir., Feb. 14, 2001 made on Feb. 14, 2001", 37 pages, extracted from Internet on Jan. 7, 2003.

Yesil, Magdalena, "Creating the virtual store Taking your web site from browsing to buying"; Appendix G, pp. 347-349-Overview of Shopping Client Features, published 1997,Wiley Computer Publishing, John Wiley & Sons, Inc.; New York.

Microsoft Press Computer Dictionary, published, 1997; Redmond Washington, p. 137, see definitions of "default—default button—default home page".

"GO-CART Shopping Cart Software Features," GO International, Inc., 1996, 3 pages, [online] [retrieved on Nov. 19, 1998] Retrieved from the Internet: <URL: http://www.go-cart.com/features.html>.

"PerlShop Manual (version 2.2)," ARPAnet Corp., Nov. 24, 1996, 9 pages, [online] [retrieved on Nov. 19, 1998] Retrieved from the Internet: <URL: http://www.w3u.com/grokksoft/shop/perlman.html>.

"Sax Software Announces Sax NetSell; Sax NetSell's Design-Time ActiveX Controls Make Internet Commerce Easy," Business Wire, Inc., May 23, 1997, 2 pages.

"Microsoft Excel User's Guide, Version 5.0," Microsoft Corporation, 1993, pp. 259-373.

Jim Carroll and Rick Broadhead, "1997 Canadian Internet Handbook," Prentice Hall, 1996 (9 pages).

"Cookies—What Every Web Designer Should Know," Journal of Design Science, 1997-2001, Ingnition, Inc. (7 pages) www.ignitiondesign.com/journal/cookies.

Yesil, Magdalena, "Creating the Virtual Store," Wiley Computer Publishing, 1997 (pp. 118-121, 326-327).

Bank of Montreal MBANX, "Netbanking With Your PC," Jul. 7, 1997.

"Auction Features—Strictly Exchange Online Auction Software, Programming & Design Services," Strictly Exchange, 1998-2001, 2 pages, [online] [retrieved on Jul. 23, 2001] Retrieved from the Internet: <URL: http://www.strictlyexchange.com/custom/>.

Walter's Coke Project Homepage, "Lloyd's Coke Machine," Feb. 27, 1996 (8 pages) http://www.ugcs.caltech.edu/.about.walterfb/coke/coke.html [Accessed Jul. 23, 2001].

Greenspun, Philip, "Philip and Alex's Guide to Web Publishing," Chapter 14:ecommerce (31 pages) http://www.arsdigita.com/books/panda/ecommerce [Accessed Jul. 23, 2001].

Telvue Corp. 10-Q Report, Nov. 7, 1995 (18 pages)—Sec Info—Telvue Corp—10-Q—for Sep. 30, 1995 http://www.secinfo.com/dpJXs.a6.html [Accessed Jul. 23, 2001].

Jones, C., "Java Shopping Cart and Java Wallet; Oracle Plans to Join E-Commerce Initiative," InfoWorld Media Group, Mar. 31, 1997, 2 pages.

"Pacific Coast Software Software Creates Virtual Shopping Cart," M2 Communications Ltd., M2 Presswire, Sep. 6, 1996, 1 page.

(56) References Cited

OTHER PUBLICATIONS

"Software Creates Virtual Shopping Cart," Business Wire, Inc., Sep. 5, 1996, 2 pages.

Baron, Chris and Bob Weil, "Implementing a Web Shopping Cart," Dr. Dobb's Journal, Sep. 1996, pp. 64, 66, 68-69 and 83-85.

Cooper, Alan, "About Face—The Essentials of User Interface Design," Chapters 11-15, IDG Books Worldwide, Inc. Foster City, California, Copyright 1995.

Terdoslavich, William, "Java Electronic Commerce Framework," Computer Reseller News, Sep. 23, 1996, CMP Media, Inc., 1996, pp. 126.

http://www.elibrary.com/getdoc.cgi?id=117852032x0y1781w4&01DS=0Q001D002&F-orm=RL&pubname=Computer.sub.—Reseller.sub.—News&Puburl=http.about.C.abou-t..about.S.about..about.S.about.www.techweb.com&Querydocid=002269©library.-sub.—d&Dtype=0.about.0&dinst=0 [Accessed Nov. 19, 1998].

Trommer, Diane, A New Wave in Online Credit, Mar. 4, 1996, Electronic Buyers News, p. 58.

"Internet Access: Disc Distributing Announces Interactive World Wide," Cambridge Work-Group Computing Report, Cambridge Publishing, Inc. 1995, 3 Pages http://www.elibrary.com/getdoc.cgi?id=117852032x0y1781w4&OIDS=0Q003D019&F-orm=RL&pubname=Cambridge.sub.—WorkGroup.sub.—Computing.sub.—Report&pubu-r1=0&querydocid=1007497©library.sub.—b&dtype=0.about.0&dinst=0. [Accessed Nov. 19, 1998].

Nance, Barry, "Reviews: A Grand Opening for Virtual Storefront with Middleware," Jun. 1, 1997, CMP Media, Inc., 1997, p. 80, http://www.elibrary.comgetdoc.cgi?id=117852032x0y1781w4&0IDS=0Q005D005&Fo-rm=RL&pubname=Network.sub.—Computing&puburl=http.about.C.about..about.S.a-bout..about.S.about.www.techweb.com&querydocid=1257247©library.sub.—a&dty-pe=0.about.0&dinst=0. [Accessed Nov. 19, 1998].

Hogue, Reaz, "A Shopping Cart Application with JavaScript," Web Techniques, May 1998, pp. 63, 65-66, and 68.

U.S. Appl. No. 09/318,447, filed May 25, 1999, Bezos et al.

Lichty, T., et al., "The Official American Online Tour Guide," 4th Edition, The Corolis Group, Inc., 1998, pp. 411-422.

Doler, K., "Interview: Jeff Bezos, Founder and CEO of Amazon.com, Inc.," Upside (US ed.). Sep. 1998. vol. 10, Iss 9; p. 76, 8 Pages.

Weber, T., "Telecommunications with the Internet: On the Internet, the Race is on for a Better Wallet," Wall Street Journal, Dec. 22, 1998, p. 6.

Keenan, C., "America Online Planning to Unveil Digital Wallet by Christmas time," American Banker, Oct. 15, 1998, vol. 163, Issue 198, p. 18.

Hansell, S., "Amazon is Reported Ready to Link Other Merchants," New York Times, Dec. 7, 1998, p. C10.

"Cybercash Adds Technology, Financial Partners Instabuy," Electronic Commerce News, Nov. 2, 1998, vol. 3, Issue 44, p. 1.

Tweney, D., "Shopping Agents Help Consumers Find the Best Deals," Info World, Dec. 8, 1997, vol. 19, Issue 49, p. 98.

"Excite: Excite Express Order Launched, Purchasing for Consumers, Accelerates e-commerce initiative," M2 Presswire, Nov. 10, 1998.

Office Action for U.S. Appl. No. 10/418,807 mailed on Jan. 23, 2007, 14 Pages.

Office Action for U.S. Appl. No. 10/418,807 mailed on Apr. 26, 2006, 10 Pages.

Office Action for U.S. Appl. No. 12/754,565 mailed on Sep. 2, 2010, 18 Pages.

Office Action for U.S. Appl. No. 09/547,540 mailed on Apr. 27, 2009, 11 Pages.

Office Action for U.S. Appl. No. 09/547,540 mailed on Mar. 2, 2004, 12 Pages.

Office Action for U.S. Appl. No. 09/547,540 mailed on Jul. 8, 2003, 16 Pages.

Office Action for U.S. Appl. No. 09/547,540 mailed on Jan. 10, 2003, 15 Pages.

Office Action for U.S. Appl. No. 11/555,958 mailed on Dec. 15, 2008, 10 Pages.

Office Action for U.S. Appl. No. 11/555,958 mailed on Jul. 9, 2008, 9 Pages.

Office Action for U.S. Appl. No. 11/555,958 mailed on Oct. 3, 2007, 11 Pages.

Office Action for U.S. Appl. No. 11/555,958 mailed on Apr. 20, 2007, 7 Pages.

* cited by examiner

105 {

Thank you for your 1-Click order!

A quantity of 1 of [the item] will be shipped to you as soon as possible. We will do our best to minimize your shipping costs by combining your 1-Click orders into as few shipments a possible.

Please continue browsing.

Review or change your 1-Click orders

101 { Summary description of item

*Fig. 1B*

Summary of 1-Click express orders

Press this button if you [changed quantities] of any item below. If you don't press it, your changes won't "stick."

You can set the quantity to 0 (zero) to cancel an item.

The 1-Click order below (available in 3 or fewer days) will be shipped together.

106 {
Order# 098337

| [1] | Item 1 | $ 10.00 |
| [1] | Item 2 | $ 15.00 |
|     | Total  | $ 25.00 |

The 1-Click orders below (available in one week or more) will be shipped together.

107 {
Order# 098336

| [1] | Item 3 | $ 20.00 |
| [1] | Item 4 | $  6.00 |
|     | Total  | $ 26.00 |

108 {
Ship to:            John Doe at home

Shipment method:    Standard domestic shipping

Payment method:     **__*1_2345

[continue shopping]

<u>1-Click express shipping policies</u>

*Fig. 1C*

START

A: Customer Name & Address

B: Customer Financial Info

C: Customer Employment Info

D: Customer Education Info

*Fig. 8A*

A: First Name :
   M.I. :
   Last Name :
   Street :
   City :
   State :          Zip :

[ Next ]   [ Previous ]

B: Customer Financial Info

C: Customer Employment Info

D: Customer Education Info

*Fig. 8B*

A: Customer Name & Address

B: Net Worth:

Annual Income:

Spouse's Annual Income:

Other Income:

[ Next ]   [ Previous ]

C: Customer Employment Info

D: Customer Education Info

*Fig. 8C*

Create Group

Group Name: _____ ~1001

Member Info

| | Name | Email | Delivery Address | ... |
|---|---|---|---|---|
| 1002 | | | | |
| | | | | |
| | | | ⋮ | |
| | | | | |
| | | | | |

*Fig. 10*

Sign-In

User Name: | John Doe | 2101

Password: | XXXXXXX | 2102

Enter Credit Card
No. to be used for
orders to new
addresses during this
shopping trip (optional):

Credit Card Type: ▼  } 2103

Credit Card Expiration:

*Fig. 21A*

Add A New Customer Procurement Option

| | |
|---|---|
| Address Line 1: (or company name) | c/o ABC Club |
| Address Line 2: | 11111 Main St. |
| City: | Seattle |
| State: | WA ▼ |
| Country: | USA |
| ZIP Code: | 98100 |
| Phone Number: | 206-555-5555 |
| Credit Card No.: | 1111-1111-1111-1111 |
| Credit Card Type: | MasterCard ▼ |
| Credit Card Exp.: | 01/02 |
| Shipping Method: | Standard (3-7 days) |
| Option Moniker: | The Club |

2104 brackets Address Line 1 through ZIP Code
2105 Phone Number
2106 brackets Credit Card No. through Credit Card Exp.
2107 Shipping Method
2108 Option Moniker Choose as Default: ☐ 2109

Use credit card above for other orders to new addresses during this shopping trip: ✓ 2110

*Fig. 21B*

Add A New Customer Procurement Option

Address Line 1:
(or company name)

Address Line 2:

City:

State:

Country:

ZIP Code:

} 2104

2105
Phone Number:

2107
Shipping Method:

2108
Option Moniker:

2109
Choose as Default:

Identify Recipient Procurement Option

Phone Number: ☐ 2201

*or*

E-mail Address: ☐ 2202

*or*

Name: Doug Doe 2203

Address Line 1: Smith Hall #302
(or company name)

Address Line 2: ABC University

City: Seattle

State: WA ▼

Country: USA

ZIP Code: 98101

} 2204

Credit Card No.: xxxx-xxxx-xxxx-1111

Credit Card Type: ▼

Credit Card Exp.: ☐

} 2206

Shipping Method: Overnight 2207

Recipient Moniker: Dougie 2208

Gift Wrapping Option: Premium 1 2209

*Fig. 22*

Summary of Multi-Procurement Option Orders

Press this button if you [Changed Quantities] of any item below. If you don't press it, your changes won't "stick." You can set the quantity to 0 (zero) to cancel an item.

To Customer "John Doe at Home":

The orders below (available in 3 or fewer days) will be shipped together:

2910 {

2916 {
- Order# 172381
  - [1]  Item 1       $ 10.00
  - [1]  Item 2       $ 15.00
  -       Total       $ 25.00

The orders below (available in one week or more) will be shipped together.

2917 {
- Order# 127583
  - [2]  Item 3       $ 10.00
  -       Total       $ 20.00

2918 {
- Shipment Method:  Standard Domestic Shipping
- Payment Method:   **--*1-2345

To Customer "The Club":

The orders below (available in 3 or fewer days) will be shipped together:

- Order# 837278
  - [1]  Item 4       $ 5.00
  -       S&H         $ 2.00
  -       Total       $ 7.00

- Shipment Method:  Standard Domestic Shipping
- Payment Method:   **--*1-1111

*Fig. 29A*

[NEXT PAGE]   [Continue Shopping]

To Recipient "Dougie":

The orders below (available in 3 or fewer days) will be shipped together:

Order# 658377

| 1 | Item 5 | $ 7.00 |
|---|---|---|
|   | Premium 1 wrapping | $ 3.00 |
|   | Total | $ 10.00 |

Shipment Method: Overnight
Payment Method: **--*1-1111

Time when order processing will be finalized: 03:00 P.M., 11/12/xx

[PREVIOUS PAGE]  [Continue Shopping]

*Fig. 29B*

Add New Address

| | |
|---:|:---|
| Name: | Sally Smith |
| Address Line 1: (or company name) | c/o ABC Club |
| Address Line 2: | 11111 Main St. |
| City: | Seattle |
| State: | WA ▼ |
| Country: | USA |
| ZIP Code: | 98100 |
| Phone Number: | 206-555-5555 ⌣ 3115 |
| Credit Card No.: | 1111-1111-1111-1111 |
| Credit Card Type: | Mastercard ▼ |
| Credit Card Exp.: | 01/02 |
| Shipping Method: | ● Standard  ○ 2nd Day Air  ○ Next Day Air ⌣ 3117 |
| Option Moniker: | The Club ⌣ 3118 |

Address fields (Name through ZIP Code) are grouped as 3114. Credit Card fields are grouped as 3116.

Include address in 1-Click display:  ⌣ 3119

*Fig. 31D*

Address Book

1-Click ordering is currently turned on for user jboe. [Turn 1-Click Off] ~ 3205

[Enter a New Address] ~ 3207

3210
John Boe, Jr.
1111 Jones Lane
Seattle, WA 98104
USA
Phone: 206-555-8327
(EDIT)

Amex
xxx-33003
(EDIT)

Shipping Method
◉ Standard
○ 2nd Day Air
○ Next Day Air

[John Boe] ~ 3212
Moniker that will
appear in 1-Click
dropdown menu
(Edit it if you like)

3214 ~ ☑ Include in 1-Click display

This is the current default. ~ 3216
To change, click here.

(Delete Address)  (Update) settings for this address

3220
John Boe, Jr.
ABC Company
2332 Corporate Dr.
Seattle, WA 98101
USA
Phone: 206-555-5000
(EDIT)

ABC Acct.
xxx-512
(EDIT)

○ Standard
◉ 2nd Day Air
○ Next Day Air

[John Boe - Work] ~ 3222
Moniker that will
appear in 1-Click
dropdown menu
(Edit it if you like)

3224 ~ ☐ Include in 1-Click display (Delete Address)  (Update) settings for this address

3230
Winston Churchill
3601 Franklin Rd.
Seattle, WA 98104
USA
Phone: 206-555-7263
(EDIT)

Billing and
Shipping Information

[Winston Chur - [1]] ~ 3232
Moniker that will
appear in 1-Click
dropdown menu
(Edit it if you like)

3234 ~ ☑ Include in 1-Click display (Delete Address)  (Update) settings for this address

3240
Winston Churchill
3601 Franklin Rd., Apt.3
Seattle, WA 98104
USA
Phone: 206-555-7263
(EDIT)

Billing and
Shipping Information

[Winston Chur - [2]] ~ 3242
Moniker that will
appear in 1-Click
dropdown menu
(Edit it if you like)

3244 ~ ☑ Include in 1-Click display (Delete Address)  (Update) settings for this address

*Fig. 32A*

Address Book  (continued)

3250
- Winston Churchill
  ABC Company
  2332 Corporate Dr.
  Seattle, WA 98101
  USA
  Phone: 206-555-5000
  (EDIT)
  (Billing and Shipping Information)
  Winston Chur - 98101  ~3252
  Moniker that will appear in 1-Click dropdown menu
  (Edit it if you like)
  3254 ☑ Include in 1-Click display
  (Delete Address)  (Update) settings for this address 3260
- Benjamin Franklin
  P.O. Box 1800
  Fairmont, VT 33850
  USA
  Phone: 941-555-2733
  (EDIT)
  (Billing and Shipping Information)
  Benjamin F - Fair  ~3262
  Moniker that will appear in 1-Click dropdown menu
  (Edit it if you like)
  3264 ☑ Include in 1-Click display
  (Delete Address)  (Update) settings for this address 3270
- Benjamin Franklin
  18244 Fox Woods Dr.
  Wilmington, VT 33850
  USA
  Phone: 941-555-2733
  (EDIT)
  (Billing and Shipping Information)
  Benjamin F - Wilm  ~3272
  Moniker that will appear in 1-Click dropdown menu
  (Edit it if you like)
  3274 ☑ Include in 1-Click display
  (Delete Address)  (Update) settings for this address 3280
- Sally Smith     MC
  11111 Main St.  xxx-11111
  Seattle, WA 98100  (EDIT)
  USA
  Phone: 206-555-5555
  (EDIT)
  ● Standard
  ○ 2nd Day Air
  ○ Next Day Air
  The Club  ~3282
  Moniker that will appear in 1-Click dropdown menu
  (Edit it if you like)
  3284 ☑ Include in 1-Click display
  (Delete Address)  (Update) settings for this address

*Fig. 32B*

Shopping Cart

|  | 3307 | | Ship to: | 3303 |
|---|---|---|---|---|
|  | Proceed to checkout | OR | John Doe ▼ | |
|  | | | Buy all items now with 1-Click℠ | ~3305 |

3310 {
- Summary Description of Item
- Qty: 1
- List price: ~~$20.00~~
- Our price: $15.00
- You save: $ 5.00 (25%)
- [save for later]
- [delete]
- 3312 — ☐ Is this a Gift?

3320 {
- Summary Description of Item
- Qty: 1
- List price: ~~$10.00~~
- Our price: $ 5.00
- You save: $ 5.00 (50%)
- [save for later]
- [delete]
- 3322 — ✓ Is this a Gift?

3330 {
- Summary Description of Item
- Qty: 1
- List price: ~~$100.00~~
- Our price: $10.00
- You save: $ 90.00 (90%)
- [save for later]
- [delete]
- 3332 — ✓ Is this a Gift?
- *For Benjamin Franklin's Wish List Subtotal: $30.00

*Fig. 33*

Benjamin Franklin's Wish List

When you buy from this page, you will have the opportunity to ship directly to Ben, or to another address of your choice (use shopping cart).

| Summary Description of Item | Detailed Description? —3405 | Price $10.00 | Requested 1 | Received 0 |

Ship to: Ben Franklin ~3420

| Add to cart |~3410   | Buy 1 Now With 1-Click^SM |~3425

Thank You
Thank You For Your 1-Click Order!
Review or change your 1-Click orders ~3505
3510
| One copy of: | Summary Description of Item |
| --- | --- |
| Sent to: | Benjamin Franklin, Fairmont, VT |
| Availability: | as soon as possible |
| Shipping Method: | Standard |
3515  EDIT
| Wrapping: | Deluxe A |
| --- | --- |
| Message: | Ben, hope that electrical burn is getting better! |
3520  EDIT your gift options
3525
Continuing Shopping Options
 
*Fig. 35*

PLACING A PURCHASE ORDER USING ONE OF MULTIPLE PROCUREMENT OPTIONS

CROSS REFERENCE TO RELATED APPLICATIONS

This application is a continuation of co-pending U.S. patent application Ser. No. 11/555,958, entitled "Placing a Purchase Order Using One of Multiple Procurement Options," filed on Nov. 2, 2006, which is a divisional of U.S. patent application Ser. No. 10/418,807, filed on Apr. 17, 2003, which is a continuation of U.S. patent application Ser. No. 09/547,540, filed on Apr. 12, 2000, which claims the benefit of provisional U.S. patent application No. 60/171,947, filed Dec. 23, 1999, and of U.S. patent application No. 60/190,264, filed Mar. 17, 2000, each of which are hereby incorporated by reference.

TECHNICAL FIELD

The present invention relates to a computer method and system for placing an order and, more particularly, to a method and system for ordering items over the Internet.

BACKGROUND

The Internet comprises a vast number of computers and computer networks that are interconnected through communication links. The interconnected computers exchange information using various services, such as electronic mail, Gopher, and the 15 World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using Hypertext Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

Since the purchaser-specific order information contains sensitive information (e.g., a credit card number), both vendors and purchasers want to ensure the security of such information. Security is a concern because information transmitted over the Internet may pass through various intermediate computer systems on its way to its final destination. The information could be intercepted by an unscrupulous person at an intermediate system. To help ensure the security of the sensitive information, various encryption techniques are used when transmitting such information between a client computer system and a server computer system. Even though such encrypted information can be intercepted, because the information is encrypted, it is generally useless to the interceptor. Nevertheless, there is always a possibility that such sensitive information may be successfully decrypted by the interceptor. Therefore, it would be desirable to minimize the sensitive information transmitted when placing an order.

The selection of the various items from the electronic catalogs is generally based on the "shopping cart" model. When the purchaser selects an item from the electronic catalog, the server computer system metaphorically adds that item to a shopping cart. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. For example, the purchaser selects the various items from the electronic catalog, and then indicates that the selection is complete. The purchaser is then presented with an order Web page that prompts the purchaser for the purchaser-specific order information to complete the order. That Web page may be prefilled with information that was provided by the purchaser when placing another order. The information is then validated by the server computer system, and the order is completed. Such an ordering model can be problematic for a couple of reasons. If a purchaser is ordering only one item, then the overhead of confirming the various steps of the ordering process and waiting for, viewing, and updating the purchaser-specific order information can be much more than the overhead of selecting the item itself. This overhead makes the purchase of a single item cumbersome. Also, with such an ordering model, each time an order is placed sensitive information is transmitted over the Internet. Each time the sensitive information is transmitted over the internet, it is susceptible to being intercepted and decrypted.

BRIEF DESCRIPTION OF THE DRAWINGS

FIGS. 1A-1C illustrate an embodiment of single-action ordering.

FIGS. 8A-8C illustrate a hierarchical data entry mechanism in one embodiment.

FIG. 10 illustrates an embodiment of a grid for creation of a group and the entry of identifying information for recipients associated with the group (i.e., members).

FIGS. 21A-21C illustrate an embodiment of adding as additional customer procurement option.

FIG. 22 illustrates an embodiment of adding an additional recipient procurement option.

FIGS. 29A-29B illustrate example results of multi-procurement option ordering in one embodiment.

FIGS. 31A-31G illustrate an embodiment of multi-procurement option ordering.

FIGS. 32A-32B illustrate an embodiment of a user's address book from which procurement options can be determined.

FIG. 33 illustrates an embodiment of multi-procurement option ordering used with items in a user's shopping cart.

FIG. 34 illustrates an embodiment of single-action ordering from a user's wish list.

FIG. 35 illustrates an embodiment of a post-order summary page from which order options can be modified.

DETAILED DESCRIPTION

A method and system for ordering of items in a client/server environment is described. In some embodiments, a single-action ordering system is used to reduce the number of purchaser interactions needed to place an order and to reduce the amount of sensitive information that is transmitted between a client system and a server system.

In one embodiment, the server system assigns a unique client identifier to each client system. The server system also stores purchaser-specific order information for various potential purchasers. The purchaser-specific order information may have been collected from a previous order placed by the purchaser. The server system maps each client identifier to a purchaser that may use that client system to place an order. The server system may map the client identifiers to the purchaser who last placed an order using that client system. When a purchaser wants to place an order, the purchaser uses a client system to send the request for information describing the item to be ordered along with its client identifier. The server system determines whether the client identifier for that client system is mapped to a purchaser. If so mapped, the server system determines whether single-action ordering is enabled for that purchaser at that client system. If enabled, the server system sends the requested information (e.g., via a Web page) to the client computer system along with as indication of the single action to perform to place the order for the item. When single-action ordering is enabled, the purchaser need only perform a single action (e.g., click a mouse button) to order the item. When the purchaser performs that single action, the client system notifies the server system. The server system then completes the order by adding the purchaser-specific order information for the purchaser that is mapped to that client identifier to the item order information (e.g., product identifier and quantity). Thus, once the description of an item is displayed, the purchaser need only take a single action to place the order to purchase that item. Also, since the client identifier identifies purchaser-specific order information already stored at the server system, there is no need for such sensitive information to be transmitted via the internet or other communications medium.

Figure 1A:
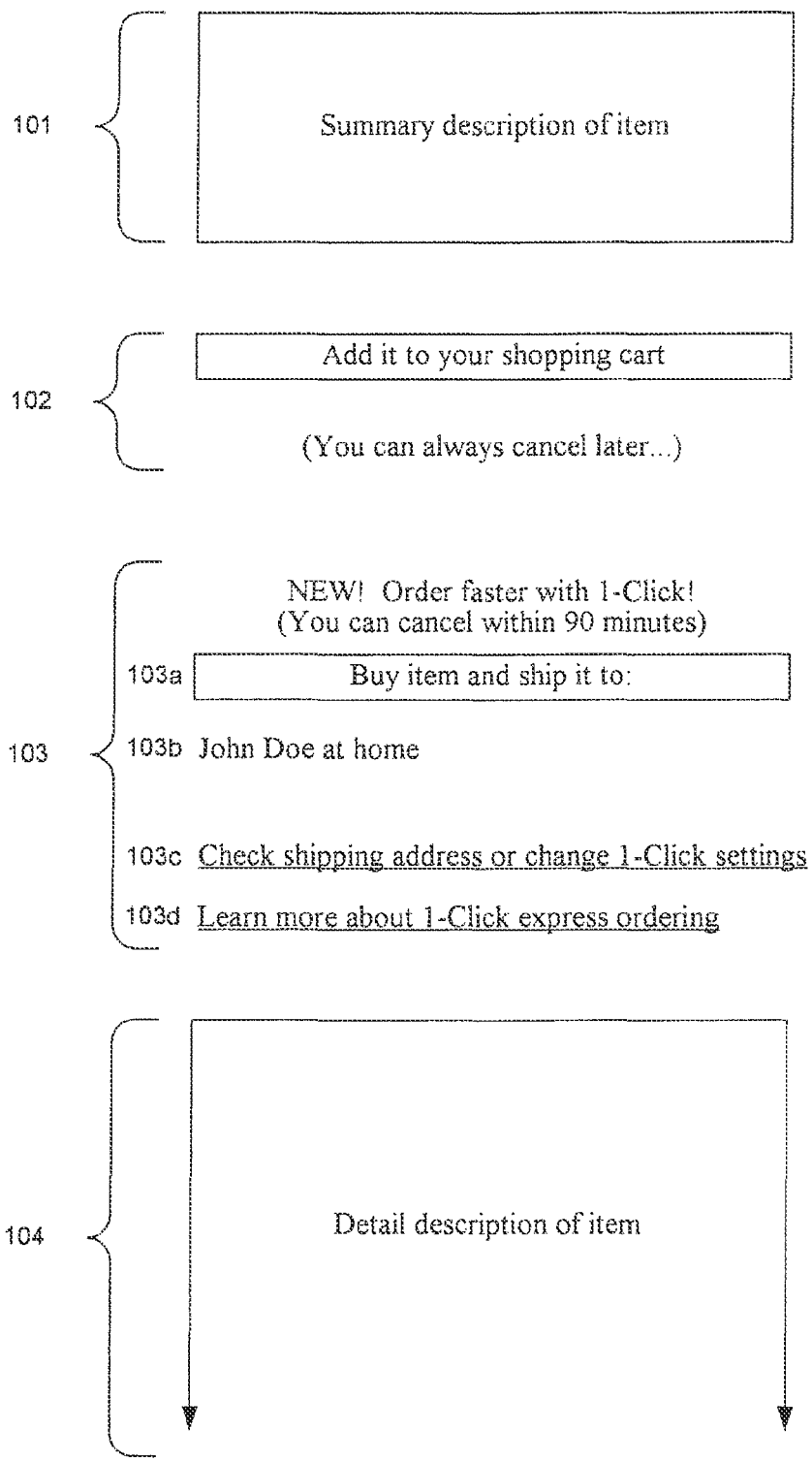

FIGS. 1A-1C illustrate one embodiment of single-action ordering. FIG. 1A illustrates the display of a Web page describing an item that may be ordered. This example Web page was sent from the server system to the client system when the purchaser requested to review detailed information about the item. This example Web page contains a summary description section 101, a shopping cart section 102, a single-action ordering section 103, and a detailed description section 104. One skilled in the art would appreciate that these various sections can be omitted or rearranged or adapted in various ways. In general, the purchaser need only be aware of the item or items to be ordered by the single action and of the single action needed to place the order. The summary description and the detailed description sections provide information that identifies and describes the item(s) that may be ordered. The shopping cart section provides the conventional capability to add the described item to a shopping cart. The server system adds the summary description, the detailed description, and the shopping cart sections to each Web page for an item that may be ordered. The server system, however, only adds the single-action ordering section when single-action ordering is enabled for that purchaser at that client system. (One skilled in the art would appreciate that a single Web page on the server system may contain all these sections but the single-action ordering section can be selectively included or excluded before sending the Web page to the client system.) This example single-action ordering section allows the purchaser to specify with a single click of a mouse button to order the described item. Once the purchaser clicks the mouse button, the item is ordered, unless the purchaser then takes some action to modify the order. The single-action ordering section contains a single-action ordering button 103*a*, purchaser identification subsection 103*b*, and single-action ordering information subsections 103*c* and 103*d*. The purchaser information subsection displays enough information so that the purchaser can verify that the server system correctly recognizes the purchaser. To reduce the chances of sensitive information being intercepted, the server system sends only enough information so that the purchaser is confident that the server system correctly identified the purchaser but yet not enough information to be useful to an unscrupulous interceptor. The additional information subsections allow the purchaser to obtain various settings or obtain more information related to the single-action ordering. If the purchaser wants to verify the shipping address, the purchaser can select the "check shipping address" label. In response to this selection, the server system may require the purchaser to perform a "login" so that the identity of the purchaser can be verified before the shipping information is viewed or modified. The server system then sends a Web page to the client system for display and possible modification of the shipping address. In this way, the transmitting of the sensitive slopping address can be avoided unless requested by the verified purchaser.

When the purchaser selects the single-action ordering button, the client system sends a message to the server system requesting that the displayed item be ordered. After the server system processes the message, the server system provides to the client system a new Web page that confirms receipt of the single-action order. FIG. 1B illustrates the display of a Web page confirming a single-action order. The confirming Web page contains essentially the same information as the Web page describing the item (i.e., FIG. 1A) except that an order confirmation section 105 is displayed at the top of the Web page. The order confirmation section confirms that the order has been placed and provides an opportunity for the purchaser to review and change the single-action order. Alternatively, the confirming Web page can be identical to the Web page describing the item (i.e., FIG. 1A), except that the single-action ordering button is replaced with a message confirming the order.

If a single-action ordering is not currently enabled for the client system but could be enabled, then the server system can generate a Web page like FIG. 1A, except that the single-action ordering button 103*a* is replaced by a single-action ordering enable button. Such a replacement button could contain text instructing the purchaser to click on the button to enable single-action ordering. When the purchaser clicks on that button, the server system would send the Web page of FIG. 1A to be displayed. Single-action ordering can be enabled whenever the server system has stored sufficient purchaser-specific order information for that client system to complete a single-action order. If the server system does not have sufficient information, then when the purchaser selects the single-action ordering button, the server system can provide a Web page to collect the additional information that is needed. The server system may require the purchases to "login" so that the identify of the purchaser can be verified before the single-action ordering is enabled.

To help minimize shipping costs and purchaser confusion, the server system may combine various single-action orders into a multiple-item order. For example, if a purchaser orders one item using the single-action ordering and five minutes later orders another item using the single-action ordering, then those orders may be cost effectively combined into a single order for shipping. The server system combines the single-action orders when their expected ship dates are similar. For example, if one item is immediately available and the other item will be available in one day, then the two single-action orders may be cost-effectively combined. However, if the other item will not be available for two weeks, then the two single-item orders would not be combined. FIG. 1C illustrates the display of a Web page representing four single-action orders that have been combined into two separate multiple-item orders based on the availability of the items. The order information 106 indicates that item 1 and item 2, which, will be available in three or fewer days, have been combined into one order. The order information 107 indicates that items 3 and 4, which will not be available within one week, are combined into a separate order. In one embodiment, the server system may combine single-action orders that are placed within a certain time period (e.g., 90 minutes). Also, the server system may combine or divide orders when the orders are scheduled for shipment based on the then current availability of the items ordered. This delayed modification of the orders is referred to as "expedited order selection" and is described below in detail.

Figure 2:
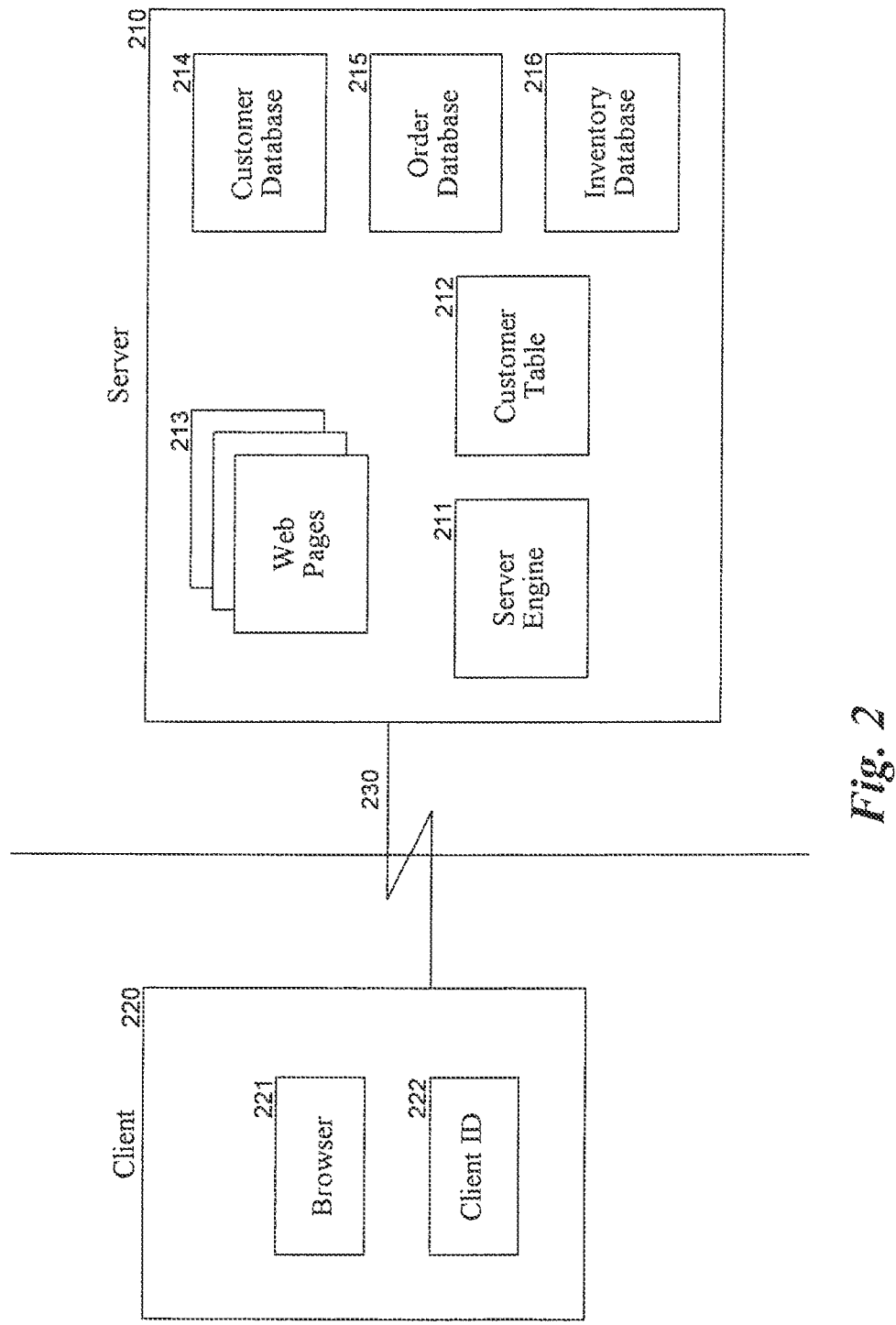
FIG. 2 is a block diagram illustrating as embodiment of a system that supports single-action ordering.

FIG. 2 is a block diagram illustrating an embodiment of a system that supports single-action ordering. This embodiment supports the single-action ordering over the Internet using the World Wide Web. The server system 210 includes a server engine 211, a client identifier/customer table 212, various Web pages 213, a customer database 214, an order database 215, and an inventory database 216. The server engine receives HTTP requests to access Web pages identified by URLs and provides the Web pages to the various client systems. Such an HTTP request may indicate that the purchaser has performed the single action to effect single-action ordering. The customer database contains customer information for various purchasers or potential purchasers. The customer information includes purchaser-specific order information such as the name of the customer, billing information, and shipping information. The order database 215 contains an entry for each order that has not yet been shipped to a purchaser. The inventory database 216 contains a description of the various items that may be ordered. The client identifier/customer table 212 contains a mapping from each client identifier, which is a globally unique identifier that uniquely identities a client system, to the customer last associated with that client system. The client system 220 contains a browser and its assigned client identifier. The client identifier is stored in a file, referred to as a "cookie." In one embodiment, the server system assigns and sends the client identifier to the client system once when the client system first interacts with the server system. From then on, the client system includes its client identifier with all messages sent to the server system so that the server system can identify the source of the message. The server and client systems interact by exchanging information via communications link 230, which may include transmission over the Internet.

One skilled in the art would appreciate that the single-action ordering techniques can be used in various environments other than the internet. For example, single-action ordering can also be in as electronic mail environment in which an item is described in an electronic mail message along with an indication of the single action that is to be performed to effect the ordering of the item. Also, various communication channels may be used such as local area network wide area network, or point-to-point dial up connection. Also, a server system may comprise any combination of hardware or software that can generate orders in response to the single action being performed. A client system may comprise any combination of hardware or software that can interact with the server system. These systems may include television-based systems or various other consumer products through which orders may be placed.

Figure 3:
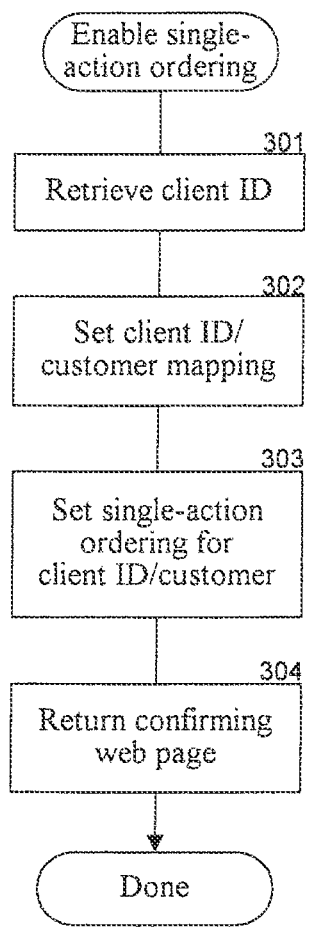
FIG. 3 is a flow diagram of an embodiment of a routine that enables single-action ordering for a customer.

FIG. 3 is a flow diagram of an embodiment of a routine that enables single-action ordering for a customer. To enable single-action ordering, a server system needs to have information about the customer that is equivalent to the purchaser-specific order information. The server system can obtain this information in various ways. First, the server system could ask the customer if they would like to have single-action ordering enabled. If so, then the server system could prompt the customer using a Web page for the purchaser-specific order information. Second, the server system could also save the purchaser-specific order information collected when an order is placed conventionally. The server system could, either automatically or with the customer's assent, enable single-action ordering. In step 301, the server system retrieves the client identifier that was sent by the client system. In step 302, the server system updates the client identifier/customer table to indicate that the generated client identifier has been associated with that customer. In step 303, the server system sets a flag indicating that single-action ordering is enabled for that client identifier and that customer combination. That flag may be stored in the client identifier/customer table. In step 304, the server system supplies a confirming Web page to the client system. The next time a purchaser attempts to order an item, the client system will supply its client identifier to the server system. If single-action ordering is enabled for that purchaser, the server system will assume that the purchaser is the customer associated with that client identifier in the client identifier/customer table. Thus, a purchaser may not want to allow the server system to enable single-action ordering if there is a possibility that someone else may use that same client system.

Figure 4:
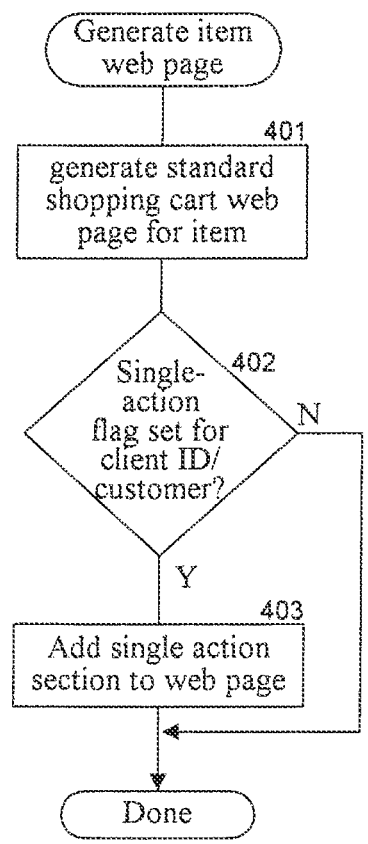
FIG. 4 is a flow diagram of an embodiment of a routine to generate a Web page in which single-action ordering is enabled.

FIG. 4 is a flow diagram of an embodiment of a routine to generate a Web page in which single-action ordering is enabled. When single-action ordering is enabled, the server system generates a Web page describing an item as is conventionally done and then adds a single-action ordering section. In one embodiment, the server system adds partial purchaser-specific order information to the section. This information may include the customer's name, a shipping address moniker selected by the purchaser (e.g., "at home"), and the last five digits of a credit card number or a nickname selected by the purchaser. Such partial information should be the minimum information sufficient to indicate to the purchaser whether or not the server system is using the correct purchaser-specific order information. In step 401, the server system, generates a standard shopping cart-type Web page for the item. In step 402, if the single-action ordering flag has been set for the client identifier and customer combination, then the server system continues at step 403, else the server system completes. In step 403, the server system adds the single-action section to the Web page and completes.

Figure 5:
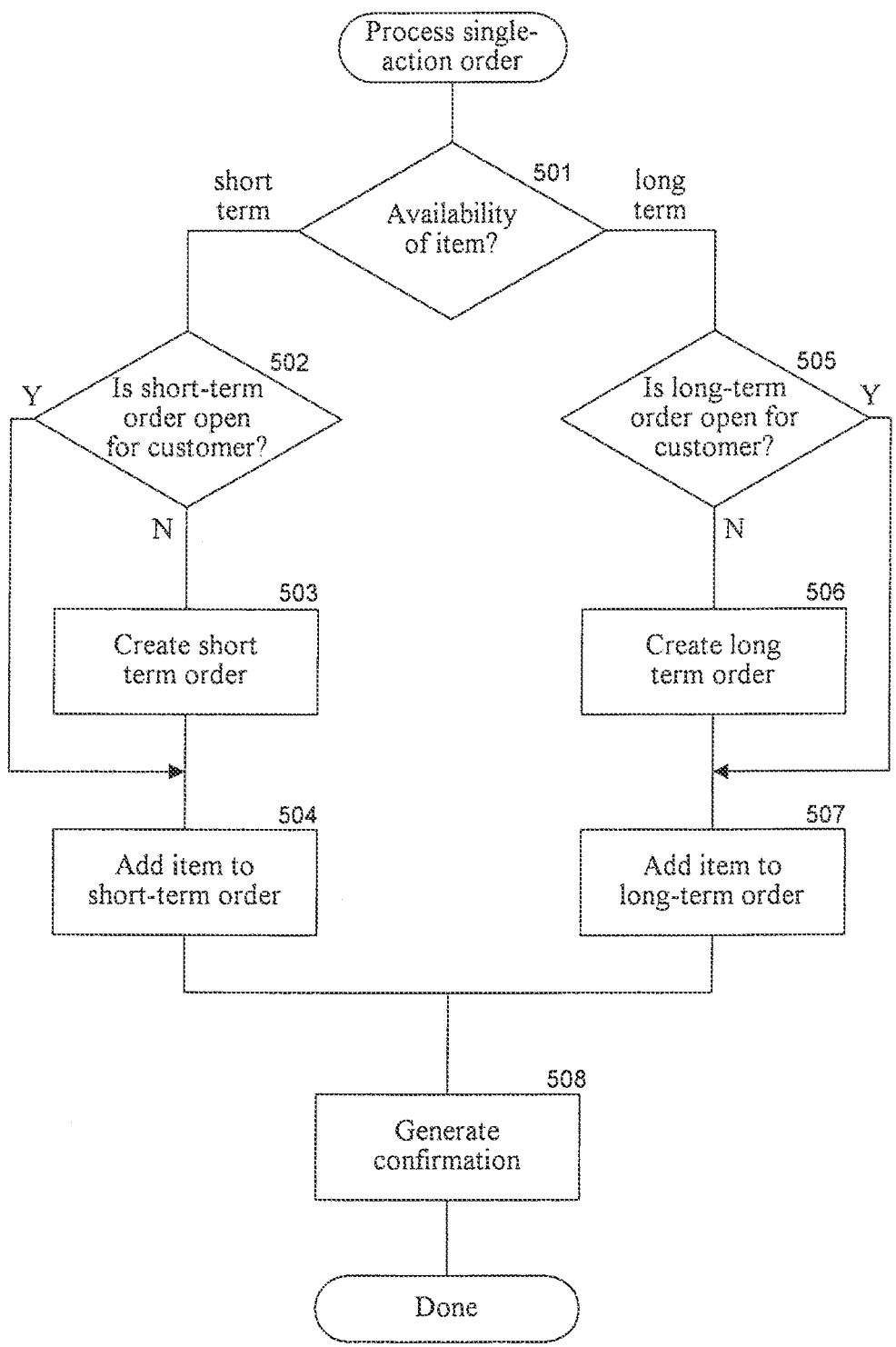
FIG. 5 is a flow diagram of an embodiment of a routine which processes a single-action order.

FIG. 5 is a flow diagram of an embodiment of a routine which processes a single-action order. When a purchaser performs the single action needed to place an order, the client system notifies the server system. The server system then combines the purchaser-specific order information for the customer associated with the client system with the item order information to complete the order. The single-action order may also be combined with other single-action orders and possibly with other conventionally placed orders to reduce shipping costs. In one embodiment, single-action orders can be combined if they are placed within a certain time period of each other (e.g., 90 minutes). This routine illustrates the combining of the single-action orders into a short-term order (e.g., available to be shipped in less than a week) and a long-term order (e.g., available to be shipped in more than a week). One skilled in the art would appreciate that the single-action orders can be combined in various ways based on other factors, such as size of shipment and intermediate-term availability. In step 501, if the item is expected to be shipped in the short term, then the server system continues at step 502, else the server system continues at step 505. In step 502, if a short-term order has already been opened for the purchaser, then the server system continues at step 504, else the server system continues at step 503. In step 503, the server system creates a short-term order for the purchaser. In step 504, the server system adds the item to the short-term order and continues at step 508. In step 505, if a long-term order has already been opened for the purchaser, then the server system continues at step 507, else the server system continues at step 506. In step 506, the server system creates a long-term order for the purchaser. In step 507, the server system adds the item to the long-term order. In step 508, the server system generates and sends the confirmation and completes.

Figure 6:
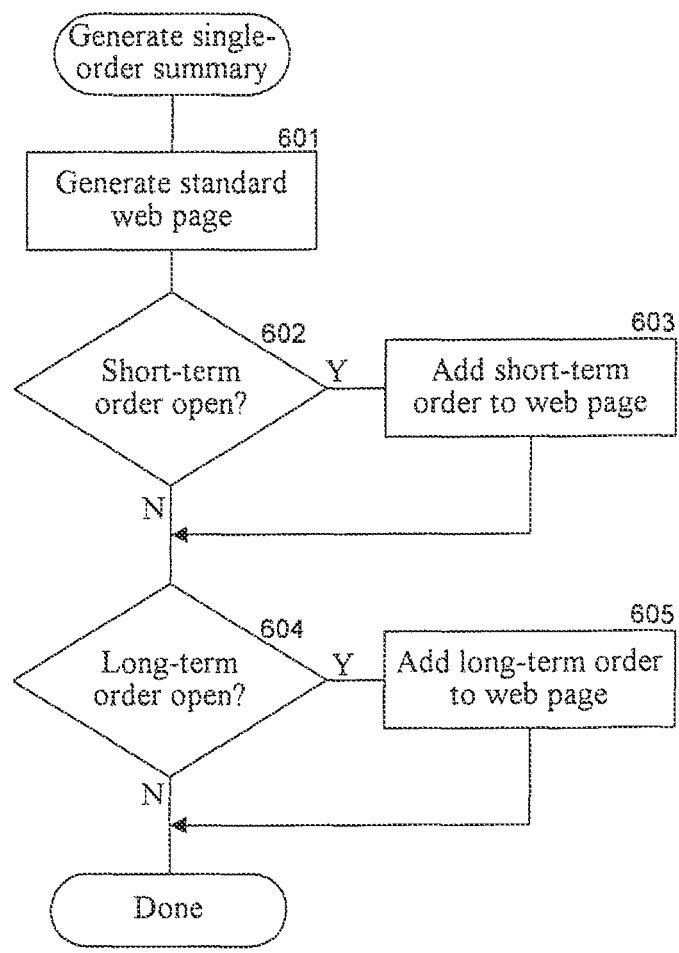
FIG. 6 is a flow diagram of an embodiment of a routine for generating a single-action order summary Web page.

FIG. 6 is a flow diagram of an embodiment of a routine for generating a single-action order summary Web page. This Web page (e.g., FIG. 1C) gives the user the opportunity to view and modify the short-term and long-term single-action orders. In step 601, the-server system adds the standard single-action order information to the Web page. In step 602, if a short-term order is open, then the server system adds the short-term order to the Web page in step 603. In step 604, if a long-term order is open, then the server system adds the long-term order information to the Web page in step 605 and completes.

Figure 7:
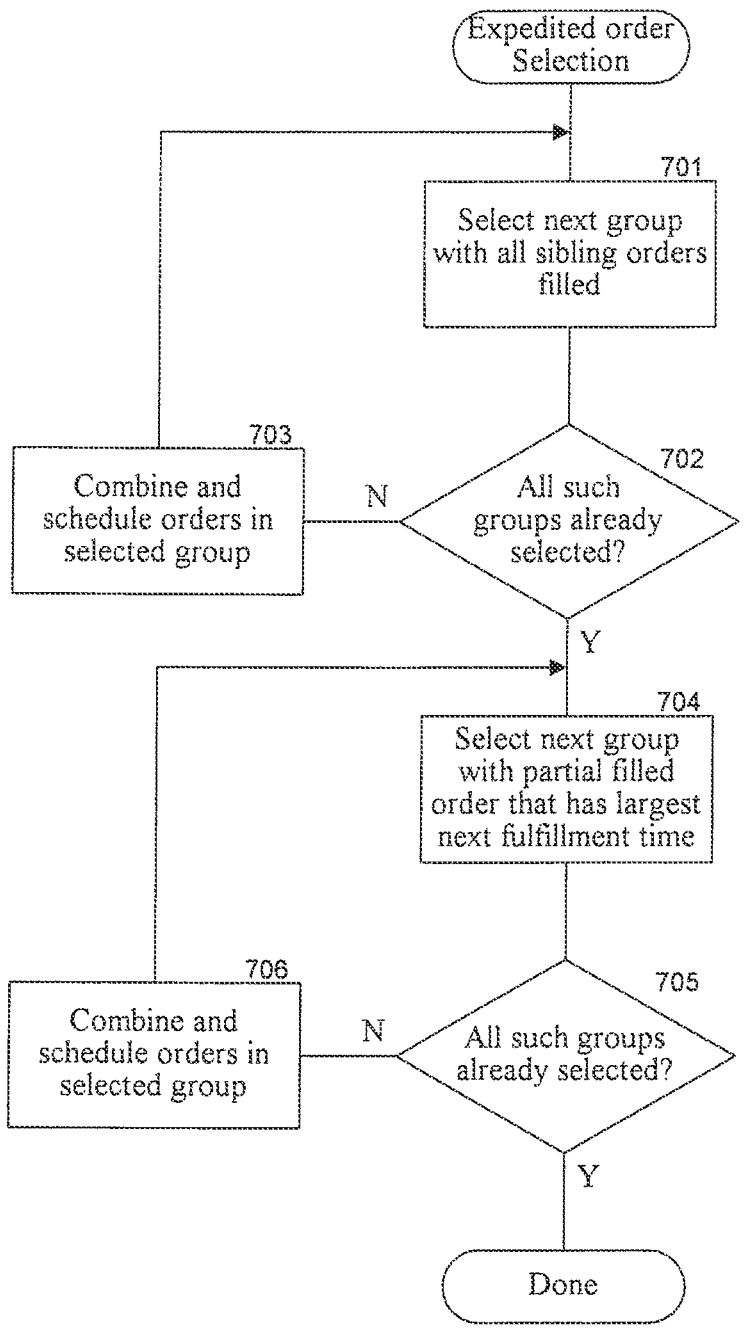
FIG. 7 is a flow diagram of an embodiment of a routine that implements an expedited order selection algorithm.

FIG. 7 is a flow diagram of an embodiment of a routine that implements an expedited order selection algorithm. The goal of the expedited order selection algorithm is to minimize the number of orders sent to each destination so that shipping costs are reduced. A destination may be a specific shipping address plus a specific purchaser's billing details. Orders that are sent to the same destination are known as "sibling orders." The algorithm has two stages. In the first stage, the algorithm schedules for shipment the orders for destinations for which all the sibling orders are filled. An order is filled when all its items are currently in inventory (i.e., available) and can be shipped. For each group of sibling orders, the algorithm combines those sibling orders into a single combined order so that only one order is currently scheduled for shipment to each destination. In the second stage, the algorithm combines and schedules groups of sibling orders for which some of the sibling orders are not filled or partially filled. The algorithm may split each partially filled sibling order into a filled sibling order and a completely unfilled sibling order. The algorithm then combines all the filled sibling orders into a single combined order and schedules the combined order tor shipment. If any group has only one sibling order and that order is partially filled, then the algorithm in one embodiment does not split that order to avoid making an extra shipment to that destination.

During the second stage, the algorithm may select and schedule groups of sibling orders in a sequence that is based on the next fulfillment time for an item in the group. The next fulfillment time for a group of sibling orders is the minimum expected fulfillment time of the items in that group of sibling orders. For example, if a group of sibling orders has seven items that are not yet fulfilled and their expected fulfillment times range from 3 days to 14 days, then the next fulfillment time for that group is 3 days. The algorithm first schedules those groups of sibling orders with the largest next fulfillment time. For example, if 6 groups have next fulfillment times of 3, 5, 7, 10, 11, and 14 days, respectively, then the algorithm first selects and schedules the sibling orders in the group with the next fulfillment time of 14 days, followed by the group with the next fulfillment time of 11 days, and so on. By delaying the scheduling of groups with short next fulfillment times, the algorithm increases the chances of additional items becoming available (because of the shortness of the next fulfillment time) and thus combined with the scheduled order.

Steps 701-703 represent the first stage of the expedited order selection algorithm, and steps 704-706 represent the second stage of the expedited selection order algorithm. In steps 701-703, the algorithm loops selecting groups in which all sibling orders are filled and combining the orders. In step 701, the algorithm selects the next group with all sibling orders that are filled. In step 703, if all such groups have already been selected, then the algorithm continues with the second stage. In step 704, else the algorithm continues at step 703. In step 703, the algorithm combines and schedules the orders in the selected group and loops to step 701. In step 704, the algorithm selects the next group of sibling orders that has the largest next fulfillment time. In step 705, if all such groups have already been selected, then the algorithm is done, else the algorithm continues at step 706. In step 706, the algorithm combines and schedules the orders in the selected group and loops to step 704. When the expedited order selection algorithm is being performed, new orders and new inventory may be received. Whenever such new orders and new inventory is received, then the algorithm restarts to schedule and combine the new orders as appropriate.

Although the algorithm has been described as having two stages, it could be implemented in an incremental fashion where the assessment of the first and second stages are redone after each order is scheduled. One skilled in the art would recognize that there are other possible combinations of these stages which still express the same essential algorithm.

FIGS. 8A-8C illustrate a hierarchical data entry mechanism in one embodiment. When collecting information from a user, a Web page typically consists of a long series of data entry fields that may not all fit onto the display at the same time. Thus, a user needs to scroll through the Web page to enter the information. When the data entry fields do not fit onto the display at the same time, it is difficult for the user to get an overall understanding of the type and organization of the data to be entered. The hierarchical data entry mechanism allows a user to understand the overall organization of the data to be entered even though the all data entry fields would not fit onto the display at the same time. FIG. 8A illustrates an outline format of a sample form to be filled in. The sample form contains various sections identified by letters A, B, C, and D. When the user selects the start button, then section A expands to include the data entry fields for the customer name and address. FIG. 8B illustrates the expansion of section A. Since only section A has been expanded, the user can view the data entry fields of section A and summary Information of the other sections at the same time. The user then enters data in the various data entry fields that are displayed. Upon completion, the user selects either the next or previous buttons. The next button causes section A to be collapsed and section B to be expanded so that financial information may be entered. FIG. 8C illustrates the expansion of section B. If the previous button is selected, then section A would collapse and be displayed as shown in FIG. 8A. This collapsing and expanding is repeated for each section. At any time during the data entry, if an error is detected, then a Web page is generated with the error message in close proximity (e.g., on the line below) to the data entry field that contains the error. This Web page is then displayed by the client system to inform the user of the error. In addition, each of the data "entry" fields may not be editable until the user clicks on the data entry field or selects an edit button associated with the data entry field. In this way, the user is prevented from inadvertently changing the contents of an edit field. When the user clicks on a data entry field, a sew Web page is presented to the user that allows for the editing of the data associated with the field. When editing is complete, the edited data is displayed in the data "entry" field. Because the fields of the form are thus not directly editable, neither "named-submit" buttons nor Java are needed. Also, the form is more compact because the various data entry options (e.g., radio button) are displayed only on the new Web page when the field is to be edited.

In other embodiments, a mechanism for giving a gift to an identified recipient(s) using a single action is provided. When information is displayed describing the item, the system displays an instruction to identify the recipient(s) and then to select a "give" button to effect the giving of the item to the identified recipient(s). If the user is giving the gift to only one recipient, then the user eaters identifying information, such as the email address, of the recipient. If the user is giving the gift to more than one recipient, the user could enter the identifying information of each recipient, or alternatively, the user could enter a group name that is associated with the identifying information for each member (i.e., recipient) of the group. The system uses the identifying information to identify a delivery address for the gift. As described in more detail below, the system can use various databases to locate information for an identified recipient.

Figure 9A:
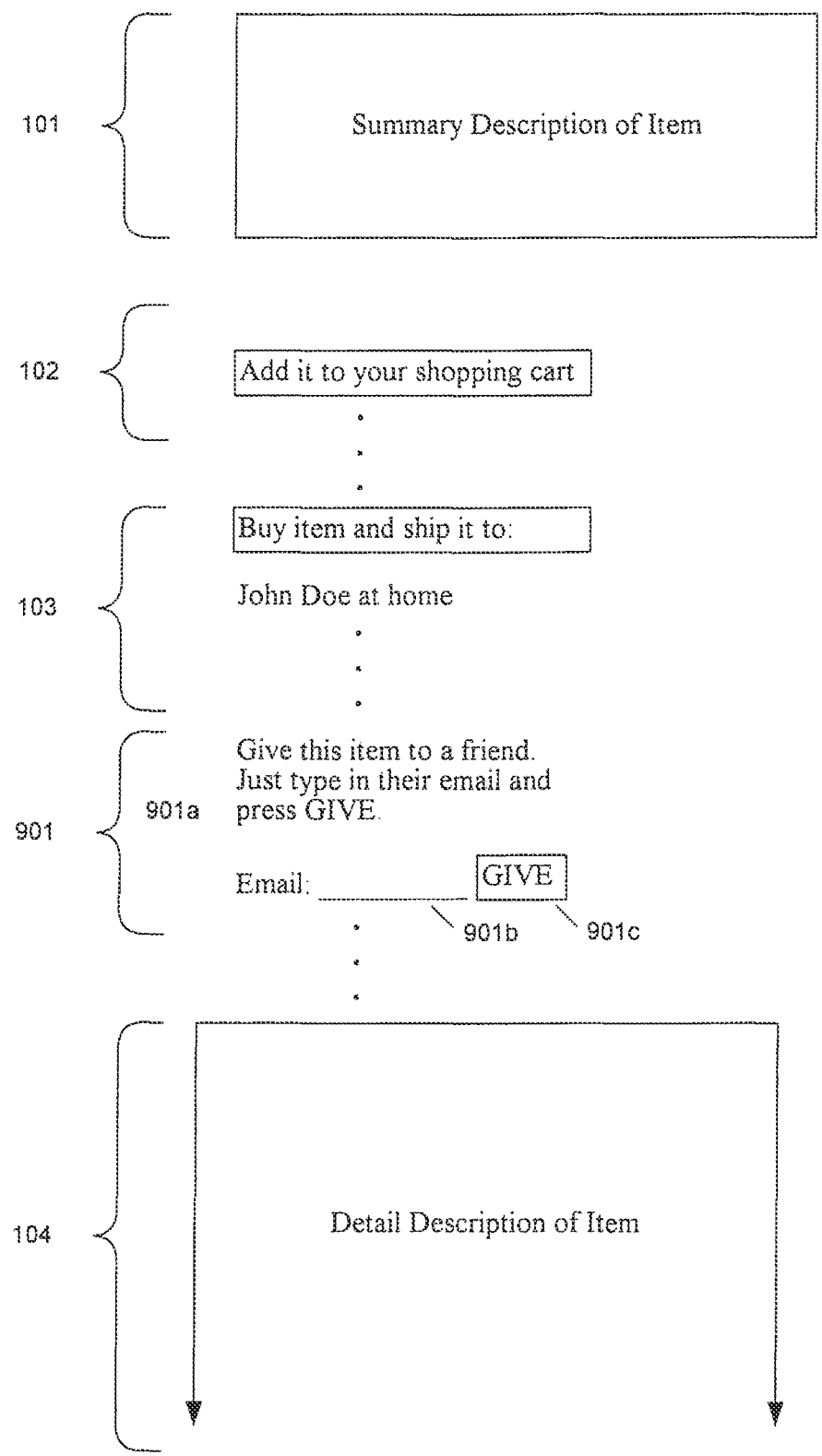
FIGS. 9A-9B illustrate one embodiment of the use of a single-action to give an item as a gift to one or more recipients.
Figure 9B:
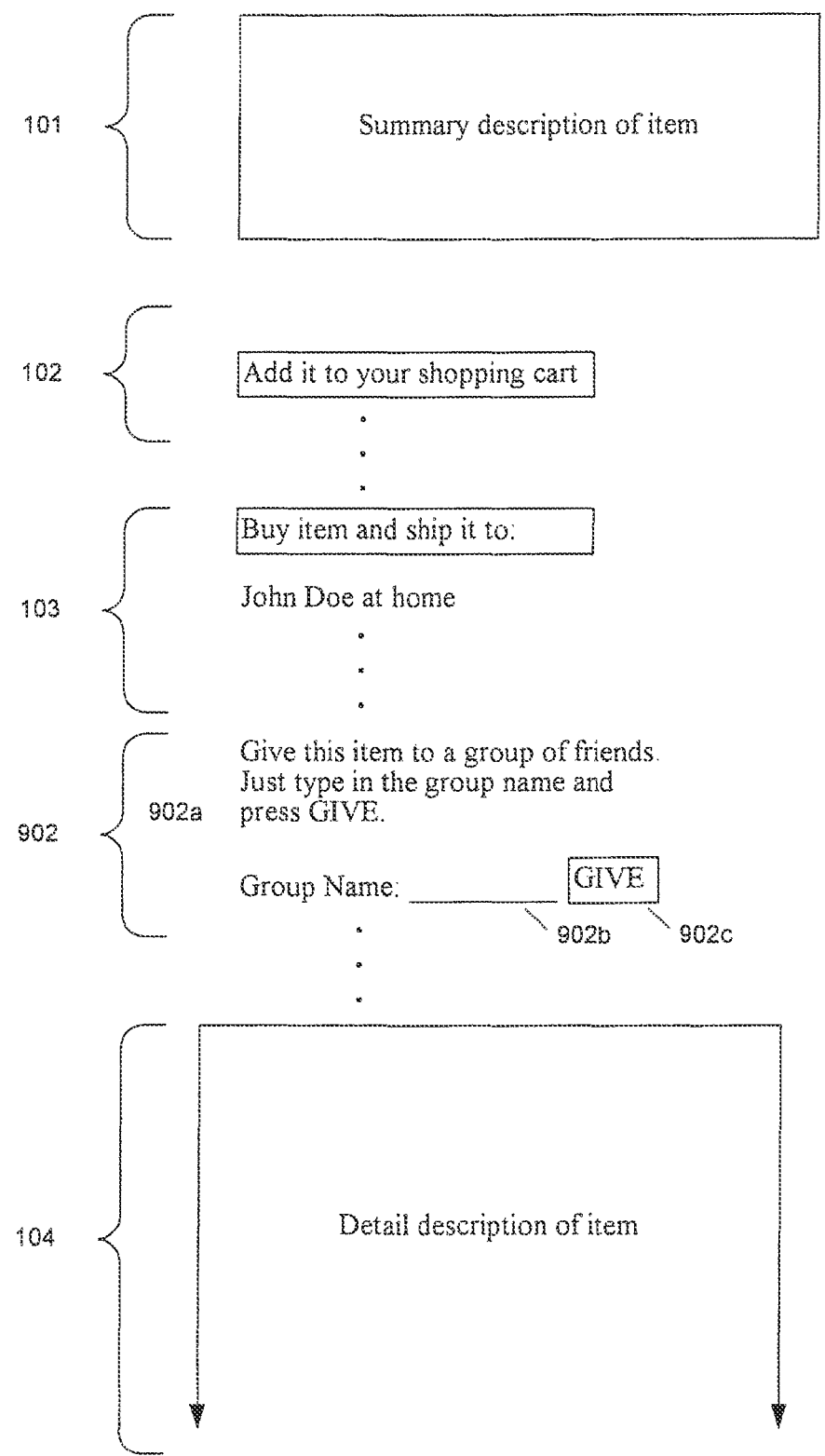

FIGS. 9A-9B illustrate one embodiment of the use of a single-action to give an item as a gift to one or more recipients. FIG. 9A illustrates the giving of a gift to one recipient. The sections 101-104 are the same as described for FIG. 1A. The gift giving section 901 contains an instruction subsection 901a, an identifying information subsection 901b, and a single-action giving subsection 901c. To effect the giving of the item to a recipient, the user enters the email address of the recipient in the identifying information subsection 90b and then selects the single-action giving subsection 901c. The system receives the email address and uses the email address to locate the delivery address for the recipient as described below in detail. The system bills the item to the user based on information stored for that user for single-action ordering and ships the item to the recipient at the delivery address. As described below, the system can allow many different types of identifying information to be specified by the user.

FIG. 9B illustrates the giving of a gift to multiple recipients. The gift giving section 902 contains an instruction subsection 902a, a group name subsection 902b, and a single-action giving subsection 902c. To effect the giving of the item to multiple recipients, the user inputs a name of the group that identifies the recipients into the group name subsection 902b and then selects the single-action giving subsection 902c. The system uses the group name to identify a list of recipients who are associated with the group name. FIG. 10 illustrates a grid for creation of a group and the entry of identifying information for recipients associated with the group (i.e., members). The user enters the group name in group name section 1001 and then enters information relating to the recipients in each row of the member information section 1002. The user can enter as much information about each recipient associated with the group as is known by the user. For example, the user may enter only the email address for some users, while entering the name, email address, and delivery address of other recipients. When the system is requested to give an item to each recipient associated with a group, the system uses the information stored for each recipient to identify additional information need to effect the delivery of the gift as described below. The system may also store the identified additional information for each recipient so that when another item is subsequently given to that recipient, the additional information needed to effect the delivery of the item can be quickly retrieved. Alternatively, a single address book for a user containing the information for all possible recipients can be maintained. The user specifies a group by indicating some of the recipients whose addresses are in the address book. The use of address books facilitates, the maintaining of multiple groups that have one or more recipients in common. In addition, a user can at any time provide additional information about a recipient to facilitate the retrieval of sufficient information to effect the delivery of an item.

A computer-based method and system for coordinating the delivery of gifts by receiving gift orders, collecting additional delivery information that is not specified in the gift orders, aid delivering gifts based on the additional delivery information is also provided. In one embodiment, the gift delivery system receives gift orders via Web pages provided on the WWW. The gift orders specify a gift that is to be delivered to a recipient. The recipient may be identified by information that does not include the delivery address of the recipient For example, the recipient may be only identified by a name and contact information such as an electronic mail address or a telephone number. The gift delivery system attempts to contact the recipient to obtain sufficient delivery information. If the contact is not successful, the gift delivery system searches various databases of information to identify additional contact information. If sufficient delivery information is obtained, the gift is delivered to the recipient and the gift giver is notified accordingly. If, however, sufficient delivery information cannot be obtained, the gift giver is notified that the gift cannot be delivered.

Figure 11:
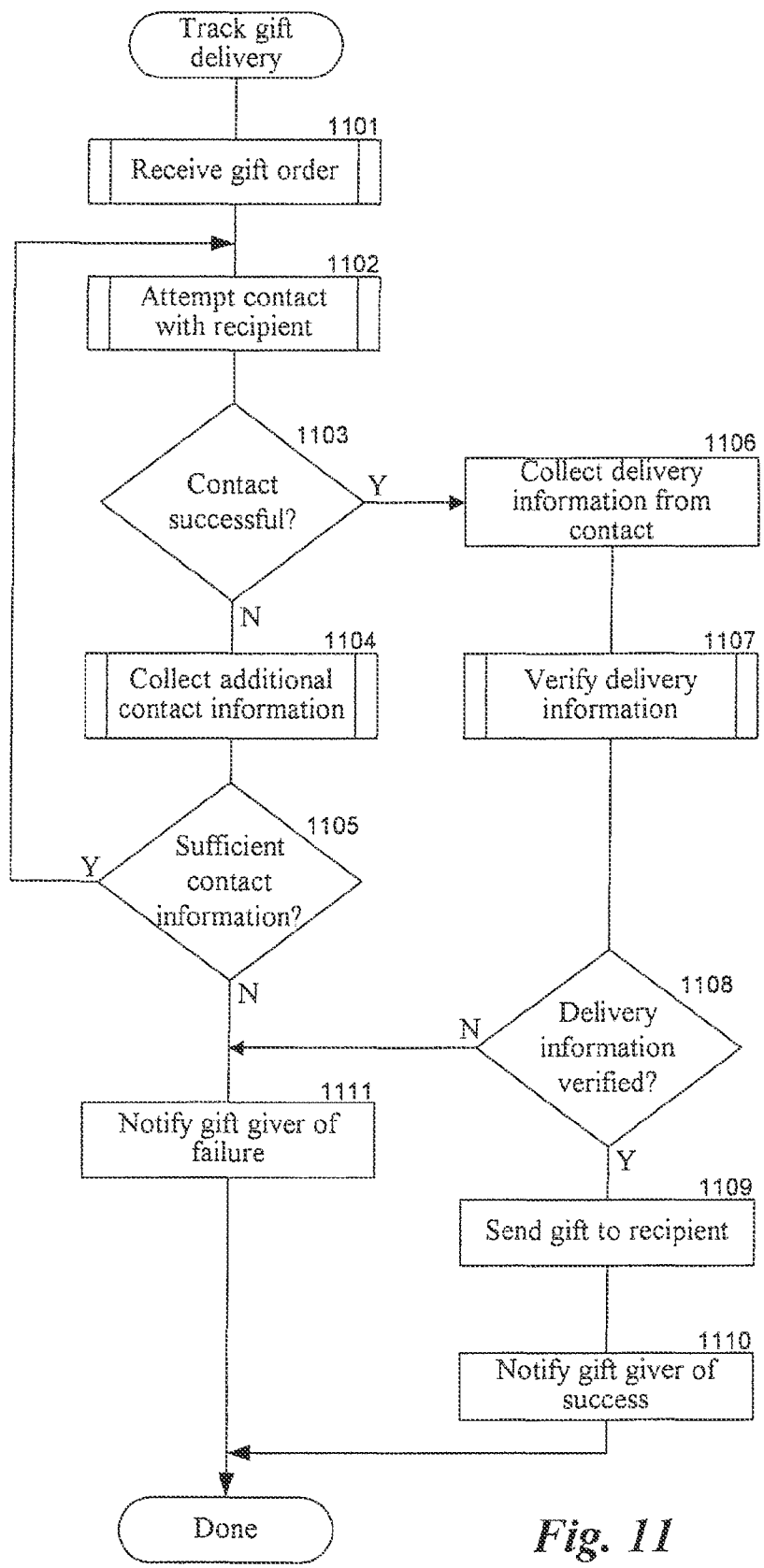
FIG. 11 is a flow diagram of an embodiment of the overall flow of the gift delivery system.

FIG. 11 is a flow diagram of an embodiment of the overall flow of the gift delivery system. In step 1101, the gilt delivery system receives the order for a gift from a gift giver. In one embodiment, the order is received via access through a Web page, but may also be received via other modes of communication, such as a voice telephone call, postal mail, facsimile, or electronic mail. In step 1102, the gift delivery system attempts to contact the recipient of the gift. The gift order may specify contact information for the recipient, such as an electronic mail address or a telephone number of the recipient. Based on the contact information provided with the gift order, an attempt via electronic mail or an automated voice telephone call is made to initially contact the recipient and gather sufficient delivery information. Alternatively, a person may attempt to make a voice telephone contact with the recipient. In step 1103, if the initial contact is successful, then the system continues at step 1106, else the system continues at step 1104. In step 1104, the system attempts to collect additional contact information. The system can obtain the additional contact information through various database sources using the information provided with the gift order. For example, the system can use the recipient's name or the recipient's electronic mail address to access Internet-based database systems. In step 1105, if the system obtains additional contact information from these additional sources, then the system loops to step 1102 to attempt to contact the recipient using the additional contact information, else the system continues at step 1111. In step 1106, the system collects delivery information from the successful contact. For example, if the successful contact is a phone call, the operator making the phone call preferably enters the delivery information. If the successful contact is an electronic mail exchange, the system preferably parses the recipient's reply message to collect the delivery information. In step 1107, the system verifies that the delivery information is correct. The system may use various databases, which contain lists of all proper street addresses, to verify the address. In step 1108, if the delivery information is verified, then the system continues at step 1109 to send the gift to the recipient, else the system continues at step 1111. In step 1109, the system sends the gift to the recipient. In step 1110, the system sends an electronic mail to the gift giver providing notification that the gift has been sent successfully. In step 1111, if sufficient delivery information could not be gathered or the delivery information could not be verified, then the system sends a message (e.g., via electronic mail) to the gift giver providing notification that the gift could not be delivered and is being placed on hold.

In an additional embodiment (not shown), if an attempt to contact the recipient is unsuccessful in step 1103, then the system attempts to obtain additional delivery information for the recipient from sources other than the recipient, such as databases and other sources similar to those discussed below in conjunction with FIG. 8. If the system is able to obtain sufficient delivery information for the recipient in tins manner, the system preferably sends the gift to the recipient using the obtained delivery information.

Figure 12:
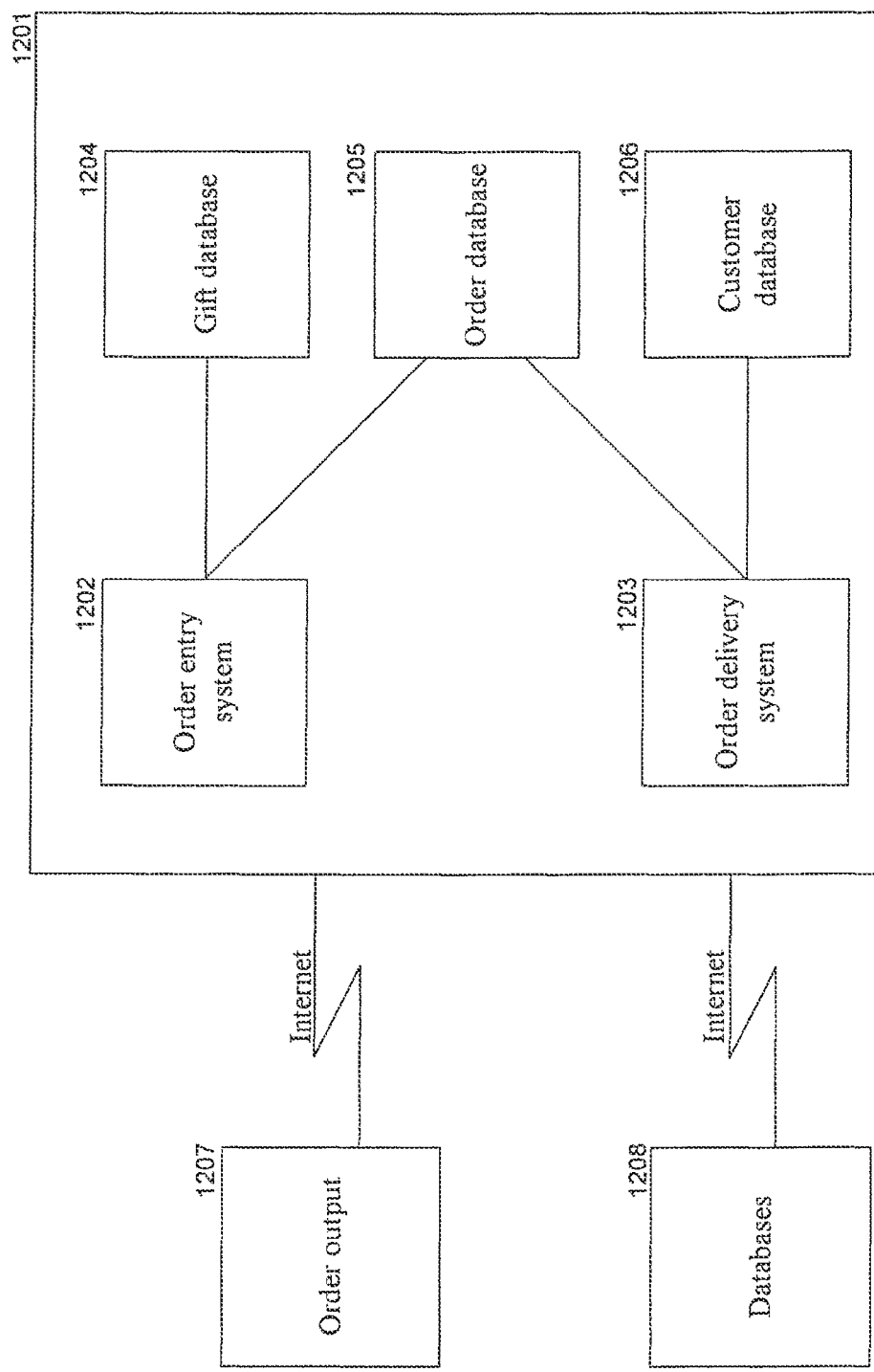
FIG. 12 is a block diagram illustrating the components of an embodiment of the gift delivery system.

FIG. 12 is a block diagram illustrating the components of an embodiment of the gift delivery system. Computer system 1201 contains a central processing unit, memory, and peripheral devices, such as a disk drive and CO-ROM. The gift delivery system includes an order entry system 1202 and an order delivery system 1203. The order entry system provides a user interface for a gift giver to input a gift order. The order entry system in one embodiment comprises a Web page that accesses a gift database 1204. The gift giver uses the Web page provided to select which gift should be sent to the recipient. In addition, the gift giver provides information describing the recipient. The order entry system then stores the order information in the order database 1205. The gift delivery system controls the locating of additional delivery information so that the gift can be successfully delivered to the recipient. The gift delivery system retrieves information from the order database and attempts to contact the recipient based on the information provided with the gift order. If the recipient cannot be contacted based on that information, then the gift delivery system accesses other database sources, such as the customer database 1206 and internet-based databases 1208 to gather additional contact information for the recipient.

Figure 13:
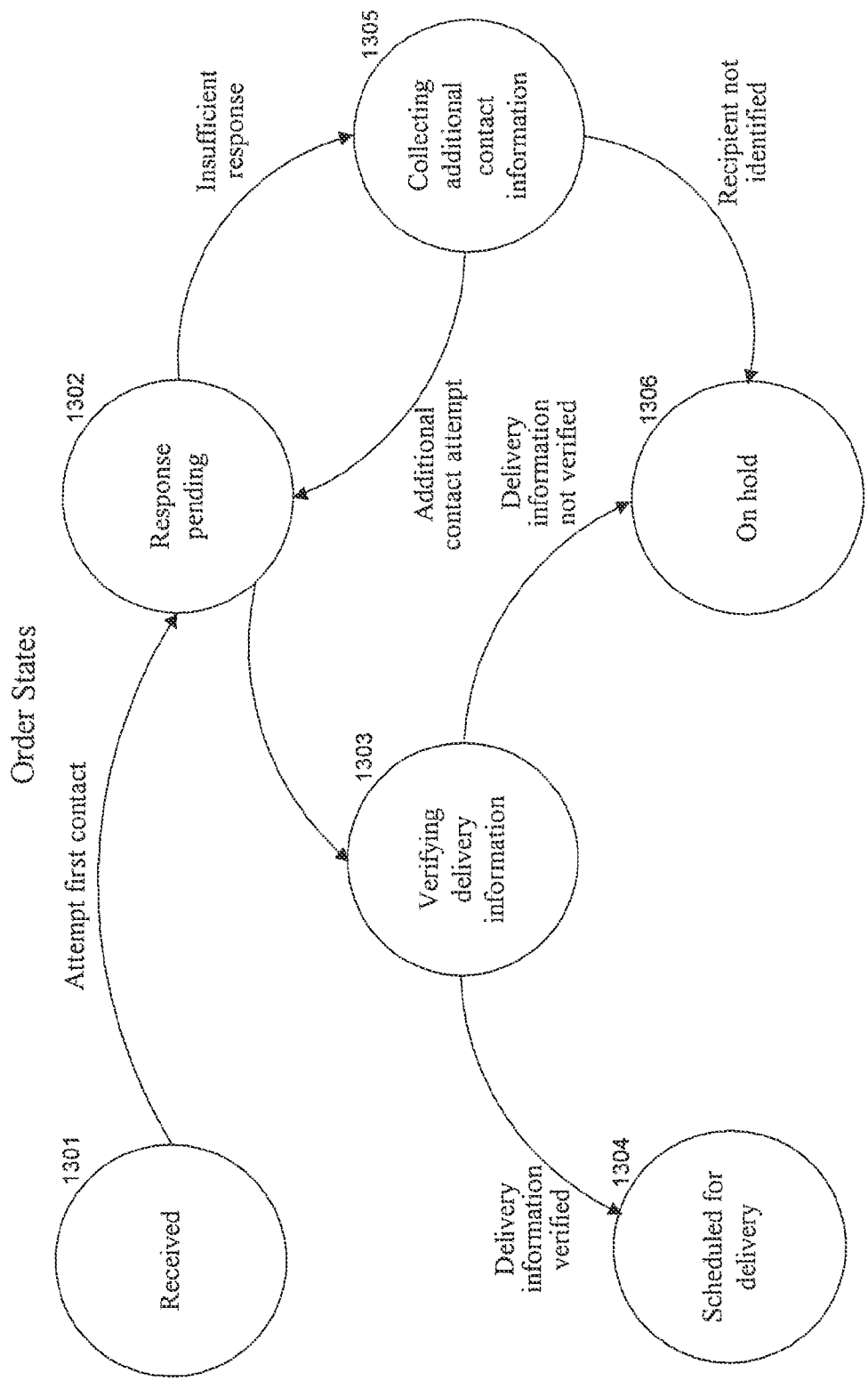
FIG. 13 is a state diagram illustrating the various states of a gift order in one embodiment.

FIG. 13 is a state diagram illustrating the various states of a gift order in one embodiment. A gift order can be in one of six states: received, response pending, verifying delivery information, collecting additional contact information, on hold, and scheduled for delivery. Initially, when an order is received, the system places the order in the received state 1301. When the system attempts to contact the recipient using the information provided by the gift giver, the gift order changes to a response pending state 1302. The response pending state indicates that the attempt to contact is in progress, but no response has yet been received from the recipient. If a sufficient response is received from the recipient in the allotted time (e.g., 24 hours), then the gift order changes to the verifying delivery information state 1303. In the verifying delivery information state, the system attempts to verify that the delivery information is correct. If the delivery address is correct, then the gift order enters the scheduled for delivery state 1304. If the initial response was insufficient or not received in the allotted time, then the system places the gift order in the collecting additional contact information state 1305. In the collecting additional contact information state, the system searches additional sources of information to determine additional contact information about the recipient. If additional contact information can be found, then the system attempts an additional contact, and places the gift order in the response pending state 1302. If, however, additional contact information cannot be found, then the system places the gift order in the on hold state 1306.

In a further preferred embodiment, if the initial response is insufficient, then the system places the gift order in a collecting additional delivery information state (not shown). In the collecting additional delivery information state, the system searches additional sources of information to obtain additional delivery information for the recipient. If the system is able to obtain sufficient delivery information in this manner, then the system places the gift order in the verify delivery information state 1303. Otherwise, the system places the gift order in the on hold state 1306.

Figure 14:
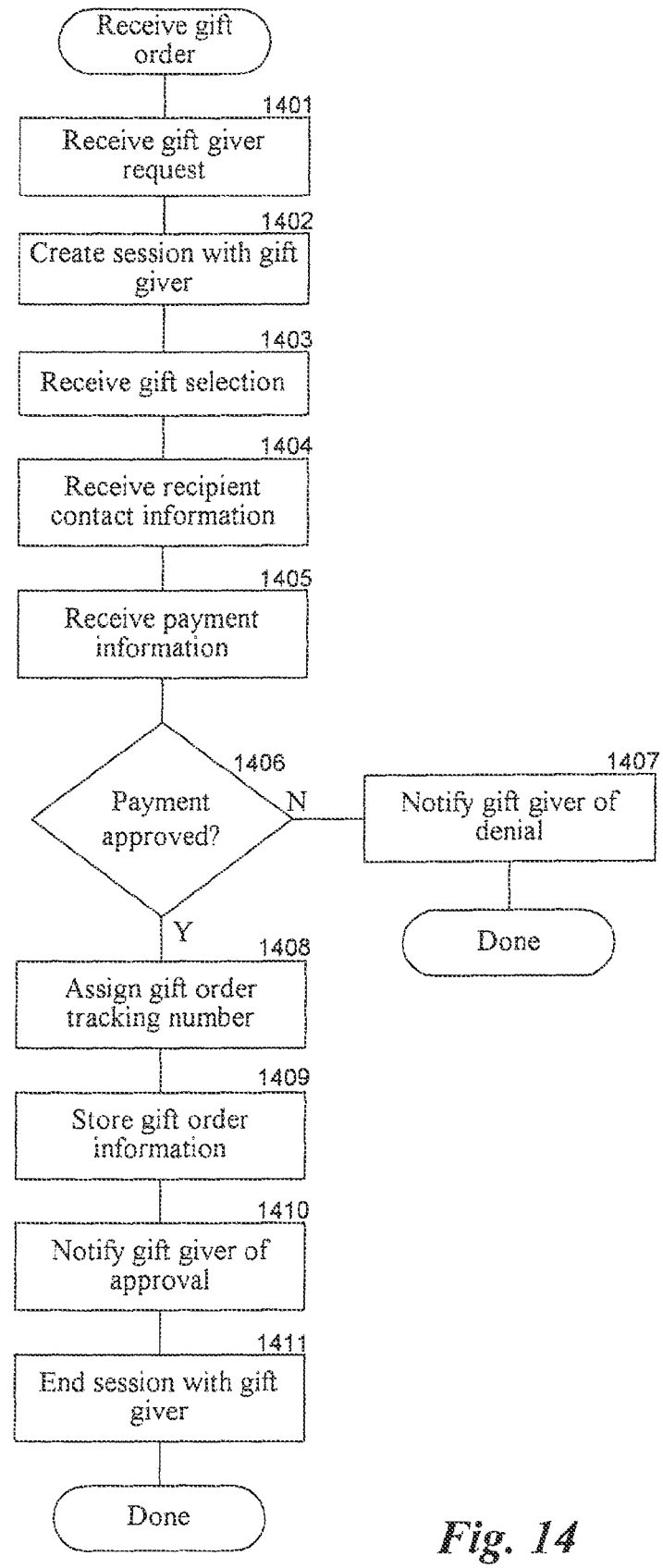
FIG. 14 is a flow diagram of an embodiment of a routine that controls the receiving of gift orders.

FIG. 14 is a flow diagram of an embodiment of a routine that controls the receiving of gift orders. The receive gift order routine controls the interaction with the gift giver to select a gift from the gift database, to receive information on the recipient, to receive the payment, and to store the gift order in a database. This routine processes gift orders received electronically. One skilled in the art would appreciate that similar routines could be developed to handle other forms of receiving gift orders. In step 1401, the routine receives a request to send a gift from a gift giver to a recipient electronically via a Web page. In step 1402, the routine creates a session with the gift giver. The session is used to track the interaction with the gift giver and the gift delivery system. In step 1403, the routine receives the gift selection information. The gift selection information may be selected in response to a display of available gifts from the gift database. In step 1404, the routine receives recipient contact information from the gift giver. The recipient contact information may typically include the recipient's name and electronic mail address. In step 1405, the routine receives payment information. The payment information may be in an electronic form, such as a credit card, debit card, or digital cash, or in a conventional form, such as check or money order. If in conventional form, the gift order may be placed in an additional state waiting for receipt of the payment. In step 1406, if the payment is approved, then the routine continues at step 1408, else the routine notifies the gift giver that the payment has been denied. In step 1408, the routine assigns a gift order tracking number to the gift order. The gift order tracking number Is used by the system to identify the gift, order throughout its processing. In step 1409, the routine stores the gift order information in the gift order database. In step 1410, the routine notifies the gift giver that the gift order has bees accepted. In step 1411, the routine ends the session with the gift giver.

Figure 15:
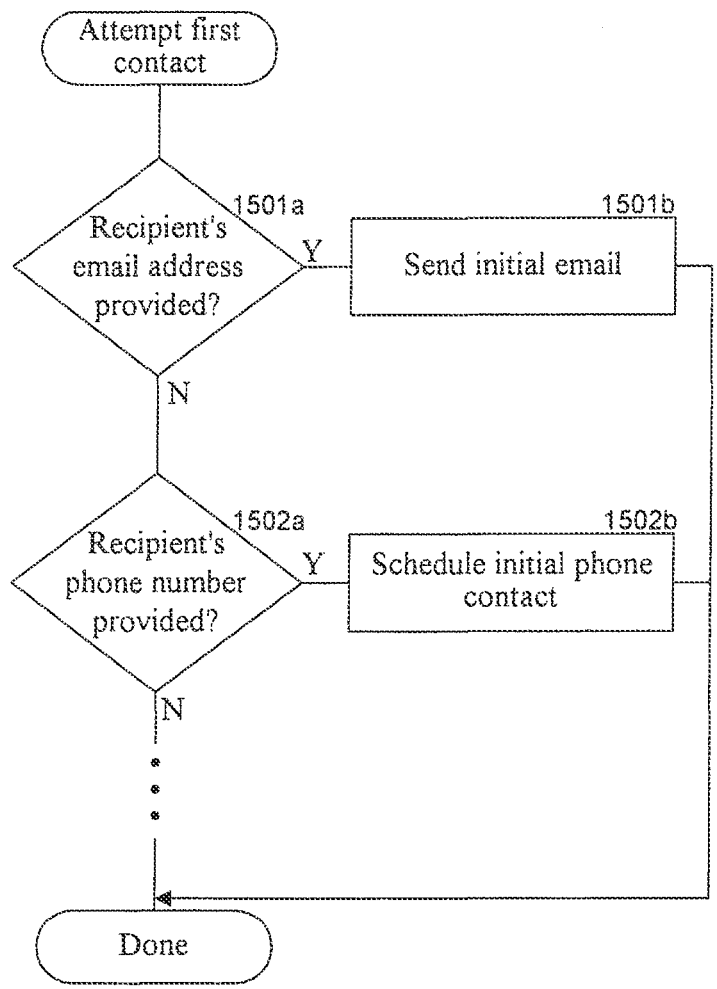
FIG. 15 is a flow diagram of an embodiment of a routine that controls the attempt at first contact of the recipient.

FIG. 15 is a flow diagram of an embodiment of a routine that controls the attempt at first contact of the recipient. The first contact is made with contact information provided by the gift giver, such as electronic mail address and telephone number. If sufficient information is not provided to even attempt to contact the recipient initially, the gift delivery system searches various databases to obtain such information based on the recipient's name. In step 1501*a*, if the recipient's electronic mail address has been provided in the gift order, then the routine continues at step 1501*b*, else the routine continues at step 1502*a*. In step 1501*b*, the routine sends an electronic mail to the electronic mail address provided. The electronic mail contains information indicating that a gift is to be sent to the recipient and requests delivery information for the gift. The electronic mail includes the tracking number assigned by the system so that when a reply mail is received, the gift delivery system can determined to which gift order it corresponds. In step 1502*a*, if the recipient's phone number has been provided, then the routine continues at 1502*b*, else the routine continues various other attempts to contact the recipient. For example, if a facsimile number was provided, a facsimile message is sent to the number. In step 1502*b*, the routine schedules an initial telephone contact with the recipient. The initial telephone contact could be via an automated voice telephone system in which a message is left with the person answering the phone or with an answering machine. Alternatively, a human operator may make the initial voice contact. After the initial contact is made, the gift order is placed in response pending state.

Figure 16:
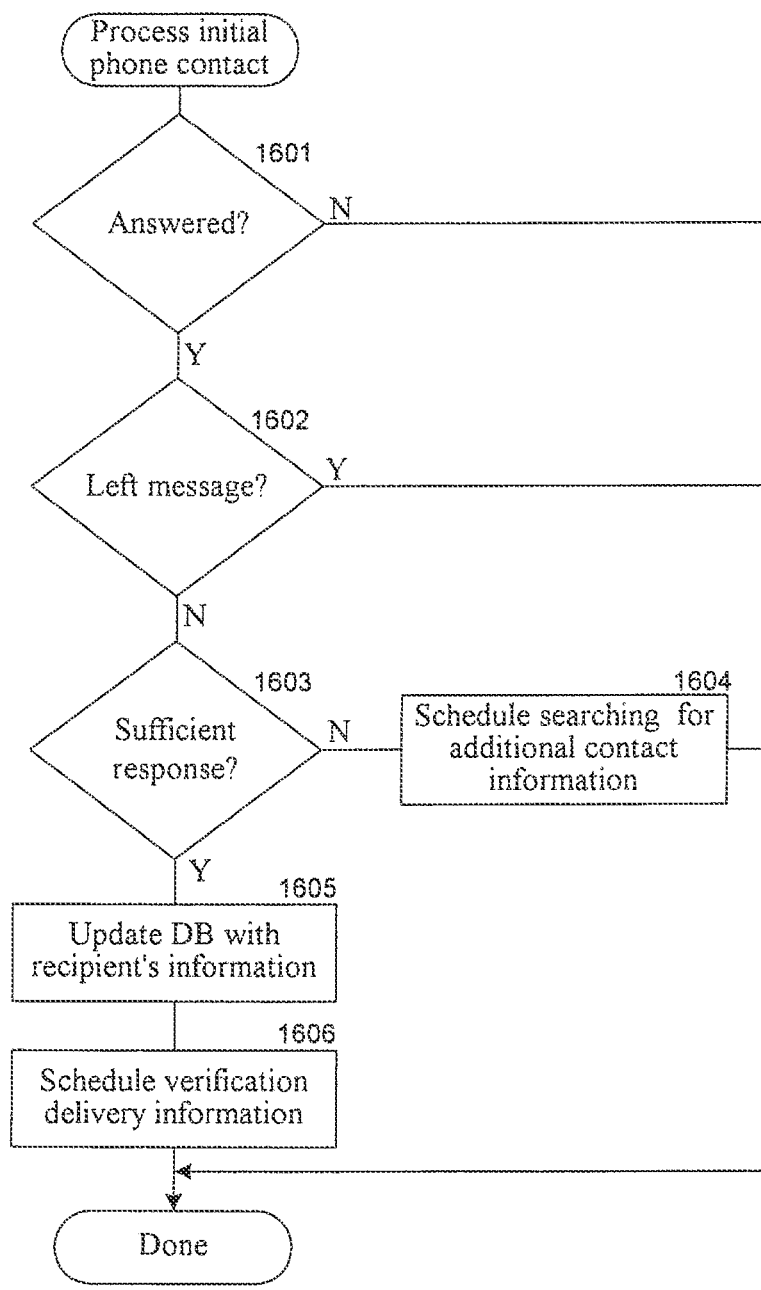
FIG. 16 is a flow diagram of an embodiment of a routine that controls the processing of the initial voice telephone contact.

FIG. 16 is a flow diagram of an embodiment of a routine that controls the processing of the initial voice telephone contact. This routine can either display information for a human operator or provide information to an automated operator. In step 1601, if the telephone has been answered, then the routine continues at step 1602, else the routine leaves the gift order still scheduled for initial contact. In step 1602, if a message is left either with a person or a voicemail system, then the routine continues at step 1603, else the routine leaves the gift order still scheduled for initial contact. In step 1603, if a sufficient response has been received, then the routine continues at step 1605, else the routine continues at step 1604. In step 1604, the routine schedules the gift order for searching for additional contact information relating to the recipient. In step 1605, the routine updates the order database with the additional information about the recipient. In step 1606, the routine schedules the gift order to have its delivery information verified and changes its state to verifying delivery information.

Figure 17:
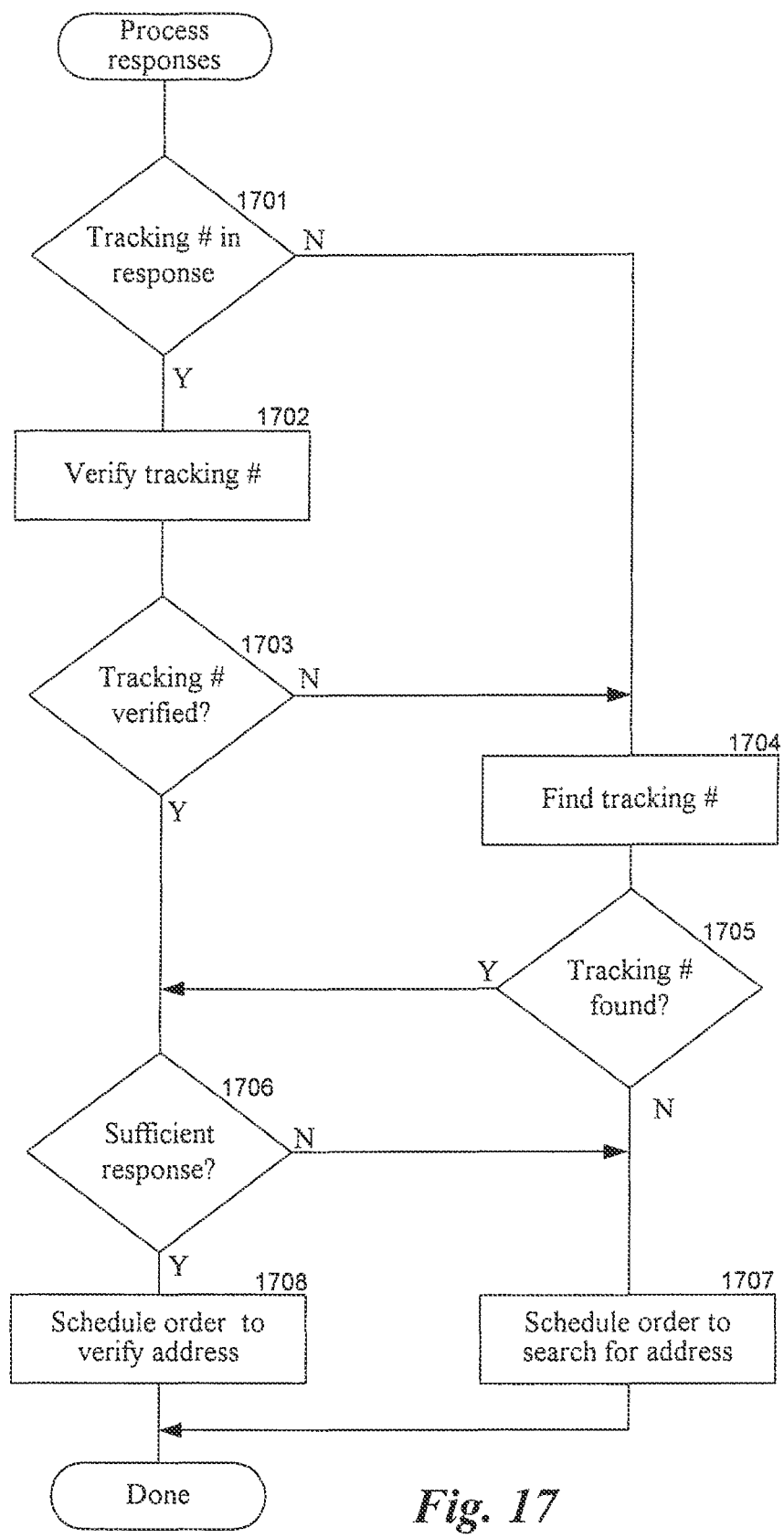
FIG. 17 is a flow diagram of an embodiment of a routine that controls the processing of the initial response.

FIG. 17 is a flow diagram of an embodiment of a routine that controls the processing of the initial response. The initial response can be via electronic mail, voice telephone, or facsimile message. In step 1701, if the tracking number is included in the response, then the routine continues at step 1702, else the routine continues at step 1704. In step 1702, the routine verities the tracking number using the gift order database. In step 1703, if the tracking number has been verified, then the routine continues at step 1706, else the routine, continues at step 1704. In step 1704, the routine attempts to find the tracking number based on the information provided in the response. In step 1705, if the tracking number can be found, then the routine continues at step 1706, else the routine continues at step 1707. In step 1706, if the response contains sufficient delivery information so that the gift order can be delivered, then the routine continues at step 1708, else the routine continues at step 1707. In step 1707, the routine schedules the order for searching for additional delivery information. In step 1708, the routine schedules the order to have its delivery information verified and changes its state to verify delivery information.

Figure 18:
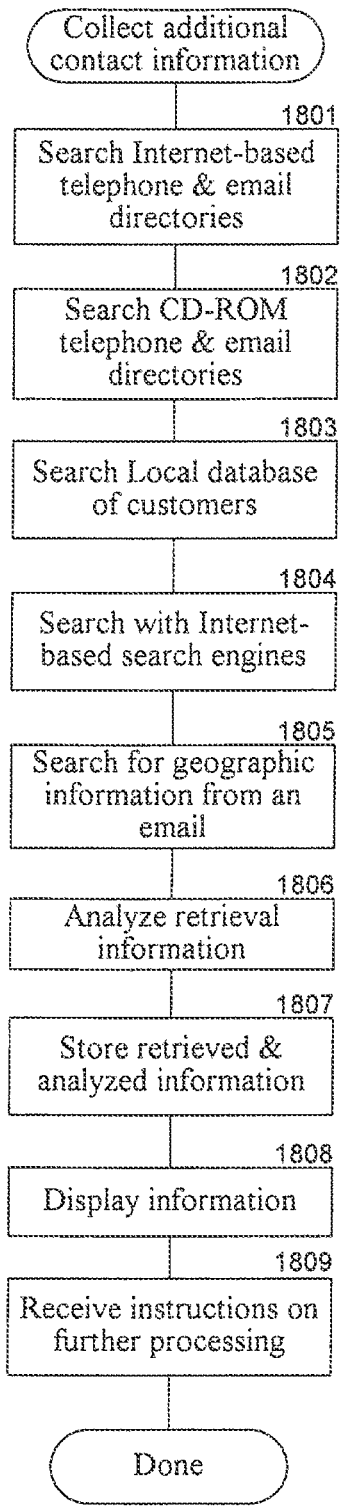
FIG. 18 is a flow diagram of an embodiment of a routine that controls the collecting of additional contact information.

FIG. 18 is a flow diagram of an embodiment of a routine that controls the collecting of additional contact information. This routine searches various database sources based on the information provided in the gift order. For example, in step 1801, the routine searches Internet-based telephone and electronic mail directories, such as Switchboard, Four11, and Accumail. In step 1802, the routine searches various CD-ROM. databases of telephone and electronic mail information, such as SelectPhone. In step 1803, the routine searches the local database of customer information. The local database of customer information contains information of previous recipients and gift givers. In step 1804, the routine searches various Internet-based search engines, such as Digital Equipment's Alta Vista or Infoseek's Ultraseek. In step 1805, the routine uses the electronic mail address or telephone number to identify the geographic location of the recipient. In particular, the routine accesses the InterNIC Registration Services of Network Services for the domain name registration of the recipient's electronic mail address. Alternatively, the routine accesses the standard table of area codes and telephone number prefixes to determine the geographic locale of the recipient. The gift delivery system can use each of these information sources, a subset of these information source, or additional information source to locate the additional information. In step 1806, the routine analyzes the retrieved information to determine the information that most likely corresponds to the recipients based on geographic or contextual matches. This analysis may be done electronically or interactively with a human operator. In step 807, the routine stores the retrieved and analyzed information and the gift order database. In step 808, the routine displays the information to a human operator and requests instructions on further processing. The instructions can either be to place the order on hold because sufficient delivery information has not been collected, send an initial contact to the recipient, or proceed with delivery of the gift.

Figure 19:
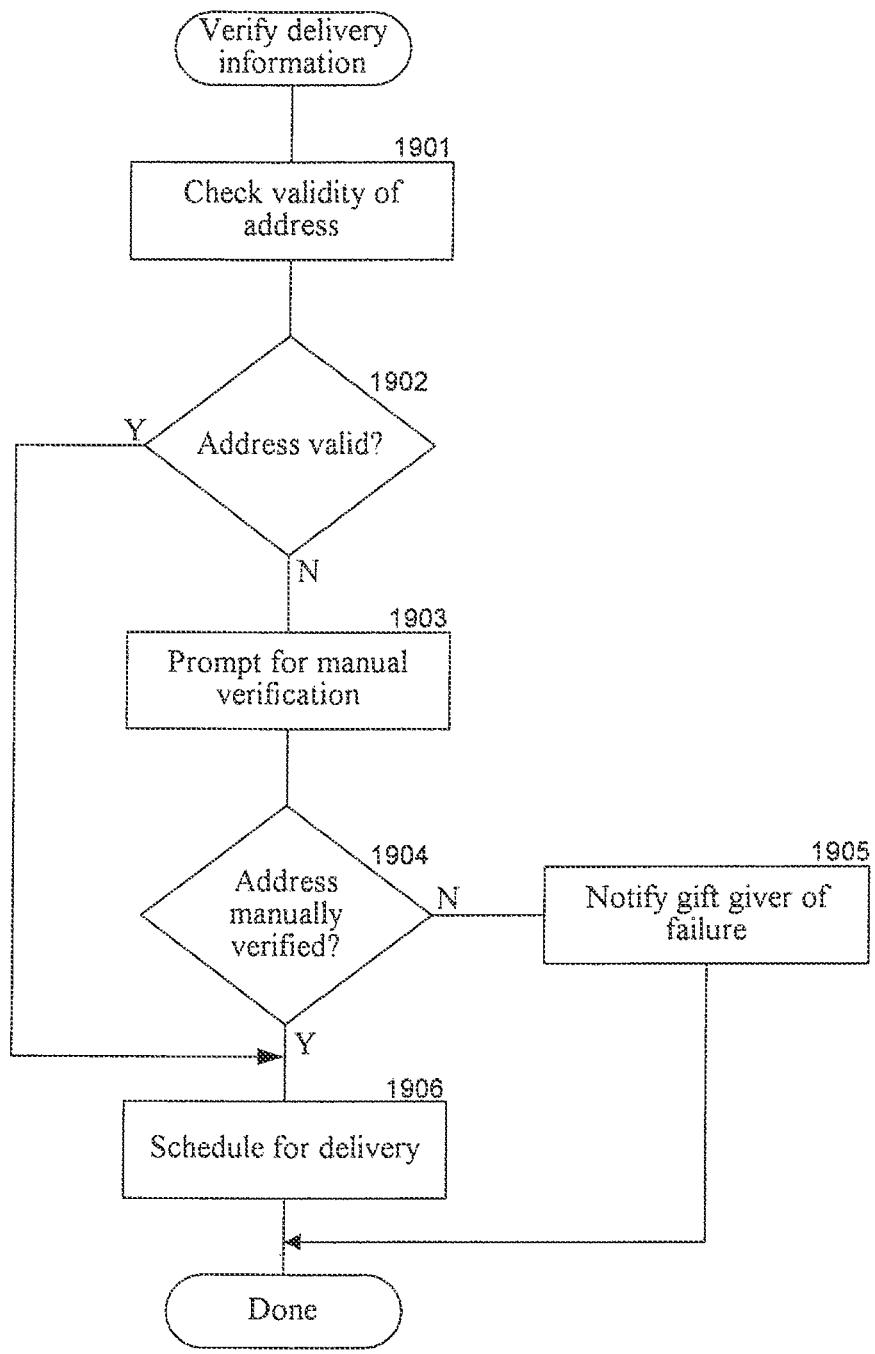
FIG. 19 is a flow diagram of an embodiment of a routine that controls the verifying of the delivery information.

FIG. 19 is a flow diagram of an embodiment of a routine that controls the verifying of the delivery information. The gift delivery system verifies the delivery information to ensure that the gift is being sent to a deliverable address. In step 1901, the routine checks the validity of the delivery information automatically. The routine uses a database of U.S. Postal Service addresses to determine whether the-delivery address is a valid U.S. Postal Service address. In step 1902, if the address is valid, then the routine continues at step 1906, else the routine continues at step 1903. In step 1903, the routine prompts a human operator for manual verification of the address. In step 1904, if the operator has manually verified the address, then the routine continues at step 1906, else the routine continues at step 1905. In step 1905, the routine notifies the gift giver that the order cannot be fulfilled and places the order on hold. In step 1906, the routine schedules the gift for delivery and notifies the gift giver accordingly.

Thus, an item can be ordered In a variety of ways. Ordering of items is discussed in U.S. patent Ser. No. 09/151,617, filed Sep. 11, 1998, which is hereby incorporated by reference and which is a continuation-in-part of U.S. patent Ser. No. 09/046,503, filed on Mar. 23, 1998, now abandoned, and U.S. patent Ser. No. 08/928,951, filed on Sep. 12, 1997, U.S. Pat. No. 5,960,411.

In some embodiments, multi-procurement option ordering of an item is provided in which multiple alternatives for completing the ordering of the item are available. In particular, each user can have multiple defined procurement options, and a selection or indication of one of those procurement options can be sufficient to complete the ordering of the item without further action by the user if that procurement option contains sufficient information. Alternately, a single-action ordering can be used to indicate the ordering of the item without further action by the user, but the information of a currently selected procurement option will be used to complete the ordering. Each procurement option can have a unique set of purchaser-specific order information (e.g., payment information, delivery address, delivery instructions, shipping instructions, wrapping instructions, etc.), can have a unique moniker (e.g., a short name such as "home," partial payment information, partial delivery address information, recipient name, etc.), and can have a variety of types of recipients (e.g., the user, an individual other than the user, a group of recipients, etc.) to whom an ordered item will be delivered. In some embodiments, each user can have one of their procurement options designated as their primary or default procurement option.

In addition, in some embodiments a user can perform ordering of an item using a new or a partially specified procurement option. In such embodiments, the user can specify only a minimal amount of information needed to determine a delivery address (e.g., a name or other identifier for the recipient), and related information can be automatically retrieved (e.g., determining, the delivery address based on a specified recipient identifier) and/or previously specified default information for the other portions of the procurement option (e.g., default shipping instructions and payment information) can be used to complete the ordering.

Figure 20A:
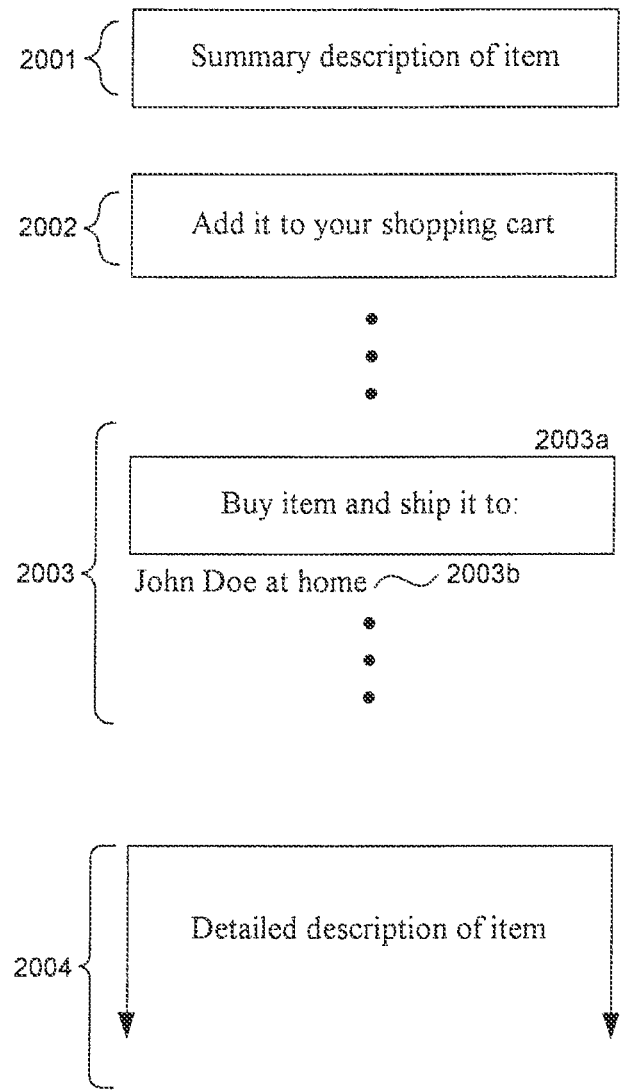
FIGS. 20A-20D illustrate an embodiment of multi-procurement option ordering.

FIGS. 20A-20D illustrate one embodiment of multi-procurement option ordering. FIG. 20A illustrates the display of a Web page describing an item that may be ordered. This example Web page was sent from a server system to a client system when the user requested to review detailed information about the item. The Web page contains a summary description section 2001, a shopping cart section 2002, a multi-procurement option ordering section 2003, and a detailed description section 2004. One skilled in the art will appreciate that these various sections can be omitted or rearranged or adapted in various ways. The user need only be aware of the item or items to be ordered and of an action (e.g., a single action) needed to select a procurement option in order to place the order. The summary description and the detailed description sections provide information that identifies and describes the one or more items that may be ordered. The shopping cart section provides a conventional capability to add the described item to the shopping cart. The server system adds the summary description, the detailed description, and the shopping cart sections to each Web page for an item that may be ordered. The server system, however, may add the multi-procurement option ordering section only when multi-procurement option ordering is enabled for that user at that client system. One skilled in the art will appreciate that a single Web page on a server system may contain all these sections, and that the multi-procurement option ordering section can be selectively included or excluded before sending the Web page to the client system.

When an indication of one or more of the multiple procurement options are displayed, the illustrated multi-procurement option ordering section allows the user to specify one of the procurement options, such as with, a single action (e.g., a single click of the mouse button), to order the described item. Once the user specifies the procurement option, the item is ordered unless the user then takes some other action to modify the order. Those skilled in the art will appreciate that in other embodiments, other single actions by the user can cause the procurement option to be selected, including moving the cursor over an indication of the procurement option or circling an indication of the procurement option with a pointing device.

In the illustrated embodiment the multi-procurement option ordering section contains a multi-procurement option ordering button 2003a and a current procurement option selection 2003b. The current procurement option selection subsection displays enough information so that the user can identify the procurement option that is currently selected, such as a moniker for that procurement option. To reduce the chances of system information being intercepted, the server system sends only enough information so that the riser can uniquely identify the procurement option, but not enough information to the useful to an unscrupulous interceptor or to another user.

When the current procurement option selection 2003b is selected, the client system sends a message to the server system requesting that the displayed item be ordered using information for that procurement option. The current procurement option selection can be selected in one of a variety of ways, such as by clicking the mouse when the cursor is over subsection 2003b or by selecting the multi-procurement option ordering button 2003a in a manner indicative of using the currently selected procurement option (e.g., a left-click on a multi-button mouse) to complete the ordering of the item. In some embodiments, the initially displayed current procurement option selection is a procurement option that has been previously designated as a default procurement option for the user.

After the server system receives a message from the client system to order the item using a specified procurement option, the server system retrieves information about the selected procurement option and uses that retrieved information to order the item. In some embodiments, the procurement option information is stored by the server system and available to the client system only when the server system provides it to the client system, while in other embodiments the client system stores the procurement option information and provides it to the server system. After the ordering of the item by the server system, the server system can provide to the client system a new Web page (not shown) that confirms receipt of the order.

In some embodiments, the generated Web page will include the multi-procurement option ordering button 2003a only if at least one of the procurement options for the user is currently enabled for ordering (e.g., by being explicitly designated as being enabled, or by containing sufficient information to allow the server system to complete the order). If the user has no procurement options that are currently enabled for such ordering, the multi-procurement option ordering button 2003a can instead be replaced by a multi-procurement option ordering enable button. If the user selects the multi-procurement option ordering enable button, the server system can provide a Web page to collect any additional information that is needed to enable one or more existing procurement options, or to create a new procurement option.

Figure 20B:
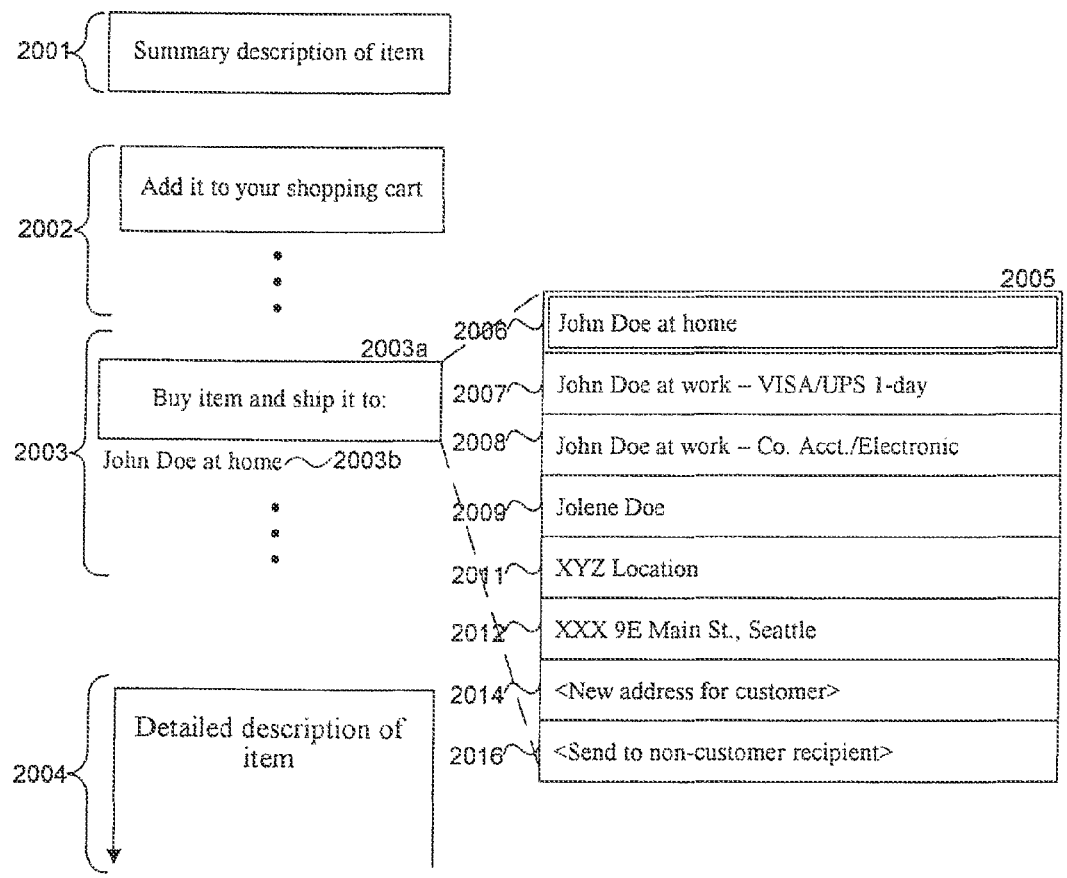

FIG. 20B illustrates the display of multiple procurement options 2005 for the current user. In the illustrated embodiment, a list of the available procurement options is displayed after the receipt of a user indication (e.g., a right-click of the mouse while the cursor is over the multi-procurement option ordering button 2003a or the current procurement option selection 2003b). In alternate embodiments, the various procurement options may be added to the Web page when it is initially generated and thus displayed without user indication. In addition, available procurement options can be displayed in a manner other than a list, such as by displaying only a single entry at a time from a list of available entries and cycling through the entries. The procurement options to be displayed can be determined in a variety of ways. In some embodiments, an address book of previously defined procurement options is maintained by the server system that generates the Web page or by a third-party server. In alternate embodiments, the client system can provide information about potential recipients, such as by accessing an online Rolodex database or email address book for the user.

In the illustrated example, the entreat user is John Doe and the procurement option with the moniker "John Doe at home" is the default procurement option. The default procurement option can be indicated in a variety of ways, such as by being displayed as the initial current procurement option selection 2003b, by being displayed as the first entry 2006 in the list of available procurement options, or by being displayed in a manner that is distinguishable from the other procurement options (e.g., with a darkened border around it).

As described above, each procurement option may have a unique set of information for completing the order of the item. Other entries in the list may thus vary from procurement option 2006 in a variety of ways. For example, procurement options 2007 and 2008 each have delivery addresses at John's workplace rather than his home. While they have the same recipient and the same delivery address, those two procurement options may vary in other ways, such as by payment information (e.g., a personal credit card versus a company debit account) or by shipping instructions (e.g., a common carrier and speed of delivery service versus electronic delivery).

Procurement option 2009 has a recipient other than John Doe, that being Jolene Doe. Procurement option 2009 may be displayed for a variety of reasons, such as Jolene Doe being a frequent recipient of gifts from John Doe. Alternately, John and Jolene may share a single joint account, and thus the procurement options for the account may include options for both users. Yet another alternative is that the client computer system on winch the Web page is being displayed is shared by John and Jolene, but the client system may supply a single unique client identifier to the server system to identify the current user. If so, the server system may include procurement options appropriate for each of the possible users associated with the client identifier if it is not possible to determine which user is currently using the client system.

In some embodiments, a procurement option will be displayed only if it is currently enabled and thus available to complete an order for the item. In alternate embodiments, non-enabled procurement options are also displayed. In the illustrated embodiment, procurement option 2011 is a non-enabled procurement option that is displayed in a manner that indicates that the procurement option is not enabled (e.g., displayed in a dimmed manner or with an identifying mark). Procurement options can be non-enabled for a variety of reasons, such as due to a lack of sufficient information necessary to complete the ordering of the item (e.g., payment information or a delivery address) or based on a previous explicit user indication to non-enable that procurement option. In some embodiments, non-enabled procurement options can be selected and used to complete the ordering of the item, such as by explicitly indicating to enable the procurement option or by supplying additional necessary information.

In addition to displaying a moniker to represent a procurement option, it is also possible to represent procurement options in other manners (e.g., when no moniker is defined). For example, procurement option 2012 is displayed using partial delivery address information in which only a portion of the numerical address is displayed. Alternately, portions of other procurement option information can also be displayed, such as payment information.

In some embodiments, a user can perform the ordering of an item by specifying a new procurement option. In the illustrated embodiment, procurement options 2014 and 2016 can be selected to create a new procurement option for the user or for a non-user recipient. After selecting one of the options, the user is prompted to supply enough information to allow the system to purchase and deliver the item. After supplying the information, the order will be completed in accordance with the newly created procurement option, as described in greater detail with respect to FIGS. 21A-C and 22.

Figure 20C:
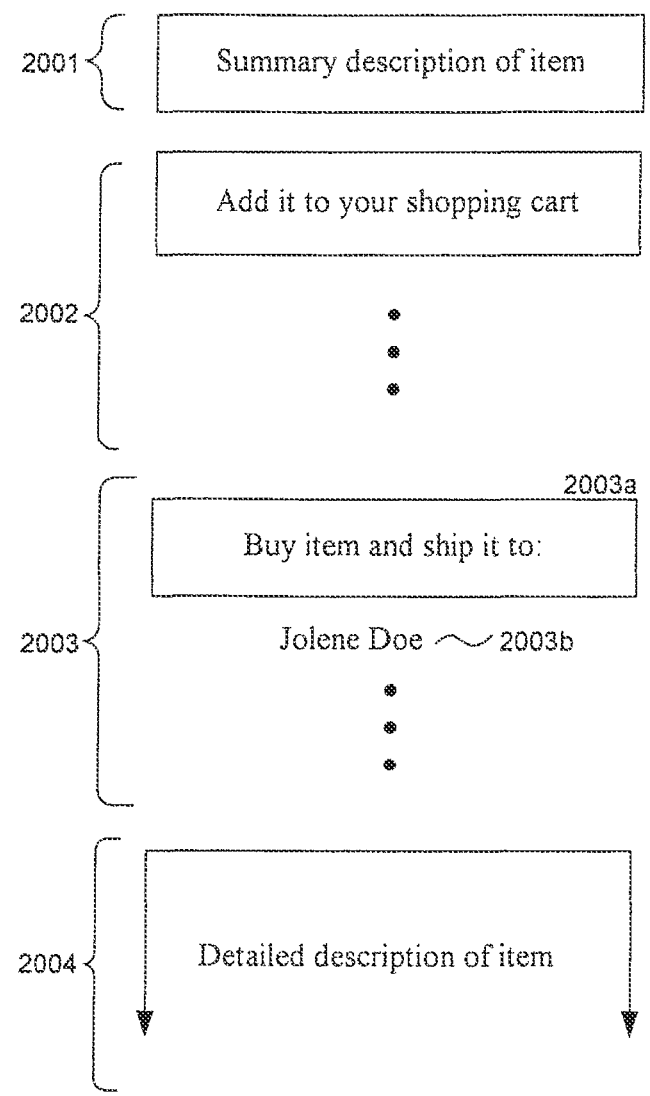
Figure 20D:
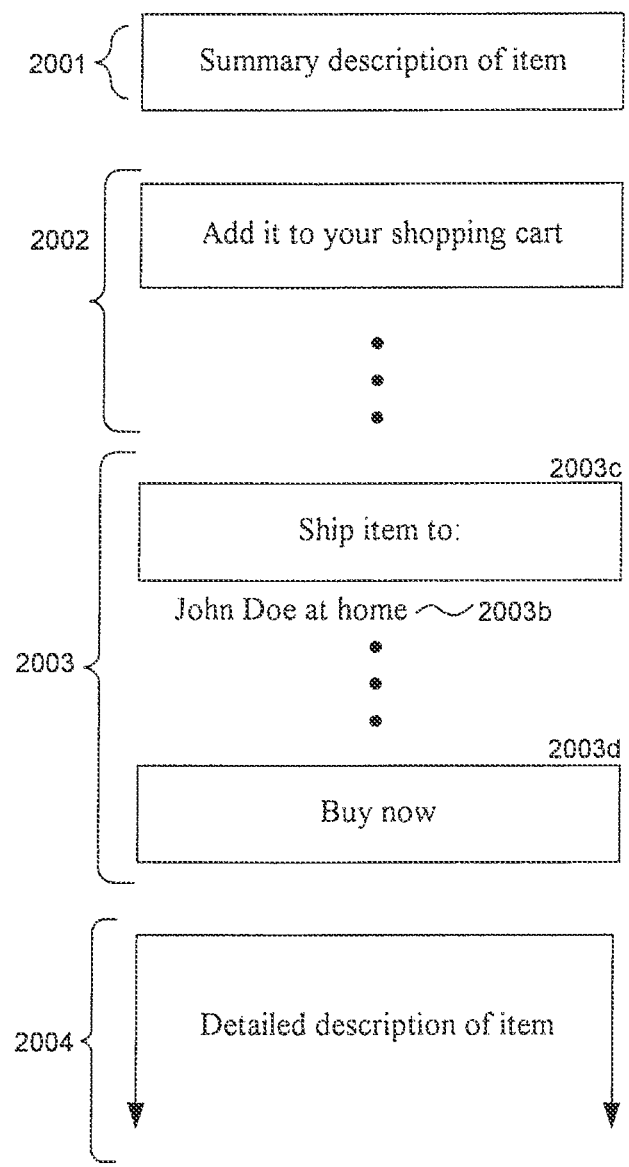

In some embodiments, the user can select a displayed procurement option in a manner that does not trigger an ordering of the item, such as by right-clicking on the displayed procurement option. In FIG. 20C, the user has selected the procurement option with the moniker "Jolene Doe," but has not yet selected a procurement option with which to perform ordering of the item. After the procurement option with the moniker "Jolene Doe" is selected, it is displayed as the current procurement option selection 2003b. If the user decides to complete the order using the "Jolene Doe" procurement option, the user can perform an order of the item using the current procurement option selection in a variety of ways (e.g., by left-clicking on the multi-procurement option ordering button 2003a or the current procurement option selection 2003b). In yet other embodiments, the user may select a procurement option using one display element, but perform the ordering using the selected procurement option using a separate display element. For example, in FIG. 20D the multi-procurement option ordering button 2003a has been replaced by a procurement option selection button 2003c and an ordering button 2003d.

Those skilled in the art will appreciate that the embodiments shown in FIGS. 20A-20D are for illustrative purposes only, and are not intended to limit the scope of the invention. A user can perform a multi-procurement option ordering of one or more items using one of multiple available procurement options in a variety of ways.

Figure 21C:

FIGS. 21A-21C illustrate an embodiment of adding an additional customer procurement option. The adding of an additional customer procurement option can occur in a variety of ways, such as by the user explicitly entering a mode for that purpose, or by selection of a displayed item such as procurement option 2014 shown in FIG. 20B.

In some embodiments, it is necessary to verify the identity of a user before allowing the user to perform certain actions, such as adding new procurement options. User identity verification can be performed in a variety of ways. As shown in FIG. 21A, one identity verification process involves the user supplying a user name 2101 and an associated password 2102. After a user's identity has been verified, some embodiments allow a user to specify information that can be later used in a default manner, such as to be included with procurement options that are added at a later time (e.g., during the same shopping trip). In the illustrated embodiment, the user can optionally specify credit card payment information 2103 at the time of user identity verification that will be used for new procurement options that are defined later during the shopping trip. In alternate embodiments, the payment information may be available until a timer expires after a specified occurrence, such as from the time the information was originally provided, from the last time the user performed an action requiring a verified user identity, or from the last time the user performed an action using a secured connection.

After user identity verification has been performed, or if it is not currently required, the user can create a new procurement option having themself as the recipient by supplying a variety of procurement option information, such as that shown in FIG. 21B. Since the new procurement option is for the user and the user identity is known, the user can be automatically selected as the current customer (and thus the name of the recipient is not displayed). If other types of default procurement option information had previously been specified, those defaults could be displayed in a manner that allows optional modification by the user, or those types of information could instead be omitted and the previously specified default information could be automatically used for the new procurement option. The procurement option information to be added includes delivery address information 2104, phone number contact information 2105, payment information 2106, shipping instructions 2107, and moniker information 2108. In the illustrated embodiment the user can also select box 2109 in order to designate that the new procurement option be the default procurement option for the user. In addition, in some embodiments the user can specify that procurement option information that has been added to the new procurement option be used as default procurement option information for procurement options to be added in the future. In the illustrated embodiment, the user has selected box 2110 so that the specified payment information as default information for procurement options that are later added. Those skilled in the art will appreciate that other user-selectable options may be available, such as an option to treat the procurement option as enabled or not. FIG. 21C illustrates that when the next new customer procurement option is to be added, the entry area for payment information 2106 is omitted since the previously selected default payment information will be used for this new procurement option.

In a similar manner to that shown in FIG. 21B, the user can create a new procurement option having someone other than themself as the recipient by supplying a variety of procurement option information such as that shown in FIG. 22. The user specifies the name of the recipient 2203 and, if the user has delivery address information for the recipient a user can directly specify the address information 2204. However, when designating someone else as the recipient, the user may have only partial or no delivery address information for the recipient. In that situation, some embodiments allow the user to specify identifier information that can be used to identify the user, such as a phone number 2201 or an email address 2202. If the identifier information allows the system to contact the recipient, the system can attempt to determine the delivery address through such contact. Alternately, the identifier information may be sufficient to allow the system to automatically identify address information associated with that identifier (e.g., an address associated with a phone number in a White Pages directory).

In the illustrated embodiment the previously specified default payment information is displayed as a default selection for payment information 2206, but only partial information is displayed and the default information is modifiable by the user. Also, in addition to specifying shipping instructions information 2207 and procurement option moniker information 2208, the illustrated embodiment allows the user to specify gift wrapping option information 2209. Those skilled in the art will appreciate that a variety of other types of information, can also be specified, such, as options to automatically add a greeting card or a message along with the item, or options to automatically provide confirmation to the user when the item is delivered.

Those skilled in the art will also appreciate that multiple instances of a type of default information could be specified, such as a first set of default payment information for new customer procurement options and a second set of default payment information tor new recipient procurement options.

In addition, those skilled in the art will appreciate that a subset of the information requested for new customer and recipient procurement options may be sufficient for the procurement option to be used to complete the order of an item. For example, moniker and gift wrapping instruction information may not be necessary to complete an item order.

Figure 23:
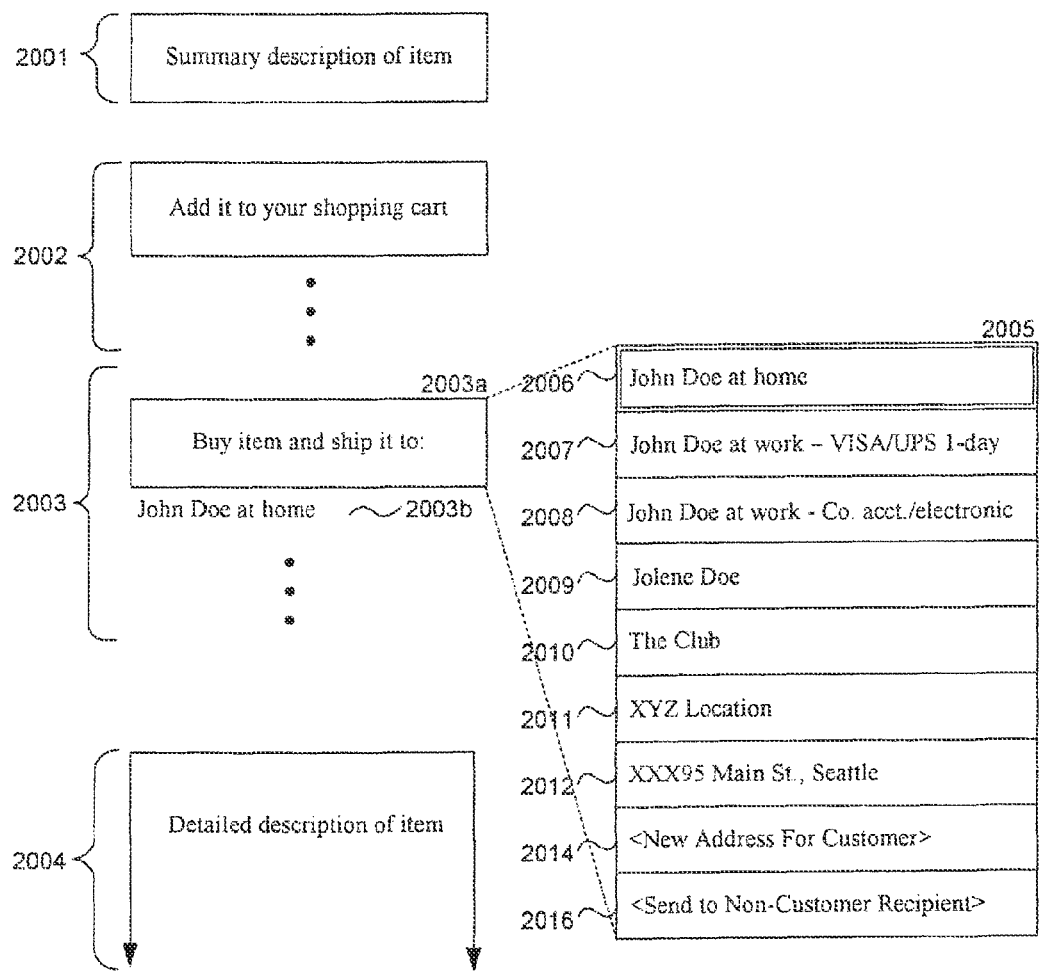
FIG. 23 illustrates an embodiment of multi-procurement option ordering after an additional customer procurement option has been added.

After a new procurement option has been added, that procurement option may be available for the ordering of future items. FIG. 23 illustrates that after the new customer procurement option shown on FIG. 21B has been added, that procurement option is available in the list 2005 as a new procurement option 2010. In some embodiments, only customer procurement options are displayed for multi-procurement option ordering of an item, while in other embodiments all available procurement options are displayed.

Figure 24:
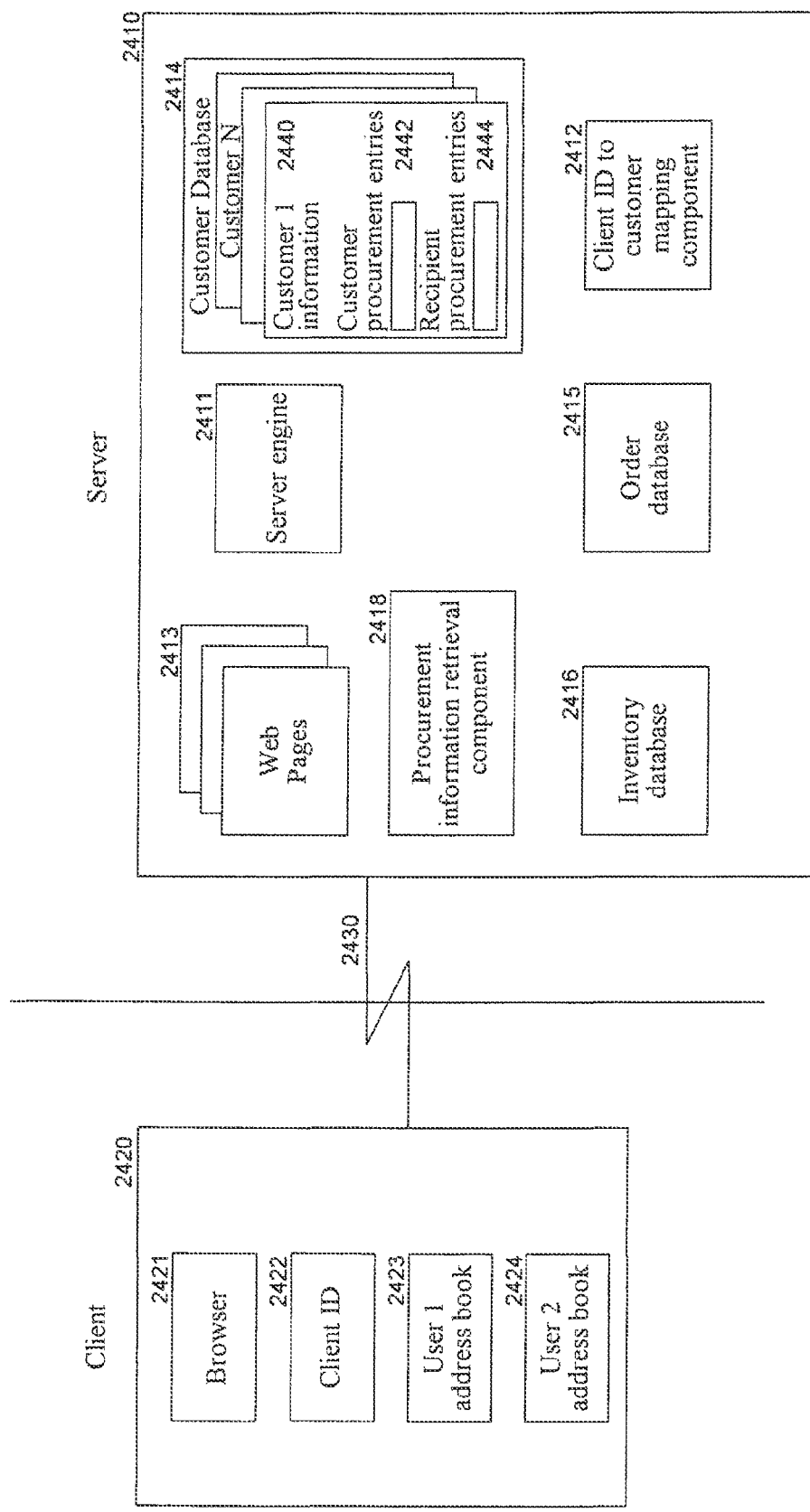
FIG. 24 is a block diagram illustrating an embodiment of a system for multi-procurement option ordering.

FIG. 24 is a block diagram illustrating an embodiment of a system for multi-procurement option ordering. This embodiment supports multi-procurement option ordering over the Internet using the World Wide Web. The server system 2410 includes a server engine 2411, a client identifier to customer mapping component 2412, various Web pages 2413, an order database 2415, an inventory database 2416, and a procurement information retrieval component 2418. The server system also includes a customer database 2414 which is composed of groups of customer information, such as customer 1 information group 2440 that contains customer procurement entries 2442 and recipient procurement entries 2444. The other customer information groups similarly contain customer procurement entries and/or recipient procurement entries for those customers.

The server system receives HTTP requests from various client systems to access Web pages that are identified by URLs, and provides the requested Web pages to the requesting clients. Such HTTP requests may be in response to the user requesting a Web page providing information about as item that may be ordered, or instead may be in response to the user performing a multi-procurement option ordering of an item front such a Web page.

When a client system requests a Web page providing information about an item that may be ordered, the server system attempts to add user-specific procurement option information to the Web page. If the identity of the user has been determined, the server system retrieves information from the customer database about the procurement entries that are stored for the customer, and provides a moniker or other set of partial procurement option information for each enabled procurement option. Such monikers allow the procurement option to be uniquely identified while protecting confidential information. If the server system has not yet identified the identity of the user and the client system supplies a client identifier that uniquely identifies that system, the server uses the client identifier to customer mapping component to identify one or more customers that are associated with that client system, and then provides such monikers for the procurement options stored for those customers.

Alternatively, when an HTTP request indicates in the illustrated embodiment that the user has performed multi-procurement option ordering of an item, the HTTP request includes an indication of a procurement option selected for the user (e.g., a selected moniker) that is to be used to complete the ordering of the item. When the server system receives such an HTTP request, the server system retrieves information from the procurement entry for the customer that is stored in the customer database (e.g., from customer procurement entries 2442 when the user is customer 1 and is ordering an item that is to be delivered to themself), and uses the retrieved information to complete the ordering of the item for the customer. The inventory database can be checked to confirm that the ordered item is available, and the order database can be updated to reflect the new order.

In some instances, an HTTP request indicates that the user has selected to create a new procurement option that is to be used to order the item. If so, the client and server systems attempt to collect sufficient information from the user in order to create a procurement option that is enabled for ordering. When sufficient information has been received, the new procurement option is added to the customer information group for the user in the customer database, and the information for the new procurement option is used to complete the ordering of the item. If the client and server systems are not able to collect sufficient information to enable the new procurement option, the procurement information retrieval component can attempt to use the partially specified procurement information to automatically determine the other necessary information. For example, if the user has specified an identity of the recipient but has not specified a delivery address, the retrieval component can attempt to identify the delivery address in a variety of ways as described above. Alternately, if default information has previously been specified for one or more types of procurement option information, the retrieval component or the server engine can use that default information if the user does not supply alternate information. Even if sufficient information to complete an order cannot be currently identified, a partially specified procurement option can be created and added to the customer database.

A client system such as client 2420 can communicate with the server system via a communications mechanism 2430 in order to send HTTP requests and receive Web pages from the server. The client system can use a browser 2421 to send and receive HTTP messages and to display Web pages. As discussed above, a client system can store a unique client identifier 2422 that can be supplied to the server system. In addition, in some embodiments the client system can store one or more address books for various users that may use the client system, such as user 1 address book 2423 and user 2 address book 2424. If such address books exist for the current user, information in the address books can be used to assist in determining possible recipients for new procurement options as well as for identifying relevant procurement option information for new procurement options created for such recipients (e.g., delivery addresses).

One skilled in the art will appreciate that the multi-procurement option ordering techniques can be used in various environments other than the Internet. For example, multi-procurement option ordering can also be used in an electronic mail environment in which an item is described in an electronic mail message along with an indication of a selection of a procurement option that is to be used to complete the ordering of the item. Also, various communication channels may be used, such as a local area network, a wide area network, or a point-to-point dial up connection. In addition, a server system may comprise any combination of hardware or software that can generate orders in response to selection of a procurement option. Similarly, a client system may comprise any combination of hardware or software that can interact with the server system. These systems may include television-based systems or various other consumer products through which orders may be placed. In addition, while Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types Windows, Linux, Unix, MacOS, BEOS, PalmOS, EPOC, Windows CE, FLEXOS, OS/9, JavaOS, etc.), and need not share the same operating system.

Figure 25:
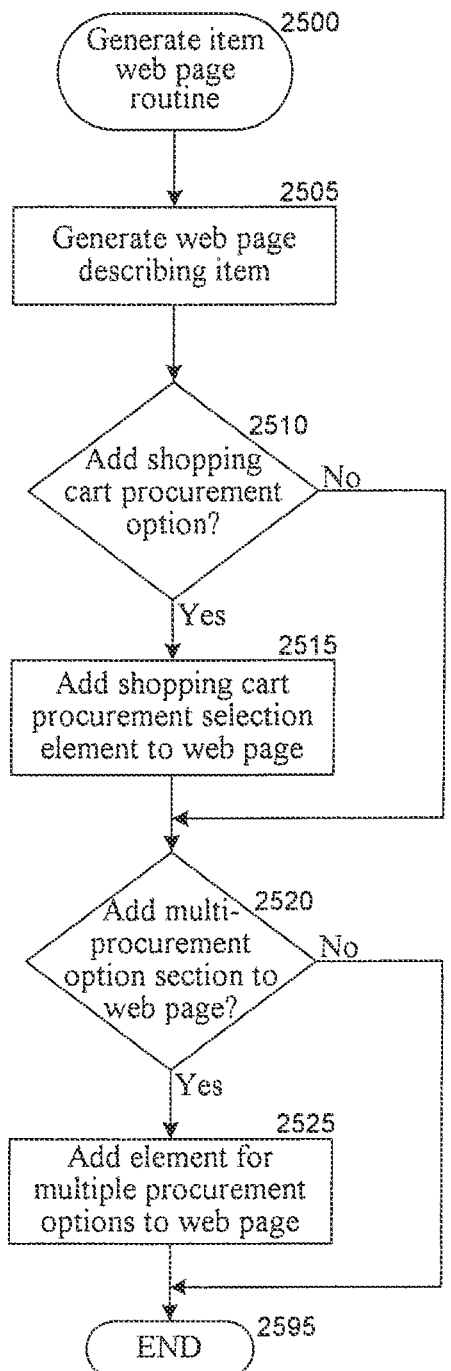
FIG. 25 is a flow diagram of an embodiment of the Generate Item Web Page routine.

FIG. 25 is a flow diagram of an embodiment of the Generate item Web Page routine 2500. When multi-procurement option ordering is enabled for at least one procurement option for the current user, the server system generates a Web page describing an item in a conventional manner and then adds a multi-procurement option ordering section for that user. In one embodiment, the server system adds partial information for each enabled procurement option to the section (e.g., monikers for immediate display), while in an alternate embodiments such partial information is available upon request by the user.

The routine begins at step 2505 where a conventional Web page describing the item is generated. The routine then continues to step 2510 to determine whether to add a shopping cart procurement section to the Web page (e.g., based on previously specified preferences for the user). If so, the routine continues to step 2515 to add a shopping cart procurement section to the Web page. After step 2515, or if it is determined in step 2510 to not add the shopping cart section, the routine continues to step 2520 to determine whether to add a section to the Web page that allows the user to select one of multiple procurement options to order the item. If so, the routine continues to step 2525 to add such a multi-procurement option section to the Web page. After step 2525, or if it was instead determined in step 2520 to not add such a multi-procurement option section, the routine continues to step 2595 and ends. Those skilled in the art will appreciate that the information for the multi-procurement option section can be generated and displayed in a varied of ways.

Figure 26:
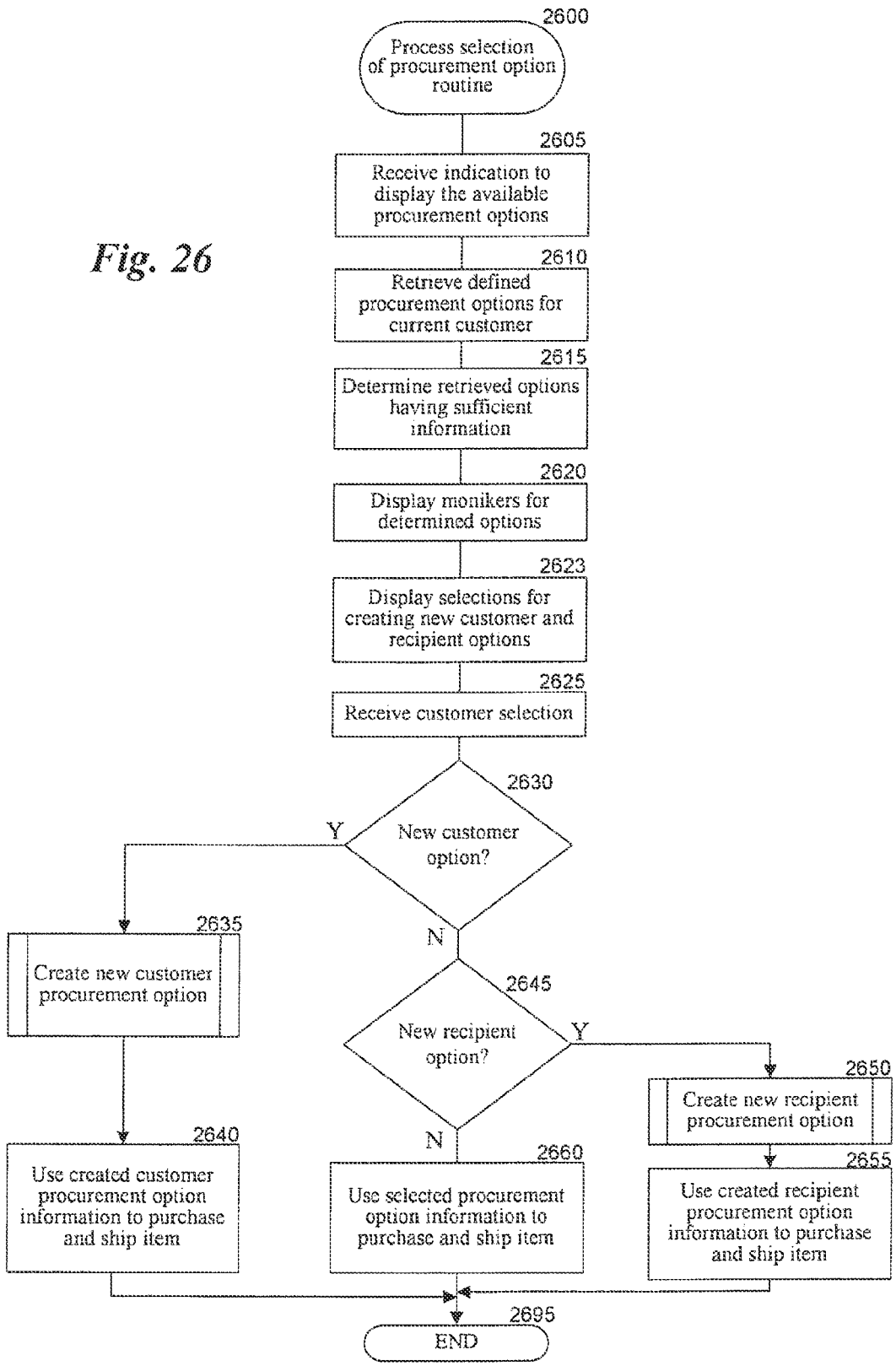
FIG. 26 is a flow diagram of an embodiment of the Process Selection Of Procurement Option routine.

FIG. 26 is a flow diagram of an embodiment of the Process Selection Of Procurement Option routine 2600. When the user selects a procurement option to complete the ordering of the item (e.g., by performance of a single action), the client system notifies the server system of the selected procurement option. The server system then retrieves the procurement option information for the selected procurement option and uses that information to complete the ordering of the item. The multi-procurement option order may also be combined with other multi-procurement option orders and/or other conventionally placed orders to reduce shipping cost. In the illustrated embodiment, the initially generated Web page contains a displayed element that, when selected, proceeds to display the various available procurement options. While in some embodiments the information for those procurement options will have previously been supplied to the client system, in the illustrated embodiment the client system retrieves the information to be displayed for those procurement options when the displayed element is selected.

The routine begins at step 2605 where the client system receives an indication to display the available procurement options. The routine continues to step 2610 to retrieve the various available defined procurement options (e.g., from the server system or from previously received information), and then continues to step 2615 to determine which of the retrieved options have sufficient information in order to enable that option for ordering. Those skilled in the art will appreciate that in alternate embodiments, one or more of the retrieved options may be explicitly identified as being enabled or not enabled, and the explicit identifications are used rather than reviewing the information stored for that procurement option. Also, those skilled in the art will appreciate that in some embodiments the server system will determine which of the retrieved options are currently enabled and supply that information (e.g., monikers) to the client system (e.g., with the initial delivery of the Web page for the item), while in other embodiments the server system may supply some or all of the procurement option information for the various possible procurement options to the client system and the client system will determine which of the options are currently enabled.

In step 2620, after the monikers for the available procurement options have been determined, the client system displays the monikers to the user. The routine then continues to step 2623 to display selections to the user that allow the user to create a new customer or recipient procurement option. Those skilled in the art will appreciate that in some embodiments one or more of these selections may not be available. The routine next continues to step 2625 where the client system receives an indication from the user of a selection of one of the displayed procurement options. The routine then continues to step 2630 to determine if the selected option is to create a new customer procurement option. If so, the routine continues to step 2635 to execute the Create New Customer Procurement Option subroutine. After step 2635, the routine continues to step 2640 to use the newly created customer procurement option information to complete the ordering of the item.

It was instead determined in step 2630 that the selected option is not to create a new customer procurement option, the routine continues to step 2645 to determine if the selected option is to create a new recipient procurement option. If so, the routine continues to step 2650 to execute the Create New Recipient Procurement Option subroutine. The routine then continues to step 2655 to use the newly created recipient procurement option information to complete the ordering of the item.

If it was instead determined in step 2645 that the selected option is not to create a new recipient procurement option, the routine continues to step 2660 to use the procurement option information for the selected procurement option to complete the ordering of the item. After steps 2640, 2655, or 2660, the routine contains to step 2695 and ends. Those skilled in the art will appreciate that in some embodiments, some or all of steps 2635, 2640, 2650, 2655, and 2660 will be performed by the client system, while in alternate embodiments those steps will be performed by the server system. Those skilled in the art will also appreciate that in some embodiments, the monikers for the available procurement options are initially displayed and thus step 2605 will not need to be executed. In addition, in various embodiments different groups of procurement options are displayed, such as only enabled procurement options, only customer procurement options, all procurement options for the user, all procurement options for one or more customers that are possible identities of the current user, etc.

Figure 27:
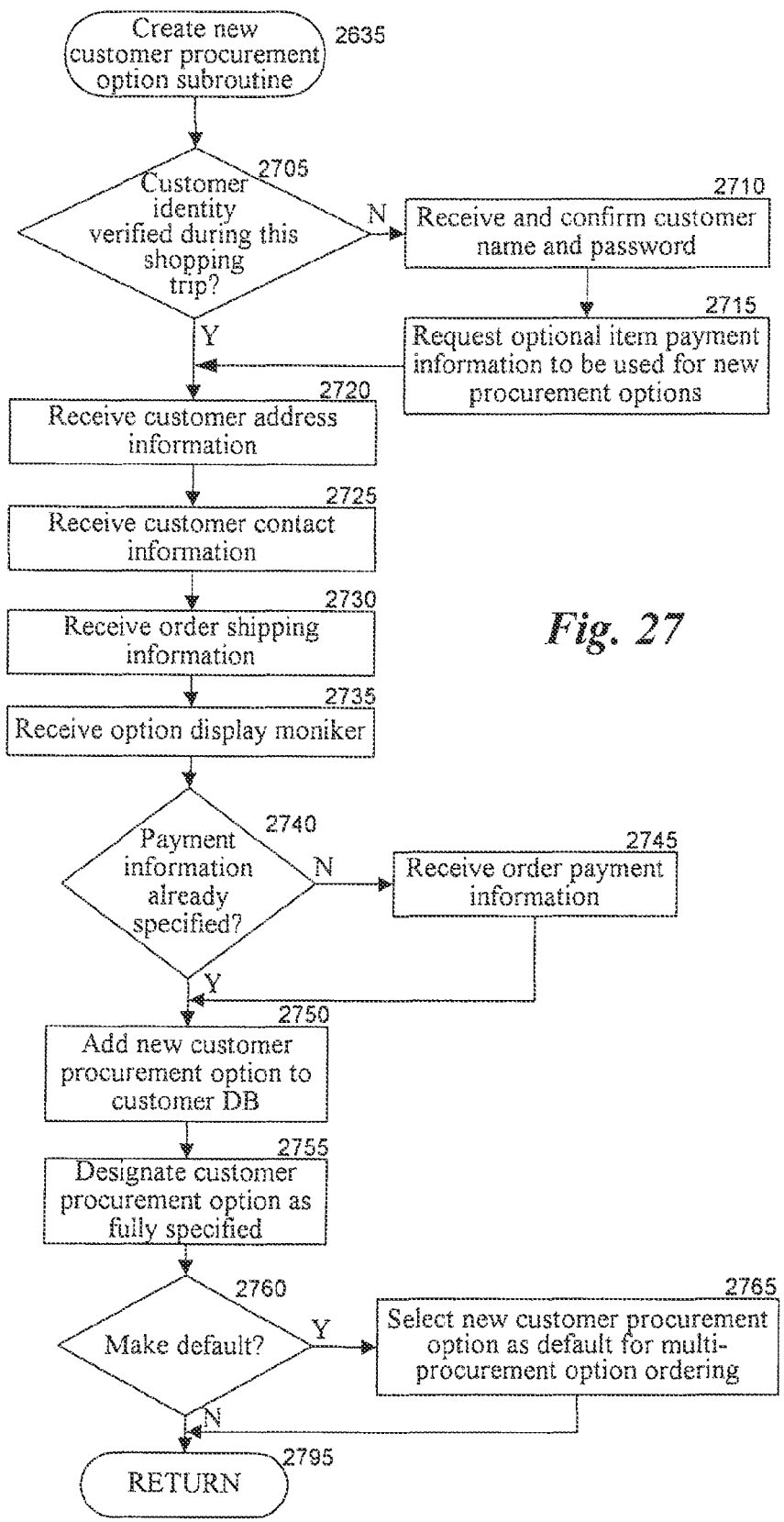
FIG. 27 is a flow diagram of an embodiment of the Create New Customer Procurement Option subroutine.

FIG. 27 is a flow diagram of an embodiment of the Create New Customer Procurement Option subroutine 2635. The subroutine receives information to be used to create a new procurement option, and then adds the new procurement option to the customer database, in the illustrated embodiment the user is required to specify each of the types of requested information, but in alternate embodiments the user will be able to choose not to specify requested information.

The subroutine begins at step 2705 where it is determined if the customer identity has previously been verified during the shopping trip. If not, the subroutine continues to step 2710 to receive and confirm a customer name and password, and then continues to step 2715 to optionally allow the user to specify payment information to be used as a default for new procurement options that are added later during the shopping trip.

After step 2715, or if it was instead determined in step 2705 that the customer identity has been verified, the subroutine continues to step 2720 to receive customer delivery address information. In step 2725, customer contact information (e.g., a phone number or email address) is received, and in step 2730 shipping information is received. In step 2735, the subroutine receives a display moniker for the new procurement option. Those skilled in the art will appreciate that in some embodiments a moniker for the new procurement option can be automatically generated rather than supplied by the user.

The subroutine continues to step 2740 to determine if default payment information had already been specified (e.g., during user identity verification), and if not, the subroutine continues to step 2745 to receive such payment information. After step 2745, or if it was instead determined in step 2740 that payment information has already been specified, the subroutine contains to step 2750 to add the new customer procurement option to the group of information in the customer database information for the user. Since the user has specified all of the required information, the subroutine in step 2753 then designates the new customer procurement option as being fully specified and thus enabled for ordering. The subroutine continues to step 2760 to determine if the user desires that the new customer procurement option be the default procurement option for the user. If so, the subroutine continues to step 2765 to make that designation. After step 2765, or if it was instead determined in step 2760 that the new procurement option is not to be the default, the subroutine continues to step 2795 and returns.

Those skilled in the art will appreciate that in some embodiments the user identity will not be verified or will be verified before the ability to create a new procurement option is made available to the user. Those skilled in the art will also appreciate that there are a variety of ways of verifying user identity other than with user names and passwords. Also, in some embodiments, only some of the types of procurement option information will be solicited from the user, while in alternate embodiments additional types of procurement option information will be solicited. Similarly, in some embodiments a variety of types of default procurement option information may be available, while in other embodiments no such default information may be available. If default information is available, in some embodiments such information will be displayed but will be modifiable by the user, while in other embodiments such default information will be automatically used and the step of soliciting that type of information from the user will not be performed. Those skilled in the art will also appreciate that in some embodiments the server system will request the various procurement option information (e.g., by sending a Web page having defined areas in which to add the requested information), while in alternate embodiments the client system will collect the procurement option information and provide the information to the server system.

Figure 28:
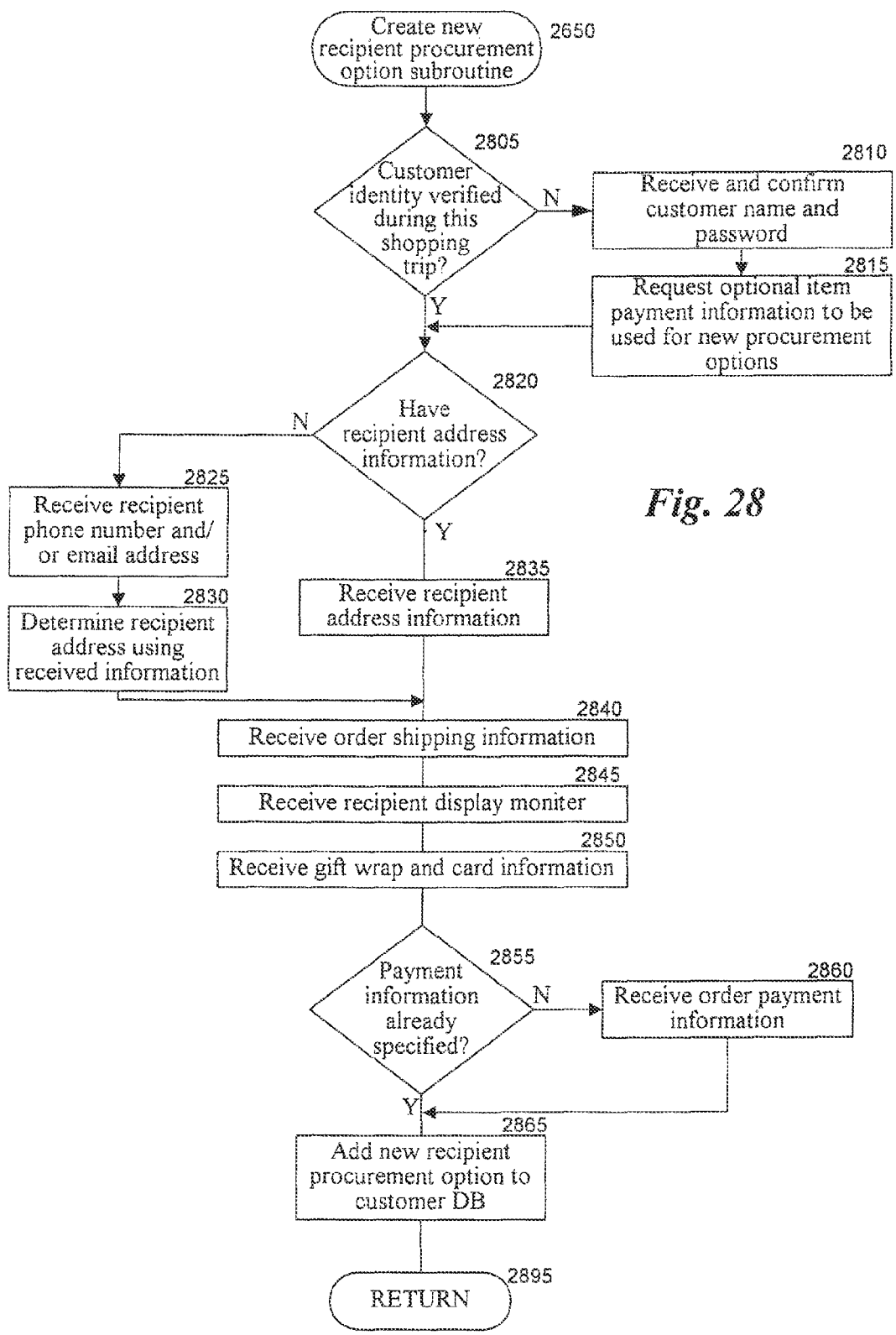
FIG. 28 is a flow diagram of an embodiment of the Create New Recipient Procurement Option subroutine.

FIG. 28 is a flow diagram of an embodiment of the Create New Recipient Procurement Option subroutine 2650. The subroutine receives information to be used to create a new procurement option, and then adds the new procurement option to the customer database. In the illustrated embodiment, the user is required to specify each of the types of requested information, but in alternate embodiments the user will be able to choose not to specify requested information.

The subroutine begins at step 2805 where it is determined if the customer identity has already been verified during the shopping trip. If not, the subroutine continues to step 2810 to receive and confirm a customer name and password, and then continues to step 2815 to optionally allow the user to specify payment information to be used as a default for new procurement options that are added later during the shopping trip.

After step 2815, or if it was instead determined in step 2805 that the customer identity has been verified, the subroutine continues to step 2820 to determine whether the user has available the delivery address information for the recipient. If not, the subroutine contains to step 2825 to receive a phone number and/or an email address for the recipient and men continues to step 2830 to determine a delivery address for the recipient using that information. Those skilled in the art will appreciate that there are a variety of ways to determine a delivery address, and that there are a variety of types of information other than email addresses or phone numbers that can be used to determine such a delivery address.

If it was instead determined in step 2820 that the user has delivery address information for the recipient, the subroutine contains to step 2835 to receive the recipient delivery address information from the user. After step 2830 or 2835, the subroutine contains to step 2840 to receive shipping information. The subroutine then continues to step 2845 to receive a display moniker for the newly created recipient procurement option. Those skilled in the art will appreciate that in some embodiments a moniker for the new procurement option can be automatically generated rather than supplied by the user. The subroutine next continues to step 2850 to receive information from the user specifying a type of gift wrapping and card to be used for items specified with this procurement option.

The subroutine next continues to step 2855 to determine if default payment information bad already been specified (e.g., during user identity verification), and if not, the subroutine continues to step 2860 to receive such payment information. After step 2860, or if it was instead determined in step 2855 that payment information has already been specified, the subroutine contains to step 2865 to add the new recipient procurement option to the customer database information for the user. After step 2865, the subroutine continues to step 2895 and returns. In the illustrated embodiment, the subroutine does not determine whether the new procurement option is fully specified and thus enabled for ordering at the time of creation as is done for new customer procurement options (e.g., the determination may be dynamically made each time available procurement options for the user are determined, or instead this information may not be necessary because only customer procurement options are displayed to the user). Similarly, in the illustrated embodiment, recipient procurement options are not available to be default procurement options, and thus the user is not queried to determine whether the new procurement option should be the default.

Those skilled in the art will appreciate that in some embodiments the user identity will not be verified or will be verified before the ability to create a new procurement option is made available to the user. Those skilled in the art will also appreciate that there are a variety of ways of verifying user identity other than with user names and passwords. Also, in some embodiments, only some of the types of procurement option information will be solicited from the user, while in alternate embodiments additional types of procurement option information will be solicited. Similarly, in some embodiments a variety of types of default procurement option information may be available, while in other embodiments no such default information may be available. If default information is available, in some embodiments such information will be displayed but will be modifiable by the user, while in other embodiments such default information will be automatically used and the step of soliciting that type of information from the user will not be performed. Those skilled in the art will also appreciate that in some embodiments the server system will request the various procurement, option information (e.g., by sending a Web page having defined areas in which to add the requested information), while in alternate embodiments the client system will collect the procurement option information and provide the information to the server system.

FIGS. 29A-29B illustrate example results of multi-procurement option ordering in one embodiment. In particular, these figures illustrate the display of a Web page representing live items that have been ordered using different procurement options. Items have been aggregated based first on the procurement option used, and then based on the availability of the items. Thus, the order information 2910 for the customer procurement option with the moniker "John Doe at Home" indicates that the items aggregated in order 2916 will be delivered in 3 days or fewer, while the item in order 2917 will be delivered in one or more weeks. Since the two orders have different availability times for shipping, they are not combined into one order. However, items 1 and 2 of order 2916, which were each individually ordered using multi-procurement option ordering, have been combined into a single order since they use the same procurement option and thus have the same delivery information. In one embodiment, the server system may combine orders that are placed within a certain time period (e.g., 90 minutes). Also, the server system may combine or divide orders when the orders are scheduled for shipment based on the then current availability of the items ordered. Those skilled in the art will appreciate that in alternate embodiments, items may not be aggregated together. Alternately, in some embodiments items may be aggregated even when ordered using different procurement options (e.g., if the delivery address and shipping instructions are the same, or if the procurement options differ only by payment information).

Figure 30:
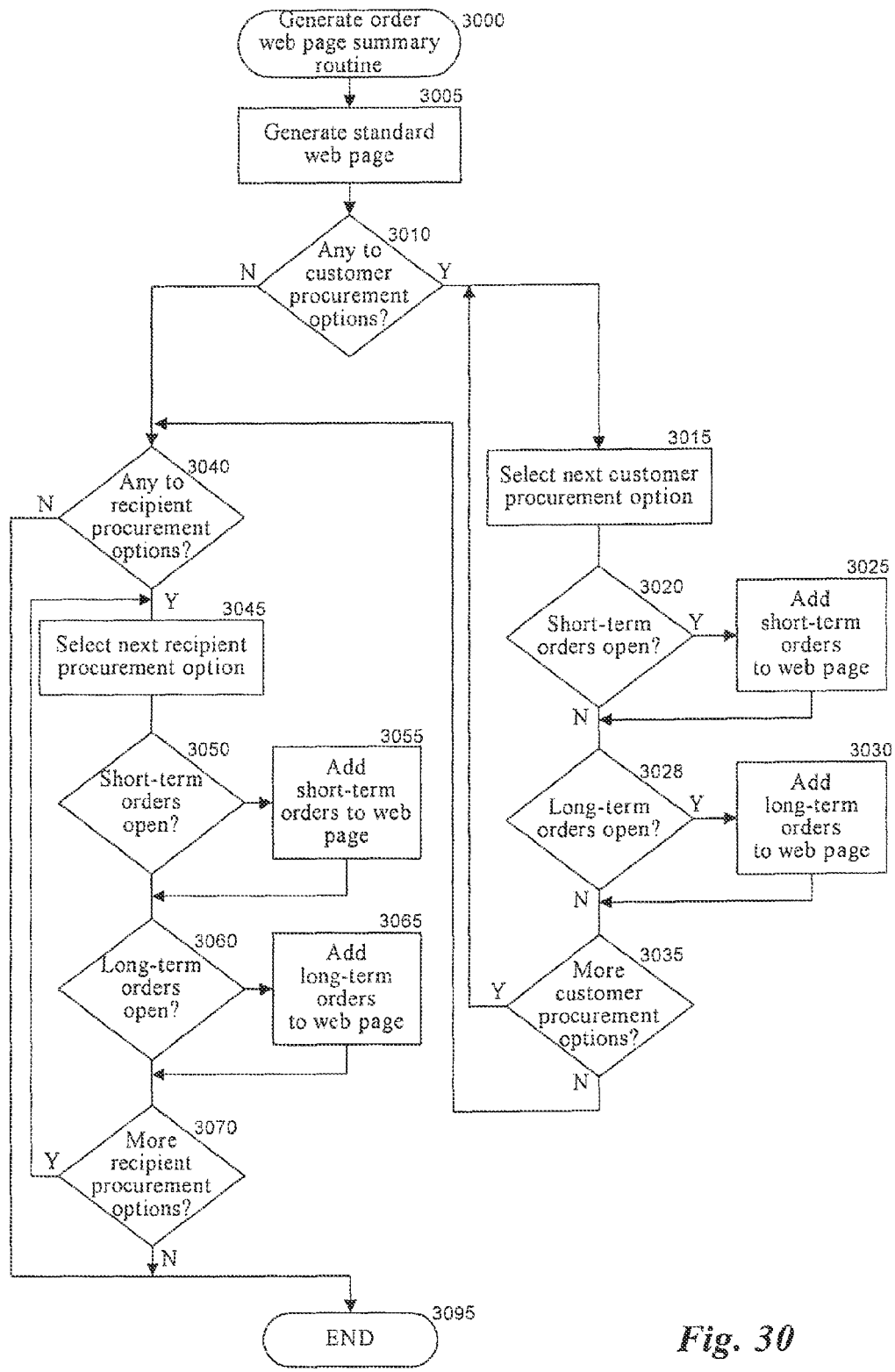
FIG. 30 is a flow diagram of an embodiment of the Generate Order Web Page Summary routine.

FIG. 30 is a flow diagram of an embodiment of the Generate Order Web Page Summary routine 3000. The Web page produced by the routine (e.g., FIGS. 29A and 29B) gives the user the opportunity to view and modify short-term and long-term orders before the orders are processed.

The routine begins in step 3005 where a default order summary page is generated. The routine then continues to step 3010 to determine if any items whose orders are not yet processed were ordered using a customer procurement option. If so, the routine continues to step 3015 to select the next such customer procurement option, beginning with the first procurement option. The routine then continues to step 3020 to determine if there are any items that have been ordered using the selected procurement option but are not yet processed, and that are scheduled to be delivered in the short-term. If so, the routine continues to step 3025 to add each such item to the Web page as part of a single group order. After step 3025, or if it was instead determined in step 3020 that there are no such short-term orders, the routine continues to step 3028 to determine if there are any items that have been ordered using the selected procurement option but are not yet processed, and that are scheduled to be delivered in the long-term. If so, the routine continues to step 3030 to add each such item to the Web page as part of a single group order. After step 3030, or if it was instead determined in step 3028 that there are no such long-term orders, the routine continues to step 3035 to determine if there are other customer procurement options that have been used to order items that are not yet processed. If so, the routine returns to step 3015 to select the next such customer procurement option. Those skilled in the art will appreciate that items can be grouped in ways other than by short-term and long-term delivery options.

If it was instead determined in step 3035 that there are no more such customer procurement options or in step 3010 that there were not any such customer procurement options, the routine continues to step 3040 to determine if any items whose orders are not yet processed were ordered using a recipient procurement option. If so, the routine continues to step 3045 to select the next such recipient procurement option, beginning with the first procurement option. The routine then continues to step 3050 to determine if there are any items that have been ordered using the selected procurement option but are not yet processed, and that are scheduled to be delivered in the short-term. If so, the routine continues to step 3055 to add each such item to the Web page as part of a single group order. After step 3055, or if it was instead determined in step 3050 that there are no such short-term orders, the routine continues to step 3060 to determine if there are any items that have been ordered using the selected procurement option but are not yet processed, and that are scheduled to be delivered in the long-term. If so, the routine continues to step 3065 to add each such item, to the Web page as part of a single group order. After step 3065, or if it was instead determined in step 3060 that there are no such long-term orders, the routine continues to step 3070 to determine if there are other recipient procurement options that have been used to order items that are not yet processed. If so, the routine retains to step 3045 to select the next such recipient procurement option. If it was instead determined, in step 3070 that there are no more such recipient procurement options or in step 3040 that there were not any such recipient procurement options, the routine, continues to step 3095 and ends.

Figure 31A:
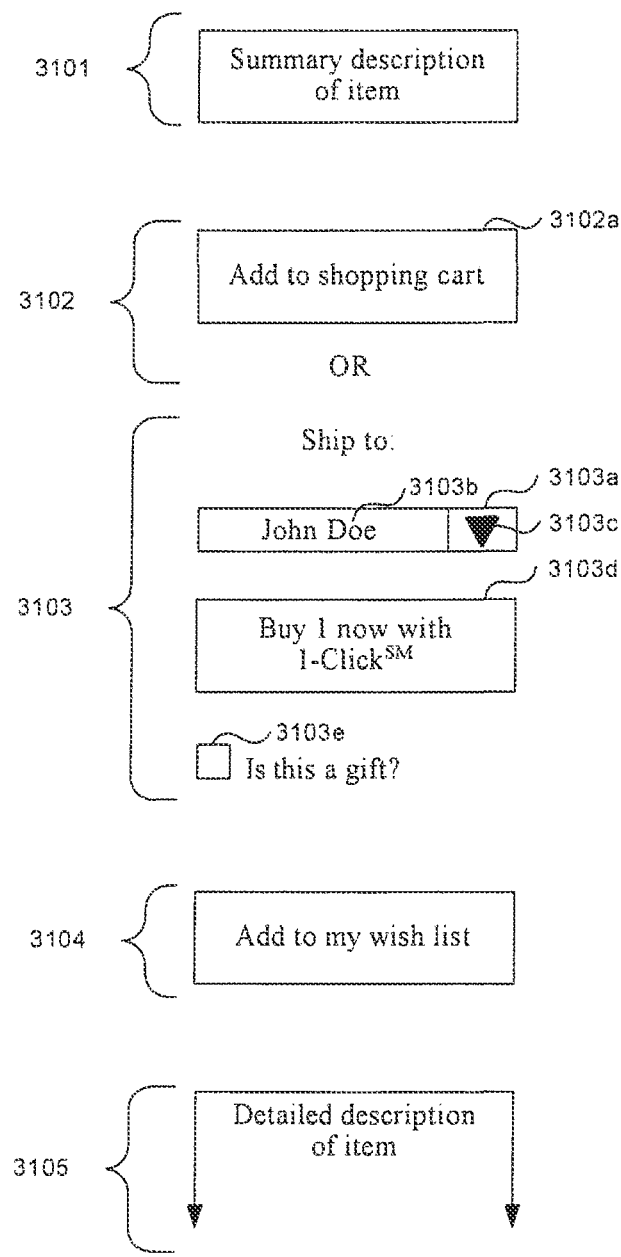

FIGS. 31A-31G illustrate an embodiment of multi-procurement option ordering. FIG. 31A illustrates the display of a Web page describing an item that may be ordered. This example Web page was sent from a server system to a client system when the user requested to review detailed information about the item. The Web page contains a summary description section 3101, a shopping cart section 3102, a multi-procurement option ordering section 3103, a wish list addition, section 3104, and a detailed description section 3105. One skilled in the art will appreciate that these various sections can be omitted or rearranged or adapted in various ways. The user need only be aware of the item or items to be ordered and of an action (e.g., a single action) needed to select a procurement option and/or to place a order. The summary description and the detailed description sections provide information that identifies and describes the one or more items that may be ordered. The shopping cart section provides a conventional capability to add the described item to the shopping cart via button 3102a. Similarly, the wish list addition section provides the capability via button 3104a to add the described item to a wish list for the user that contains items desired by the user. After an item is added to a wish list and a stepping/delivery address for the user is associated with the item, others may typically view the list and purchase the item for the user as a gift. One skilled in the art will appreciate that a single Web page on a server system may contain all these sections, and that the multi-procurement option ordering section can be selectively included or excluded before sending the Web page to the client system.

The illustrated multi-procurement option ordering section allows the user to specify one of the procurement options to be a current procurement option, such as with a single click of tie mouse button over a displayed indication of a procurement option. In addition, the multi-procurement option ordering section allows the user to order the described item, such as with a single action (e.g., a single click of the mouse button), using information associated with the current procurement option. Once the user specifies the single action to order the item, the item will be ordered unless the user then takes some other action to modify the order.

In the illustrated embodiment, the multi-procurement option ordering section contains a multi-procurement option display 3103*a*, which-includes a current procurement option display 3103*b* and a procurement option selection button 3103*c*. The multi-procurement option ordering section also contains a single-action ordering button 3103*d* and a gift indication selection option 3103*e*. The current procurement option display contains enough information so that the user can identify the procurement option that is currently selected, such as a moniker for that procurement option. In the illustrated embodiment, when the Web page is first displayed a default procurement option is selected as the current procurement option, and thus the current procurement option display contains the information for the default procurement option. As is illustrated, a procurement option with the moniker "John Doe" is the default procurement option. If the single action ordering button is selected after the Web page is displayed by clicking the mouse when the cursor is over section 3103*d*), the client system sends a message to the server system requesting that the displayed item be ordered using the information associated with the current procurement option.

After the server system receives a message from the client system to order the item using the current procurement option, the server system retrieves information about the procurement option and uses that retrieved information to order the item. After the ordering of the item by the server system, the server system can provide to the client system a new Web page (not shown) that confirms receipt of the order.

Figure 31B:
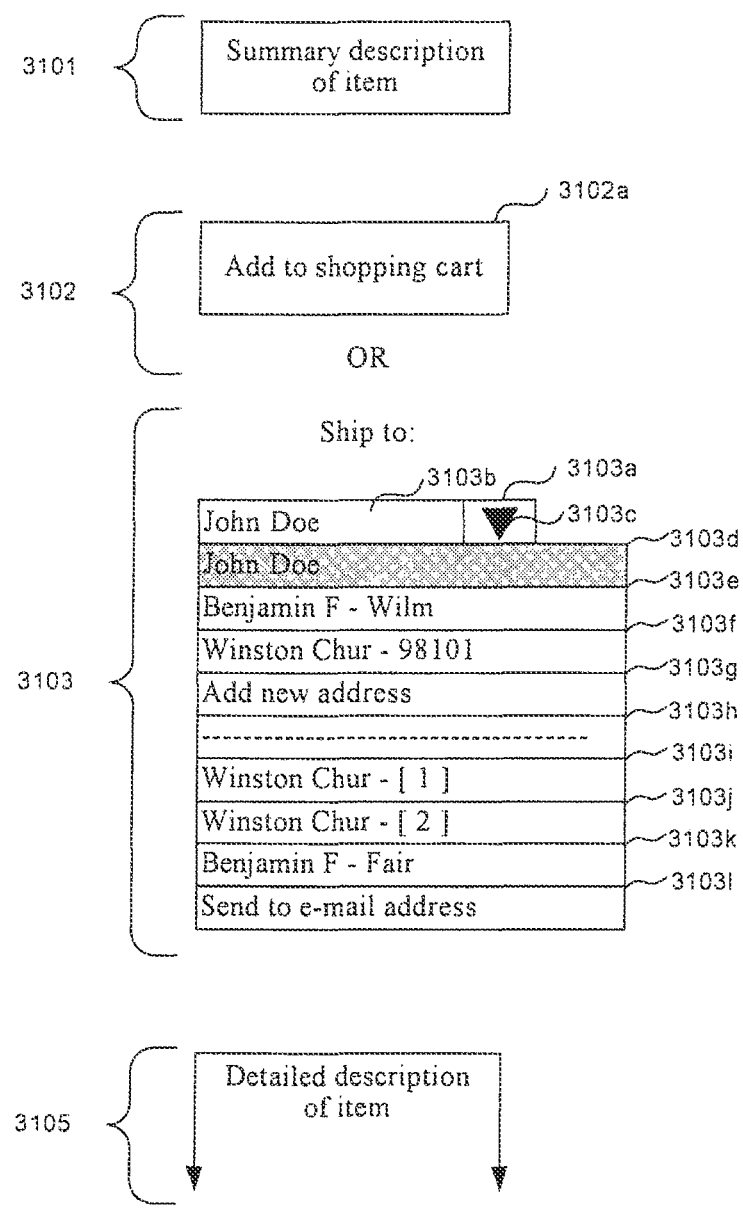
Figure 31C:
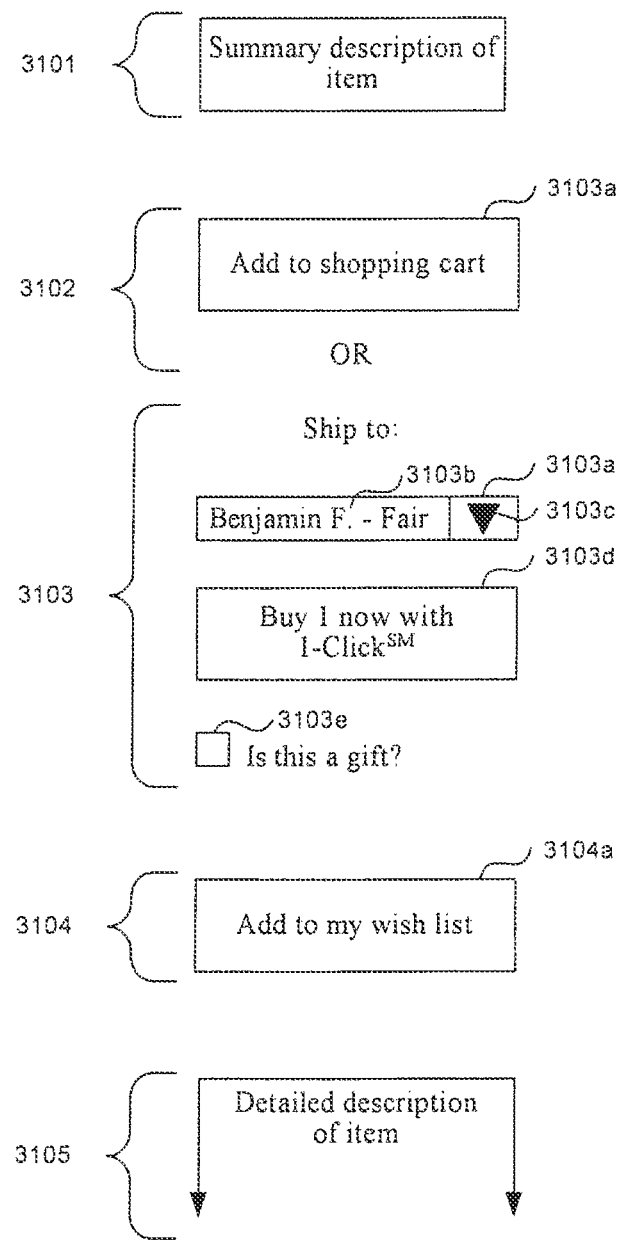

FIG. 31B illustrates the display of multiple procurement options available for the current user, in the illustrated embodiment a dropdown list of the available procurement options is displayed after the receipt of a user indication (e.g., a left-click of the mouse while the cursor is over button 3103*c*). As is shown, the list includes options 3103*d*-3103*l*. In addition, as is illustrated, some of the information on the Web page may be obscured by the list of options, such as the wish list addition section 3104.

The procurement options to be displayed can be determined in a variety of ways, including from an address book for the user of previously defined procurement options maintained by the server system that generates the Web page. In addition, the order and format in which the procurement options are displayed can vary greatly. In the illustrated embodiment, the list Of procurement options begins with the currently selected procurement option followed by two other recently selected, procurement options. Since the default procurement option is the initial current procurement option in the illustrated embodiment, the first option 3103*d* shows the moniker for the default procurement option and is highlighted as the current selection. Options 3103*e* and 3103*f* follow with two monikers that are automatically generated (as explained in greater detail below), and the next option 3103*g* is an option that allows the user to specify a new procurement option that will be added to the user's address book. Alternately, the last option in the list 3103*l* allows the user to indicate a recipient to receive the item, but in the illustrated embodiment the recipient information will not be added to the address book. Options 3103*i*, 3103*j*, and 3103*k* also illustrate monikers automatically generated to be unique, listed in alphabetical order by the last name of the recipient specified. Option 3103*h* is a dotted line that separates the display of the recently selected procurement options from the alphabetical procurement options, and in the illustrated embodiment the dotted line cannot be selected as a current procurement option selection.

In the illustrated embodiment, the selection of an indication of a displayed procurement option causes that procurement option to become the current procurement option, but does not cause the item to be ordered. Thus, for example, FIG. 31C indicates the Web page after list option 3103*k* (with moniker "Benjamin F—Fair") is selected, with the moniker for the procurement option displayed as the current procurement option selection 3103*b*. If the user decides to then complete the order by selecting the 3103*d* button, the information associated with the Benjamin F—Fair procurement option will be used to order the item.

If the user instead selects the "add new address" option 3103*g*, the user may be presented with a Web page for gathering new procurement option information such as is illustrated in FIG. 31D. The procurement option, information to be added can include a variety of types of information such as name and delivery address information 3114, phone number contact information 3115, payment information 3116, shipping instructions 3117, and moniker information 3118. Some of the information may also be optional, such as the moniker and the phone number. As indicated previously, in the illustrated embodiment the new information will be used to create a new entry in the user's address book. However, in the illustrated embodiment the user can select whether the new procurement option will be displayed as an available procurement option when a list of such options are next displayed, with this selection made via box 3119. In other embodiments additional selections may be available, such as whether to make this new entry the new default entry in the address book.

Figure 31E:
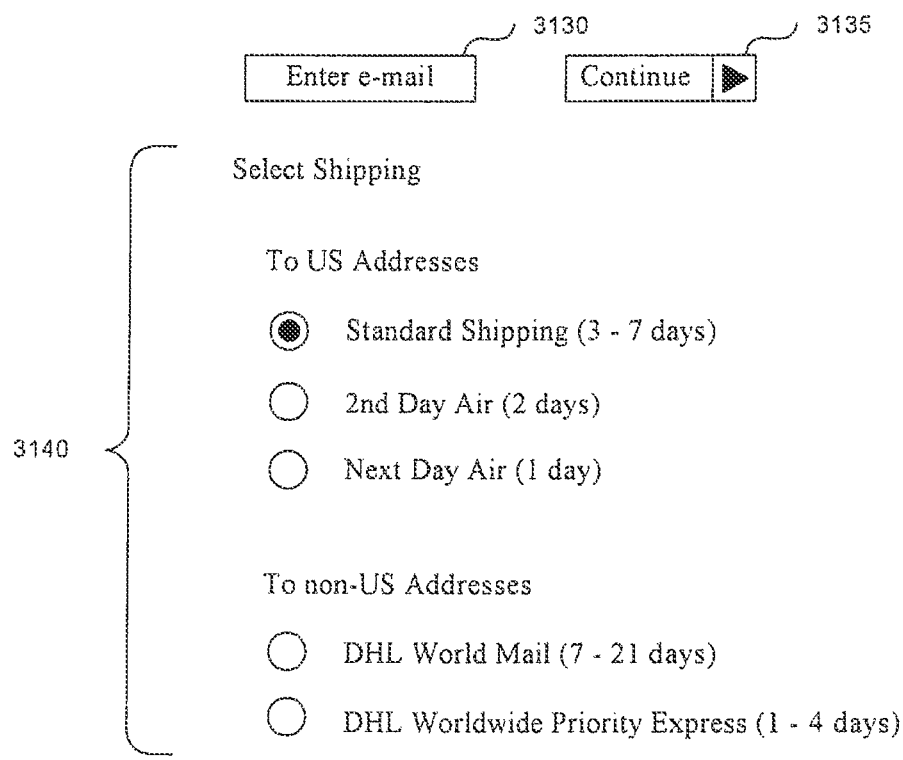

If the user had selected the "send to e-mail address" option 3103*l* in FIG. 31B, the user would instead be presented in the illustrated embodiment with a Web page such as is illustrated in FIG. 31E. The information to be specified is limited here to an e-mail address of the recipient 3130 and shipping instructions 3140. In this embodiment the system will attempt to determine the name and delivery address information for the recipient, and may use previously specified default payment information. Since a new procurement option will not be created for this recipient, moniker information is not needed. Those skilled in the art will appreciate that a variety of other types of information can also be specified.

Figure 31F:
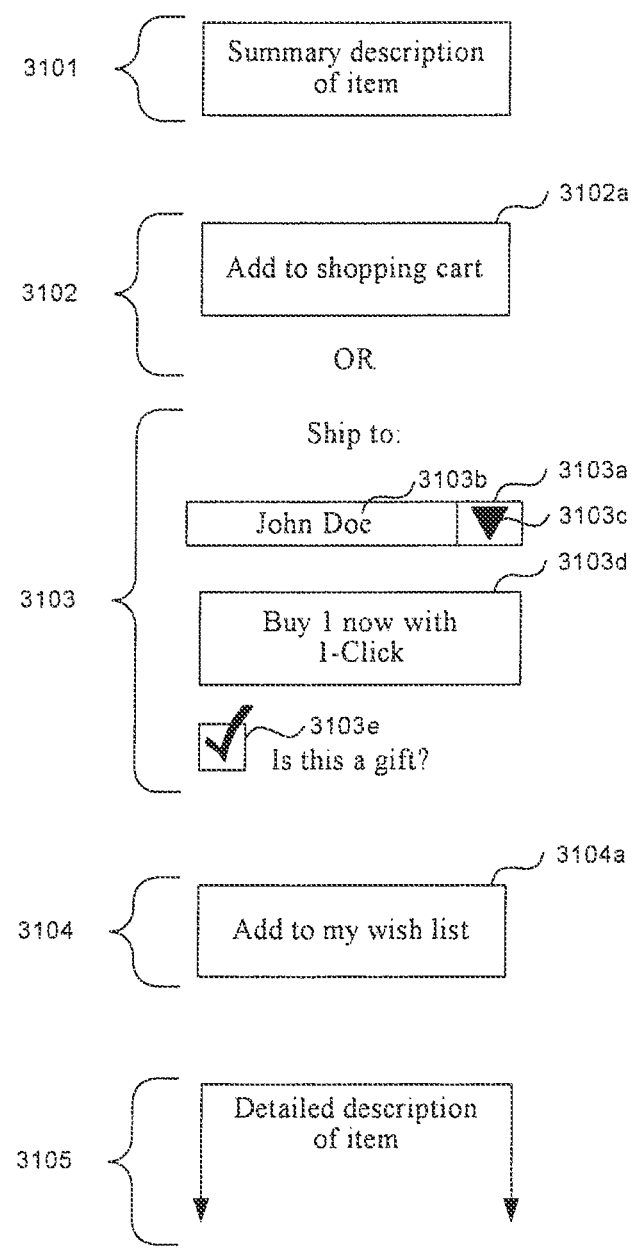
Figure 31G:
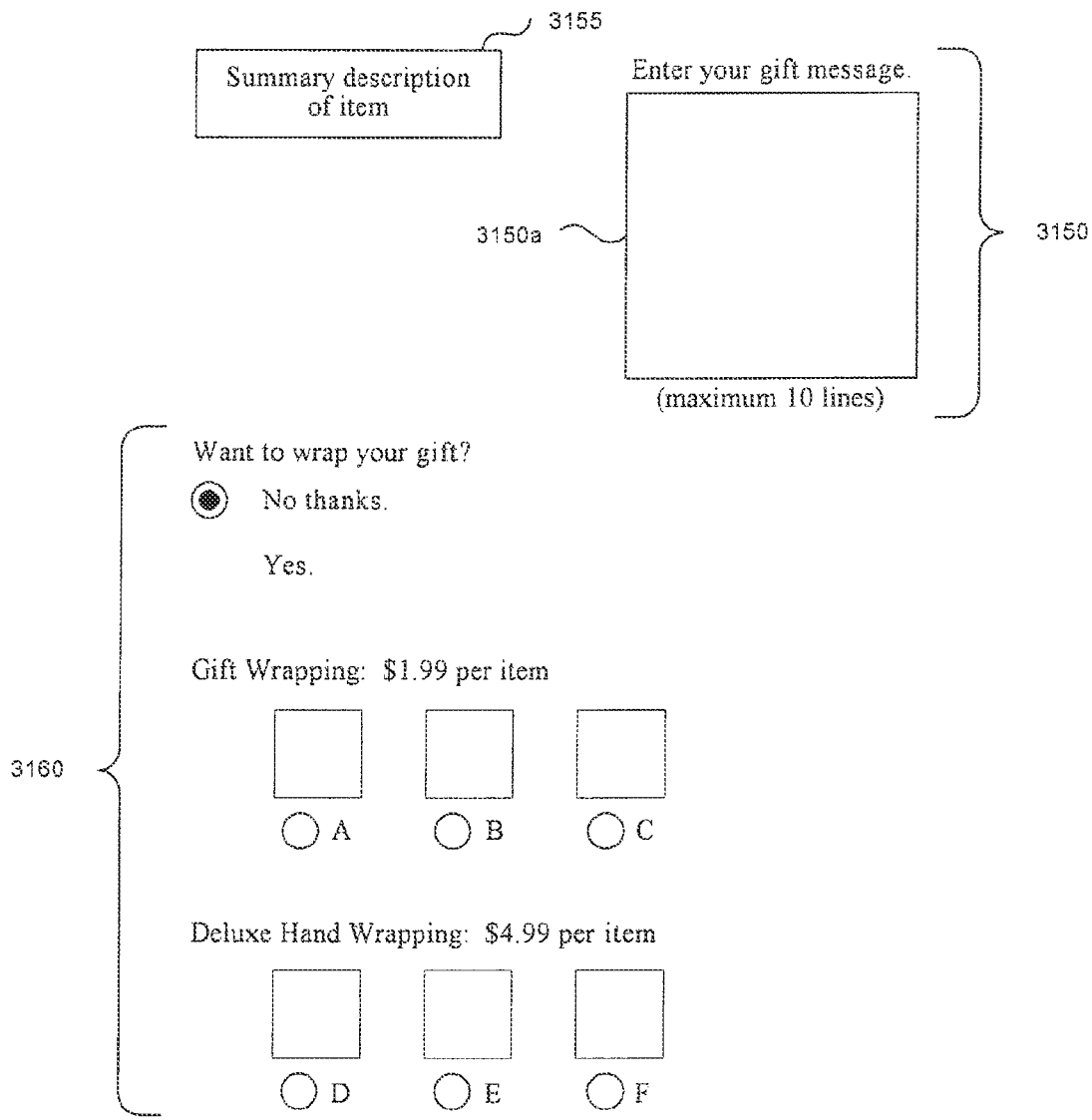

As previously mentioned, the illustrated item Web page also contains a gift indication selection option 3103*e*. If this gift indication is selected, as is illustrated in FIG. 31F, then the system may perform additional processing when the single-action ordering button 3103*d* is selected. In the illustrated embodiment, the system gathers information relevant to a gift before an order for the item is placed. As shown in FIG. 31G, in the illustrated embodiment the user is presented with, options related to how the item is to be supplied to the intended recipient, including whether a gift message mil accompany (or precede) the item and whether the item will be gift-wrapped. Those skilled in the art will appreciate that other types of information related to supplying the item could also be specified. In the illustrated embodiment, the user can enter a text message in box 3150*a* if they so desire, and can also select one of various types of gift wraps as shown in section 3160. After tine user has specified any desired gift message and gift wrapping instructions, the system will proceed to place the order using that information in conjunction with the information from the current procurement option when ordering button 3103d was selected.

As mentioned previously, in the illustrated embodiment the address book of the user is used to generate the list of procurement options displayed in FIG. 31B. FIGS. 32A and 32B illustrate an example address book that would exist after the performance of the activities described in FIGS. 31A-31G. In particular, the address book includes 8 addresses 3210-3280. In addition to the addresses, the address book Web page includes a selectable control 3205 via which the user can enable or disable whether single-action ordering, including the use of the multiple available procurement options, is currently available for the user. The user can also add new addresses to the address book via-selectable control 3207, which may cause an information collection Web page to be displayed similar to that shown in FIG. 31D.

Each of the 8 current addresses includes a variety of delivery, payment and shipping information, as well as selectable controls to modify various parts of the information. Each address also includes a moniker 32X2 (e.g., 3212, 3222, ...) and procurement option availability instructions 32X4. The current default procurement option 3210 has a default indication message 3216, and is displayed first is the address book in the illustrated embodiment in the illustrated embodiment, the default entry in the address book will be used as the default procurement option for item-ordering Web pages generated for the user, and the entry in the address book that is the default can be modified from the address book, such as by selecting the control shown in message 3216. In alternate embodiments, each displayed entry may have a control available to make that entry the default entry. The rest of the entries are shown in alphabetical order. When the list of procurement options was displayed in FIG. 31B, six existing available procurement options were displayed. They correspond to addresses 3210, 3230, 3240, 3250, 3260 and 3270. While address 3220 was present in the user's address box when the list was displayed, the procurement option availability instructions 3224 indicate that the address is not to be shown as an available procurement option. Address 3280 was not present when the list was displayed, but instead reflects the new procurement option that was created in FIG. 31D.

As is shown, each address has a unique moniker. Those skilled in the art will appreciate that moniker names can be manually specified or automatically generated in a variety of ways, and that in some embodiments monikers may not be required to be unique. In the illustrated embodiment, the user is allowed to manually specify a moniker if they wish, but is not required to do so. If a manually specified moniker is valid (e.g., unique, and within length and other constraints), that moniker will be displayed. Addresses 3210, 3220, and 3280 have manually specified monikers. In the illustrated embodiment, monikers will be automatically generated based on recipient name and delivery information if manually specified monikers are not supplied. In particular, if a user's name (or the portion of the name that fits within the length constraints) is unique, then the name will be used. If multiple identical names exist but they can be distinguished by the city name (or the part of the city name that fits within the length constraints), then some or all of the name followed by some or all of the city will be used. Similarly, if name and city are not unique, the system next checks if name and zip code are unique, and if so uses that combination. Finally, if none of the previous generation schemes produce a unique name, the system will append numbers to the end of the recipients' names. In the illustrated embodiment, potentially sensitive information such as a street address or phone number is not used as part of the automatic moniker generation scheme.

As an example of the automated moniker generation scheme, addresses 3230, 3240 and 3250 each have identical names (whether for the same person or for different people). Using the next check, the three addresses also have identical city names. Address 3250 has a unique zip code among the three addresses, however, and thus the moniker for address 3250 is composed of a portion of the recipient's name followed by the zip code. Since addresses 3230 and 3240 could not be differentiated based on any of the tests above, they each have numbers in brackets appended after a portion of the recipient's name. In a similar manner, addresses 3260 and 3270 have identical names but different city names, and thus the automated monikers for those addresses include a portion of the recipient name followed by a portion of the city name.

FIG. 33 illustrates an embodiment of multi-procurement option ordering used with items in a user's shopping cart. In particular, the illustrated shopping cart includes three items, those being 3310, 3320, and 3330. While items 3310 and 3320 do not currently have any procurement information associated with them, item 3330 is indicated as having been added to the shopping cart from Benjamin Franklin's Wish List. Thus, this item has an associated delivery address from the wish list entry. In addition to various other quantity and price information, each item includes a gift indication selection option box 33X2. If this gift indication is selected for one or more of the items when their order is completed, the system may perform additional processing as described previously to gather relevant information such as a gift message and gift wrapping instructions.

One option available to the user is to use the Proceed to Checkout button 3307 to purchase one or more of the items. If so, the user will be prompted to specify the various relevant procurement information (e.g., payment information, shipping instructions, delivery information, etc.) for each of the items being purchased. In addition, another option available for purchasing one or more of the items is the single-action ordering button 3103d in conjunction with the multi-procurement option display 3303. As described previously, the user can choose one of the available procurement options to be the current procurement option, and then use the single-action ordering button to purchase the items with procurement information from that current selection.

When one or more of the items in the shopping cart already have some procurement information associated with them (e.g., delivery address), this existing procurement information can affect the availability of the multi-procurement option ordering in various ways in different embodiments. In some embodiments, multi-procurement option and/or single-action ordering will not be available if any item has existing procurement information, or instead may not be available if there are any variations in a particular type of procurement information among all of the items. In other embodiments, such as the illustrated embodiment, the existing procurement information will be merged with the procurement information from the current procurement option. For example, the payment information and shipping instructions for the "John Doe" procurement option will be used in purchasing each of the items, but the delivery address information for the procurement option will be used only with items 3310 and 3320 (since item 3330 already has delivery address information). Those skilled in the art will appreciate that such use of procurement option information can be altered in a variety of ways.

FIG. 34 illustrates an embodiment of single-action ordering from a user's wish list. In particular, Benjamin Franklin's wish list is illustrated with a single item shown in detail. As is shown, in the illustrated embodiment the user can add the item to the user's shopping cart via selection box 3410, and can then modify the default, delivery address information that is associated with the item. Alternately, the user can use the single-action ordering button 3425 to purchase the item and send it to the delivery address of the pre-selected procurement option 3420. In some embodiments the payment information associated with the pre-selected procurement option may be used to purchase the item, while in other embodiments such information may be retrieved, from another source (e.g., the default procurement option, from payment information previously associated with the wish list recipient or the item, etc.). In addition, in some embodiments a threshold may exist such that default payment information will be used only if the amount to purchase the item is below the threshold.

In the illustrated embodiment, other procurement options cannot be selected and used along with the pre-selected delivery address (e.g., using the payment information and shipping instructions of another procurement option). This ability to use some or all of the information from procurement options other than the default or pre-selected procurement option may, however, be available in other embodiments. In addition, in some embodiments when a new procurement option is created while ordering an item from a wish list (e.g., by combining delivery address information from one procurement option with other procurement information from another procurement option), this new procurement option is added to the user's address book. In other embodiments the user may be queried as to whether to add the new procurement option, or it may not be possible to add the new procurement option to the address book.

In addition to purchasing the item, the user can also select link 3405 in order to see a detailed item description Web page. In the illustrated embodiment, this detailed item description Web page will have a format similar to that displayed in FIG. 31A. However, in the illustrated embodiment the currently selected procurement option shown in the current procurement option display 3103*b* will be modified to be the pre-selected procurement option rather than the default procurement option. Similarly, the gift indication selection option 3103*e* will be selected since items purchased from a wish list are typically purchased as gifts. Those skilled in the art will appreciate that in other embodiments, the display of the detailed item description Web page could be altered in a variety of ways.

FIG. 35 illustrates an embodiment of a post-order summary page from which order options can be modified. In particular, in the illustrated embodiment a Thank You page is displayed in which a single-action order is confirmed, various aspects of the order and the supplying of the item (e.g., gift wrapping instructions and a gift message) are displayed and can be modified, and various options are presented to allow the user to continue shopping (e.g., showing items related to the just-purchased item).

Those skilled in the art will appreciate that the embodiments shown in FIGS. 31A-31G, 32A-32B, and 33-35 are for illustrative purposes only, and are not intended to limit the scope of the invention. A user can perform a multi-procurement option ordering of one or more items using one of multiple available procurement options in a variety of ways.

Although the present invention has been described in terms of various embodiments, it is not intended that the invention be limited to these embodiments. Modification within the spirit of the invention will be apparent to those skilled in the art. For example, the server system can map a client identifier to multiple customers who have recently used the client system. The server system can then allow the user to identify themselves by selecting one of the mappings based preferably on a display of partial purchaser-specific order information. Also, various different single actions can be used to effect the placement of an order. For example, a voice command may be spoken by the purchaser, a key may be depressed by the purchaser, a button on a television remote control device may be depressed by the purchaser, or selection using any pointing device may be effected by the purchaser. Although a single action may the preceded by multiple physical movements of the purchaser (e.g., moving a mouse so that a mouse pointer is over a button, displaying a list of possible procurement options), the single action generally refers to a single event received by a client system that indicates to place the order. Finally, the purchaser can be alternately identified by a unique customer identifier that is provided by the customer when the customer initiates access to the server system and sent to the server system with each message. This customer identifier could the also stored persistently on the client system so that the purchaser does not need to re-enter their customer identifier each time access is initiated. The scope of the present invention is defined by the claims that follow.

The invention claimed is:

1. A method for ordering an item using a client computer system, the method comprising:
providing for display in a web browser a web page including information identifying the item and an indication of a single action that is to be performed by a user on the web page to order the identified item, wherein the single action is an only action required by the user to complete the order of the identified item;
providing for display in a multi-procurement ordering section of the webpage a procurement option associated with information related to supplying the item to a recipient, the procurement option being disabled due to the information being insufficient to supply the item to the recipient;
enabling, by the client computer system, the procurement option upon receiving additional information associated with the procurement option related to supplying the item to the recipient;
in response to receiving an indication that the single action has been performed by the user on the web page, automatically generating a request for ordering the identified item using the information related to supplying the item associated with the enabled procurement option; and
sending to a server computer the request for ordering the identified item, thereby resulting in fulfillment of the order.

2. The method of claim 1, wherein, prior to the procurement option being enabled, a display of the procurement option in the multi-procurement section indicates that the procurement option is disabled.

3. The method of claim 2, wherein the display of the procurement option is dimmed relative to other portions of the multi-procurement section.

4. The method of claim 1, wherein the additional information is payment information necessary to order the identified item.

5. The method of claim 1, wherein the additional information is a delivery address necessary to deliver the identified item to the recipient.

6. The method of claim 1, wherein the order is a multi-procurement option order, and wherein sending to the server computer the request for ordering the identified item results in the multi-procurement option order being combined with other multi-procurement option orders placed by the client computer system.

7. The method of claim 1, wherein the procurement option specifies payment information based on which the identified item is to be purchased.

8. The method of claim 1, wherein the procurement option specifies delivery information based on which the identified item is to be delivered to the recipient.

9. The method of claim 1, wherein the procurement option specifies shipping instructions according to which the identified item is to be shipped.

10. The method of claim 1, wherein the procurement option allows a message to be supplied for delivery to the recipient in addition to the identified item.

11. A non-transitory computer readable storage medium storing instructions that, when executed by a processor, cause the processor to:
provide for display in a web browser a web page including information identifying the item and an indication of a single action that is to be performed by a user on the web page to order the identified item, wherein the single action is an only action required by the user to complete the order of the identified item;
provide for display in a multi-procurement ordering section of the webpage a procurement option associated with information related to supplying the item to a recipient, the procurement option being disabled due to the information being insufficient to supply the item to the recipient;
enable the procurement option upon receiving additional information associated with the procurement option related to supplying the item to the recipient;
in response to receiving an indication that the single action has been performed by the user on the web page, automatically generate a request for ordering the identified item using the information related to supplying the item associated with the enabled procurement option; and
send to a server computer the request for ordering the identified item, thereby resulting in fulfillment of the order.

12. The non-transitory computer readable storage medium of claim 11, wherein, prior to the procurement option being enabled, a display of the procurement option in the multi-procurement section indicates that the procurement option is disabled.

13. The non-transitory computer readable storage medium of claim 12, wherein the display of the procurement option is dimmed relative to other portions of the multi-procurement section.

14. The non-transitory computer readable storage medium of claim 11, wherein the additional information is payment information necessary to order the identified.

15. The non-transitory computer readable storage medium of claim 11, wherein the additional information is a delivery address necessary to deliver the identified item to the recipient.

16. The non-transitory computer readable storage medium of claim 11, wherein the order is a multi-procurement option order, and wherein sending to the server computer the request for ordering the identified item results in the multi-procurement option order being combined with other multi-procurement option orders.

17. The non-transitory computer readable storage medium of claim 11, wherein the procurement option specifies payment information based on which the identified item is to be purchased.

18. The non-transitory computer readable storage medium of claim 11, wherein the procurement option specifies delivery information based on which the identified item is to be delivered to the recipient.

19. The non-transitory computer readable storage medium of claim 11, wherein the procurement option specifies shipping instructions according to which the identified item is to be shipped.

20. The non-transitory computer readable storage medium of claim 11, wherein the procurement option allows a message to be supplied for delivery to the recipient in addition to the identified item.

* * * * *